United States Patent
Edge

(10) Patent No.: US 10,080,098 B1
(45) Date of Patent: Sep. 18, 2018

(54) SYSTEMS AND METHODS FOR UPLINK HIGH EFFICIENCY TRANSPORT OF LOCATION INFORMATION IN A WIRELESS NETWORK

(71) Applicant: QUALCOMM Incorporated, San Diego, CA (US)

(72) Inventor: Stephen William Edge, Escondido, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/948,922

(22) Filed: Apr. 9, 2018

Related U.S. Application Data

(60) Provisional application No. 62/577,116, filed on Oct. 25, 2017, provisional application No. 62/584,640, filed on Nov. 10, 2017, provisional application No. 62/625,832, filed on Feb. 2, 2018.

(51) Int. Cl.
| | |
|---|---|
| *H04W 24/00* | (2009.01) |
| *H04W 4/02* | (2018.01) |
| *H04W 72/04* | (2009.01) |
| *H04W 52/02* | (2009.01) |

(52) U.S. Cl.
CPC ......... *H04W 4/02* (2013.01); *H04W 52/0209* (2013.01); *H04W 72/04* (2013.01)

(58) Field of Classification Search
CPC .... H04W 4/02; H04W 52/0209; H04W 72/04
USPC ................... 455/456.1, 456.4, 574, 410, 411
See application file for complete search history.

(56) References Cited

U.S. PATENT DOCUMENTS

| | | | |
|---|---|---|---|
| 2011/0077029 A1* | 3/2011 | Okuda | H04W 76/30 455/456.4 |
| 2014/0050320 A1* | 2/2014 | Choyi | H04L 63/08 380/270 |
| 2016/0330077 A1* | 11/2016 | Jin | H04L 41/0806 |

\* cited by examiner

*Primary Examiner* — Nghi H Ly
(74) *Attorney, Agent, or Firm* — Silicon Valley Patent Group LLP

(57) ABSTRACT

Uplink high efficiency transport of location information from a user equipment (UE) may include initiating a periodic or triggered location session in a UE by a location server (LS) in a wireless network. The UE may enter an idle state and monitor for a triggering event. After detecting an event, the UE may obtain location information, determine a nearby base station, and obtain a temporary signaling channel from the base station. The UE transmits the location information to the base station and includes a UE identification (ID), an ID for the LS, and an authentication code (AC). The location information may be ciphered but other information is unciphered. The base station transfers the received information to the LS which may authenticate the UE ID using the AC, determine the UE location using the location information and transfer the UE location to an external client.

40 Claims, 15 Drawing Sheets

SYSTEMS AND METHODS FOR UPLINK HIGH EFFICIENCY TRANSPORT OF LOCATION INFORMATION IN A WIRELESS NETWORK

CLAIM OF PRIORITY UNDER 35 U.S.C. § 119

This application claims under 35 USC § 119 the benefit of and priority to U.S. Provisional Application No. 62/577,116, filed Oct. 25, 2017, and entitled "SYSTEMS AND METHODS FOR UPLINK HIGH EFFICIENCY TRANSPORT OF LOCATION INFORMATION IN A WIRELESS NETWORK," U.S. Provisional Application No. 62/584,640, filed Nov. 10, 2017, and entitled "SYSTEMS AND METHODS FOR UPLINK HIGH EFFICIENCY TRANSPORT OF LOCATION INFORMATION IN A WIRELESS NETWORK," and U.S. Provisional Application No. 62/625,832, filed Feb. 2, 2018, and entitled "SYSTEMS AND METHODS FOR UPLINK HIGH EFFICIENCY TRANSPORT OF LOCATION INFORMATION IN A WIRELESS NETWORK," all of which are assigned to the assignee hereof and are incorporated herein by reference in their entireties.

BACKGROUND

Background Field

The present disclosure relates generally to communication, and more specifically to techniques for supporting location services for a user equipment (UE).

Relevant Background

The Third Generation Partnership Project (3GPP) has defined location solutions, known as Control Plane (CP) location solutions, for a GSM EDGE Radio Access Network (GERAN), a Universal Terrestrial Radio Access Network (UTRAN) and an Evolved Universal Terrestrial Radio Access Network (E-UTRAN). These location solutions are typically resource intensive for both a wireless network and a User Equipment (UE). For example, for each location of a UE, the following is typically required: (a) the UE is assigned a signaling connection in both a Radio Access Network (RAN) and a Core Network (CN) and enters a connected state (e.g. via paging by the network or via a service request from the UE); (b) authentication and ciphering for the UE occur as part of (a); (c) internal network signaling occurs to assign a location server (LS), e.g., an Enhanced Serving Mobile Location Center (E-SMLC) or a Stand Alone SMLC (SAS); (d) signaling, e.g., using a Long Term Evolution (LTE) Positioning Protocol (LPP, is exchanged between the UE and the LS to coordinate and obtain location measurements; (e) the UE obtains location measurements, may compute a location using the location measurements and sends the location measurements and/or the location to the LS; (f) the LS computes a location of the UE from the received location measurements or verifies the received location; (g) the LS transfers the location of the UE to an external client via other network elements, e.g., a Gateway Mobile Location Center (GMLC); (h) the signaling connections and LS assignment are released.

For a UE, such as an Internet of Things (IoT) UE, that is regularly tracked, e.g., at 15 minute to 1 hour intervals, the above-described process is battery intensive. Moreover, for a network supporting millions of UEs and IoT UEs, the above-described process would drain resources. It may therefore be desirable to develop location solutions which reduce the usage of network resources and UE battery consumption.

SUMMARY

Uplink high efficiency transport of location information from a user equipment (UE) may include initiating a periodic or triggered location session in a UE by a location server (LS) in a wireless network. The UE may enter an idle state and monitor for a triggering event. After detecting an event, the UE may obtain location information, determine a nearby base station, and obtain a temporary signaling channel from the base station. The UE transmits the location information to the base station and includes a UE identification (ID), an ID for the LS, and an authentication code (AC). The location information may be ciphered but other information is unciphered. The base station transfers the received information to the LS which may authenticate the UE ID using the AC, determine the UE location using the location information and transfer the UE location to an external client.

In one implementation, a method performed by a user equipment (UE) includes receiving a request for a periodic or triggered location from a server in a wireless network; entering an idle state with respect to the wireless network; detecting a periodic or triggering event; obtaining location information; determining a serving base station in the wireless network; obtaining an uplink signaling channel to the serving base station, where the UE is not connected to any other element in the wireless network; transmitting a location report to the serving base station using the uplink signaling channel, where the location report comprises the location information, an identification (ID) for the UE, an ID for the server and an authentication code, and where the ID for the UE and the ID for the server are not ciphered; and re-entering the idle state after transmitting the location report.

In one implementation, a user equipment (UE) includes a wireless transceiver configured to wirelessly communicate with a wireless network; and at least one processor coupled to the wireless transceiver and configured to receive a request for a periodic or triggered location from a server in the wireless network, enter an idle state with respect to the wireless network, detect a periodic or triggering event, obtain location information, determine a serving base station in the wireless network, obtain an uplink signaling channel to the serving base station, where the UE is not connected to any other element in the wireless network, transmit a location report to the serving base station using the uplink signaling channel, where the location report comprises the location information, an identification (ID) for the UE, an ID for the server and an authentication code, and where the ID for the UE and the ID for the server are not ciphered, and re-enter the idle state after transmitting the location report.

In one implementation, a method performed by a base station in a wireless network includes assigning an uplink signaling channel to a user equipment (UE), where the UE is connected to the base station but is not connected to any other element in the wireless network; receiving a location report from the UE using the uplink signaling channel, where the location report comprises first location information, an identification (ID) for the UE, an ID for a server and an authentication code (AC), where the ID for the UE and the ID for the server are not ciphered; releasing the uplink signaling channel after receiving the location report from the UE; and transmitting a message to the server, the message comprising second location information, the ID for the UE and the AC, and where the second location information is based on the first location information.

In one implementation, a base station in a wireless network includes an external interface configured to communicate with a wireless network; and at least one processor coupled to the external interface and configured to assign an uplink signaling channel to a user equipment (UE), where the UE is connected to the base station but is not connected to any other element in the wireless network, receive a location report from the UE using the uplink signaling channel, where the location report comprises first location information, an identification (ID) for the UE, an ID for a server and an authentication code (AC), where the ID for the UE and the ID for the server are not ciphered, release the uplink signaling channel UE after receiving the location report from the UE, and transmit a message to the server, the message comprising second location information, the ID for the UE and the AC, and where the second location information is based on the first location information.

In one implementation, a method performed by a server in a wireless network includes transmitting by the server a request for a periodic or triggered location to a user equipment (UE); receiving a location report for the UE from a base station when the UE is not reachable from the server, where the location report comprises first location information, an identification (ID) for the UE, and an authentication code (AC), where the ID for the UE is not ciphered; and processing the location report, where the processing comprises: identifying the UE using the ID for the UE; authenticating the ID for the UE using the AC; and transmitting second location information for the UE to another entity.

In one implementation, a server in a wireless network includes an external interface configured to communicate with a wireless network; and at least one processor coupled to the external interface and configured to transmit a request for a periodic or triggered location to a user equipment (UE), receive a location report for the UE from a base station when the UE is not reachable from the server, where the location report comprises first location information, an identification (ID) for the UE, and an authentication code (AC), where the ID for the UE is not ciphered, and process the location report by being configured to identify the UE using the ID for the UE, authenticate the ID for the UE using the authentication code, and transmit second location information for the UE to another entity.

BRIEF DESCRIPTION OF THE DRAWINGS

An understanding of the nature and advantages of various embodiments may be realized by reference to the following figures.

Figure 1:
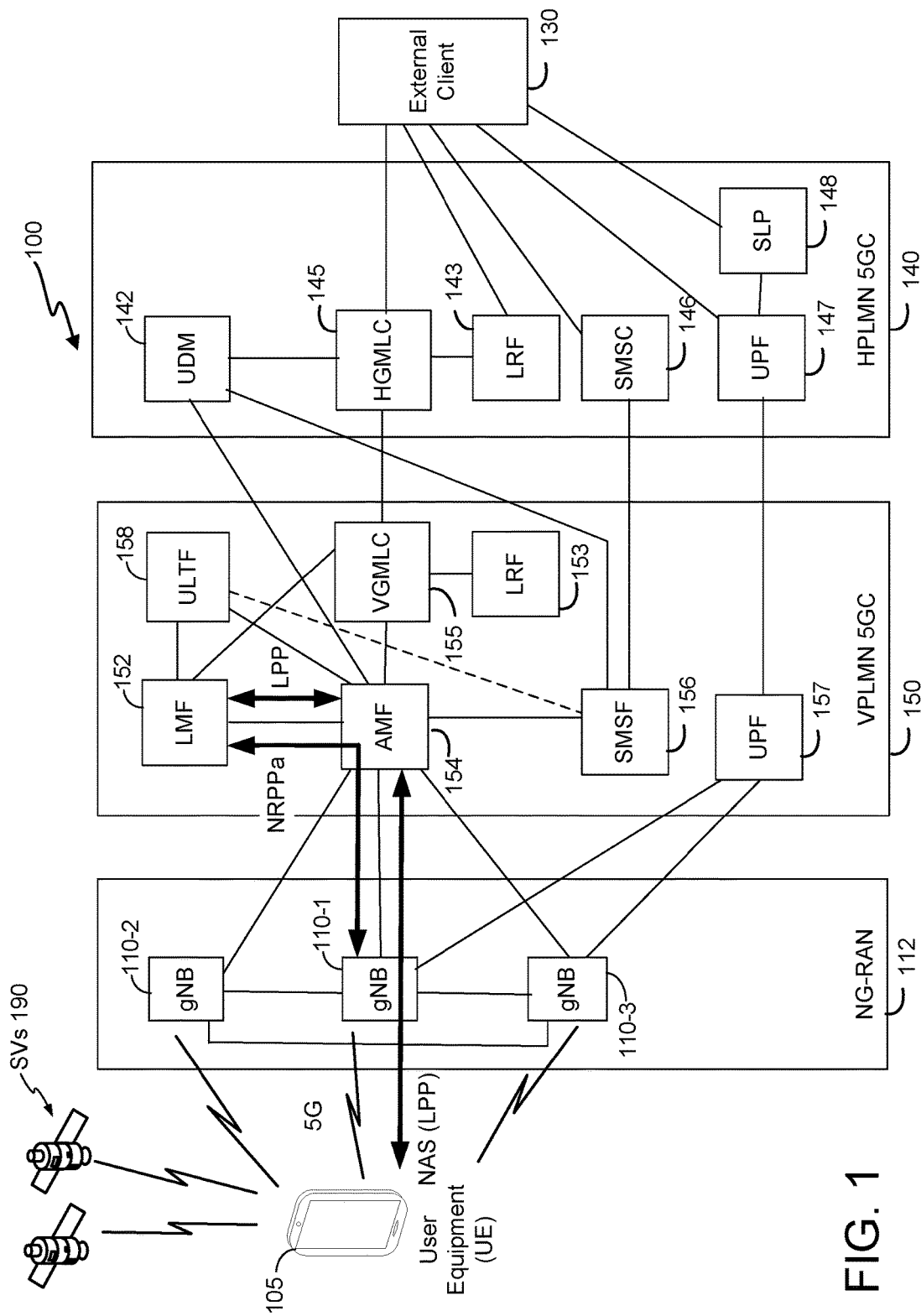
FIG. 1 shows a diagram of a communication system capable of uplink (UL) high efficiency transport of location and other information from a user equipment (UE).

Like reference numbers and symbols in the various figures indicate like elements, in accordance with certain example implementations. In addition, multiple instances of an element may be indicated by following a first number for the element with a hyphen and a second number. For example, multiple instances of an element 110 may be indicated as 110-1, 110-2, 110-3 etc. When referring to such an element using only the first number, any instance of the element is to be understood (e.g. elements 110 in the previous example would refer to elements 110-1, 110-2 and 110-3).

DETAILED DESCRIPTION

A communication system implementing uplink (UL) high efficiency transport of location information from a user equipment (UE), as disclosed herein, may perform one or more of the following: (a) permanently (or semi-permanently) assign a location server (LS) to a UE to avoid the overhead of repeated assignment and release of an LS; (b) assign a signaling channel (or signaling connection) to a UE only in a radio access network (RAN) and not involve a core network (CN); (c) omit authentication and ciphering in real time; (d) omit direct UE-LS interaction except at the start of a series of location event reports from a UE; and/or (e) perform location computation in batch mode rather than in real time. The UL high efficiency transport capability used to transport location information from a UE may also be used to support other services where a UE sends small amounts of data to a network or to an external entity via a network. As an example, an UL high efficiency transport capability may be used to efficiently transfer small amounts of data and/or SMS messages from a UE to some other UE or to an external client.

By way of example, UL high efficiency transport of location information from a UE may operate as follows in a Fifth Generation (5G) network for the case of location information that is sent based on the occurrence of periodic or triggered events detected by the UE. In a first stage, a periodic or triggered location session is initiated with a target UE by an LS. In a second stage, the UE may enter an idle state during which it monitors the periodic or triggering event. After detecting an event, the UE obtains downlink (DL) location measurements and determines a nearby serving 5G base station such as a New Radio NodeB (referred to by 3GPP as an gNB). For example, the DL location measurements may be one or more of a Reference Signal Time Difference (RSTD), a Receive-Transmit (Rx-Tx) time difference, an Angle of Arrival (AOA), a Round Trip signal propagation Time (RTT), an Angle of Departure (AOD), a Reference Signal Strength Indication (RSSI), a Reference Signal Received Power (RSRP), a Reference Signal Received Quality (RSRQ), a pseudorange for a Global Navigation Satellite System (GNSS), a code phase for a GNSS, a carrier phase for a GNSS etc. Optionally, the UE may compute a location estimate using the DL location measurements if capable. The UE then requests and obtains an uplink (UL) signaling channel (or UL signaling connection) from a serving gNB. The UL signaling channel may not be a normal signaling connection but rather a temporary connection between the UE and gNB only. The UE then sends the DL measurements and/or location estimate to the gNB—e.g. using a Radio Resource Control (RRC) protocol. The UE includes a UE identification (ID), an LS ID, information to authenticate the UE ID and the location information (e.g. which may in some cases be ciphered). The gNB acknowledges the location information and releases the UL signaling channel. The gNB may optionally compute or verify the UE location (e.g. if the location information is not ciphered). The gNB may batch and transmit the received (or computed) location information to the indicated LS. The LS may compute or verify the UE location. The LS may then send the UE location to an external client.

Thus, for each location, there will be only a small amount of signaling between the UE and a gNB. Moreover, the gNB may transmit the location information to an LS using a single message, which may include information from multiple UEs. Accordingly, resource usage by the UE, gNB and LS is reduced compared to conventional techniques.

The term "UL high efficiency transport" as used herein may be referred to by other terms such as "UL connectionless transport", or "UL connectionless transfer". The term refers to a capability to send small amounts of information (e.g. a few hundred octets of information) from a UE to a wireless network using minimal resources in a UE and near minimal resources in a wireless network. While most examples herein concern UL high efficiency transport of location information, the same techniques may be used to transfer other types of information such as data or SMS messages, as will be shown in more detail later herein. The term "periodic or triggered location" as used herein may also be referred to as "periodic and triggered location" and refers to obtaining location for a UE following a periodic event or a triggered event such as a UE entering or leaving a defined geographic area.

FIG. 1 shows a diagram of a communication system 100, according to an embodiment. The communication system 100 may be configured to implement UL high efficiency transport of location information from a UE. Here, the communication system 100 comprises a UE 105, and components of a Fifth Generation (5G) network, comprising a visited network Next Generation RAN (NG-RAN) 112, a visited network 5G Core Network (5GC) 150 and a home network 5GC 140. The home network 5GC 140 is for a Home Public Land Mobile Network (HPLMN) for the UE 105 and communicates with the 5GC 150 which is for a Visited Public Land Mobile Network (VPLMN) that communicates with the UE 105. A 5G network may also be referred to as a New Radio (NR) network or as a 5G System (5GS); NG-RAN 112 may be referred to as an NR RAN or a 5G RAN; and 5GC 140 and 150 may be referred to as an NG Core network (NGC). Standardization of an NG-RAN and 5GC is ongoing in 3GPP. Accordingly, NG-RAN 112 and 5GC 140, 150 may conform to current or future standards for 5G support from 3GPP without loss of applicability of the present disclosure. The communication system 100 may further utilize information from satellite vehicles (SVs) 190 for a Global Navigation Satellite System (GNSS) like the Global Positioning System (GPS), GLONASS, Galileo, Beidou or some other local or regional Satellite Positioning System (SPS) such as IRNSS, EGNOS or WAAS. Additional components of the communication system 100 are described below. The communication system 100 may include additional or alternative components.

It should be noted that FIG. 1 provides only a generalized illustration of various components, any or all of which may be utilized as appropriate, and each of which may be duplicated or omitted as necessary. Specifically, although only one UE 105 is illustrated, it will be understood that many UEs (e.g., hundreds, thousands, millions, etc.) may utilize the communication system 100. Similarly, the communication system 100 may include a larger or smaller number of SVs 190, gNBs 110, external clients 130, and/or other components. The illustrated connections that connect the various components in the communication system 100 include data and signaling connections which may include additional (intermediary) components, direct or indirect physical and/or wireless connections, and/or additional networks. Furthermore, components may be rearranged, combined, separated, substituted, and/or omitted, depending on desired functionality.

While FIG. 1 illustrates a 5G-based network, similar network implementations and configurations may be used for other communication technologies, such as 3G, Long Term Evolution (LTE), IEEE 802.11 WiFi (also referred to as Wi-Fi) etc.

The UE 105, as used herein, may be an electronic device and may be referred to as a device, a mobile device, a wireless device, a mobile terminal, a terminal, a wireless terminal, a mobile station (MS), a Secure User Plane Location (SUPL) Enabled Terminal (SET), or by some other name. Moreover, UE 105 may correspond to a cellphone, smartphone, laptop, tablet, PDA, tracking device or some other portable or moveable device. In some cases, a UE 105 may be part of some other entity—e.g. may be a chipset supporting a modem that is integrated into some larger mobile entity such as a vehicle, drone, package, shipment, robotic device etc. Typically, though not necessarily, the UE 105 may support wireless communication using one or more Radio Access Technologies (RATs) such as Global System for Mobile communication (GSM), Code Division Multiple Access (CDMA), Wideband CDMA (WCDMA), LTE, High Rate Packet Data (HRPD), IEEE 802.11 WiFi, Bluetooth® (BT), Worldwide Interoperability for Microwave Access (WiMAX), 5G new radio (NR) (e.g., using the NG-RAN 112 and 5GC 140, 150), etc. The UE 105 may also support wireless communication using a Wireless Local Area Network (WLAN) which may connect to other networks (e.g. the Internet) using a Digital Subscriber Line (DSL) or packet cable for example. The use of one or more of these RATs may allow the UE 105 to communicate with an external client 130 (via elements of 5GC 140, 150 not shown in FIG. 1, or possibly via a Gateway Mobile Location Center (GMLC) 145 or 155) and/or allow the external client 130 to receive location information regarding the UE 105 (e.g., via the GMLC 145 or 155).

The UE 105 may include a single entity or may include multiple entities such as in a personal area network where a user may employ audio, video and/or data I/O devices and/or body sensors and a separate wireline or wireless modem. An estimate of a location of the UE 105 may be referred to as a location, location estimate, location fix, fix, position, position estimate or position fix, and may be geodetic, thus providing location coordinates for the UE 105 (e.g., latitude and longitude) which may or may not include an altitude component (e.g., height above sea level, height above or depth below ground level, floor level or basement level). Alternatively, a location of the UE 105 may be expressed as a civic location (e.g., as a postal address or the designation of some point or small area in a building such as a particular room or floor). A location of the UE 105 may also be expressed as an area or volume (defined either geodetically or in civic form) within which the UE 105 is expected to be located with some probability or confidence level (e.g., 67%, 95%, etc.) A location of the UE 105 may further be a relative location comprising, for example, a distance and direction or relative X, Y (and Z) coordinates defined relative to some origin at a known location which may be defined geodetically, in civic terms, or by reference to a point, area, or volume indicated on a map, floor plan or building plan. In the description contained herein, the use of the term location may comprise any of these variants unless indicated otherwise. When computing the location of a UE, it is common to solve for local x, y, and possibly z coordinates and then, if needed, convert the local coordinates into absolute ones (e.g. for latitude, longitude and altitude above or below mean sea level).

Base stations (BSs) in the NG-RAN 112 shown in FIG. 1 comprise NR NodeBs, also referred to as gNBs, 110-1, 110-2 and 110-3 (collectively and generically referred to herein as gNBs 110). Pairs of gNBs 110 in NG-RAN 112 may be connected to one another—e.g. directly as shown in FIG. 1 or indirectly via other gNBs 110. Access to the 5G network is provided to UE 105 via wireless communication between the UE 105 and one or more of the gNBs 110, which may provide wireless communication access to the 5GC 150 on behalf of the UE 105 using 5G (e.g., NR). In FIG. 1, the serving gNB for UE 105 is assumed to be gNB 110-1, although other gNBs (e.g. gNB 110-2 and/or gNB 110-3) may act as a serving gNB if UE 105 moves to another location or may act as a secondary gNB to provide additional throughout and bandwidth to UE 105. Some gNBs 110 in FIG. 1 (e.g. gNB 110-2 or gNB 110-3) may be configured to function as positioning-only beacons which may transmit signals (e.g. a Positioning Reference Signal (PRS)) to assist positioning of UE 105 but may not receive signals from UE 105 or from other UEs.

As noted, while FIG. 1 depicts nodes configured to communicate according to 5G communication protocols, nodes configured to communicate according to other communication protocols, such as, for example, the LTE protocol, may be used. Such nodes, configured to communicate using different protocols, may be controlled, at least in part, by the 5GC 150. Thus, the NG-RAN 112 may include any combination of gNBs, evolved Node Bs (eNBs) supporting LTE access, or other types of base stations or access points. As an example, NG-RAN 112 may include one or more next generation eNBs (ng-eNBs) which provide LTE wireless access to UE 105 and which may connect to gNBs 110 in NG-RAN 112 and/or to entities in 5GC 150 such as an Access and Mobility Management Function (AMF) 154 and a User Plane Function (UPF) 157.

The gNBs 110 can communicate with the AMF 154, which, for positioning functionality, communicates with a Location Management Function (LMF) 152. The AMF 154 may support mobility of the UE 105, including cell change and handover and may participate in supporting a signaling connection to the UE 105 and possibly helping establish and release Protocol Data Unit (PDU) sessions for UE 105. Other functions of AMF 154 may include: termination of a control plane (CP) interface from NG-RAN 112; termination of Non-Access Stratum (NAS) signaling connections from UEs such as UE 105, NAS ciphering and integrity protection; registration management; connection management; reachability management; mobility management; transport of SMS messages between UE 105 and SMS Function (SMSF) 156; access authentication and authorization.

The LMF 152 may support positioning of the UE 105 when UE 105 accesses the NG-RAN 112 and may support position procedures/methods such as Assisted GNSS (A-GNSS), Observed Time Difference of Arrival (OTDOA), Real Time Kinematics (RTK), Precise Point Positioning (PPP), Differential GNSS (DGNSS), Enhanced Cell ID (ECID), angle of arrival (AOA), angle of departure (AOD), WLAN positioning and/or other position methods. The LMF 152 may also process location services requests for the UE 105, e.g., received from the AMF 154 or from the Visited GMLC (VGMLC) 155. In some embodiments, a node/system that implements the LMF 152 may additionally or alternatively implement other types of location-support modules, such as an Enhanced Serving Mobile Location Center (E-SMLC) or a Secure User Plane Location (SUPL) Location Platform (SLP). It will be noted that in some embodiments, at least part of the positioning functionality (including derivation of the location of UE 105) may be performed at the UE 105 (e.g., using signal measurements obtained by UE 105 for signals transmitted by wireless nodes such as gNBs 110, and assistance data provided to the UE 105, e.g. by LMF 152). The LMF 152 may be referred to by other names such as a Location Manager (LM), Location Function (LF), commercial LMF (CLMF) or value added LMF (VLMF).

The VGMLC 155 may support a location request for the UE 105 received from an external client 130 or from a Home GMLC (HGMLC) 145 and may forward such a location request to the AMF 154 for forwarding by the AMF 154 to the LMF 152 or may forward the location request directly to the LMF 152. A location response from the LMF 152 (e.g. containing a location estimate for the UE 105) may be similarly returned to VGMLC 155 either directly or via the AMF 154 and the VGMLC 155 may then return the location response (e.g., containing the location estimate) to the external client 130 or to HGMLC 145. The VGMLC 155 is shown connected to both the AMF 154 and LMF 152, but only one of these connections may be supported by 5GC 150 in some implementations.

A Location Retrieval Function (LRF) 153 may be connected to the VGMLC 155 and an LRF 143 may be connected to the HGMLC 145, as defined in 3GPP Technical Specification (TS) 23.271. LRFs 153 and 143 may perform the same or similar functions to VGMLC 155 and HGMLC 145, respectively, with respect to receiving and responding to a location request from an external client 130 that corresponds to a Public Safety Answering Point (PSAP) supporting an emergency call from UE 105.

The SMS Function (SMSF) 156 may support transport of SMS messages to and from UE 105 and may include support for SMS transport over NAS, SMS subscription checking, and relaying of an SMS message between the UE 105 and an SMS Gateway Mobile Services Switching Center (SMS-GMSC) or SMS Center (SMSC) 146 in the HPLMN 140.

As further illustrated in FIG. 1, the LMF 152 and gNBs 110 may communicate using a New Radio Position Protocol A (which may be referred to as NPPa or NRPPa).

NRPPa may be defined in 3GPP TS 38.455 and may be the same as, similar to, or an extension of the LTE Positioning Protocol A (LPPa) defined in 3GPP Technical Specification (TS) 36.455, with NRPPa messages being transferred between the gNBs 110 and the LMF 152 via the AMF 154. As further illustrated in FIG. 1, LMF 152 and UE 105 may communicate using the LTE Positioning Protocol (LPP) defined in 3GPP TS 36.355, where LPP messages are transferred inside NAS transport messages between the UE 105 and the AMF 154 via a serving gNB 110-1 for UE 105, and where AMF 154 relays the LPP messages to and from LMF 152. For example, LPP messages may be transferred between the LMF 152 and the AMF 154 using a 5GC transport protocol (e.g. supporting an AMF communication service operation) and may be transferred between the AMF 154 and the UE 105 using a 5G Non-Access Stratum (NAS) protocol. The LPP protocol may be used to support positioning of UE 105 using UE assisted and/or UE based position methods such as A-GNSS, RTK, OTDOA, ECID and/or WLAN positioning. The NRPPa protocol may be used to support positioning of UE 105 using network based position methods such as ECID (e.g. when used with measurements obtained by a gNB 110 of signals transmitted by UE 105) and/or may be used by LMF 152 to obtain location related information from gNBs 110. For example, location related information provided by the gNBs 110 to the LMF 152 using NRPPa may include timing and configuration information for PRS transmission from gNBs 110 and/or location coordinates of the gNBs 110. The LMF 152 can then provide some or all of this location related information to the UE 105 as assistance data in an LPP message via the NG-RAN 112 and the 5GC 150.

An LPP message sent from the LMF 152 to the UE 105 may instruct the UE 105 to do any of a variety of things, depending on desired functionality. For example, the LPP message could contain an instruction for the UE 105 to obtain measurements for GNSS (or A-GNSS), WLAN, and/or OTDOA (or some other position method). In the case of OTDOA, the LPP message may instruct the UE 105 to obtain one or more measurements (e.g. RSTD measurements) of PRS signals transmitted within particular cells supported by particular gNBs 110 (or supported by one or more ng-eNBs or eNBs). The UE 105 may send the measurements back to the LMF 152 in an LPP message (e.g. inside a 5G NAS message) via the serving gNB 110-1 and the AMF 154.

In some embodiments, LPP may be augmented by or replaced by an NR positioning protocol (NPP or NRPP) which supports position methods such as OTDOA and ECID for NR radio access. For example, an LPP message may contain an embedded NPP message or may be replaced by an NPP message.

VPLMN 5GC 150 may also contain an uplink (UL) transport function (ULTF) 158 which may support UL high efficiency transport of location information for UE 105 as described later herein. ULTF 158 may be connected to one or more AMFs in 5GC 150 (e.g. AMF 154), to LMF 152 and/or to SMSF 156. In some implementations, ULTF 158 may be connected to one or more gNBs 110 in NG-RAN 112. In some embodiments, ULTF 158 may be combined with another entry such as with LMF 152, SMSF 156 or AMF 154. ULTF 158 may be referred to by other names such as an UL relay function, an UL management function, an UL transport function or a small data transport function.

As illustrated, HPLMN 140 includes a Unified Data Management (UDM) 142 and a Home GMLC (HGMLC) 145 that may be connected to the VGMLC 155 (e.g., via the Internet), as well as a User Plane Function (UPF) 147 that may be connected to a UPF 157 in the VPLMN 150. The UDM 142 is analogous to a Home Subscriber Server (HSS) for LTE access, and if desired, the UDM 142 may be combined with an HSS. The UDM 142 is a central database that contains user-related and subscription related information for UE 105 and may perform the following functions: UE authentication, UE identification, access authorization, registration and mobility management, subscription management and SMS management. The UPF 147 may support voice and data bearers for UE 105 and may enable UE 105 voice and data access to other networks such as the Internet. UPF functions may include: external PDU session point of interconnect to a Data Network, packet (e.g. Internet Protocol (IP)) routing and forwarding, packet inspection and user plane part of policy rule enforcement, Quality of Service (QoS) handling for user plane, downlink packet buffering and downlink data notification triggering.

HPLMN 140 further includes an SMS Center (SMSC) 146 which may support SMS transfer to and from UE 105 and may act as a central store and forward center for all SMS messages sent to or sent from UE 105. SMSC 146 may use one or more SMS gateways (not shown in FIG. 1) to access other entities such as external client 130 and SMSF 156.

The UPF 147 may be connected to a location server (LS), such as a SUPL Location Platform (SLP) 148. The SLP 148 may support the SUPL user plane (UP) location solution defined by the Open Mobile Alliance (OMA) and may support location services for UE 105 based on subscription information for UE 105 stored in SLP 148. The SLP 148 may be a home SLP (H-SLP) for UE 105. In some embodiments of communication system 100, a Discovered SLP (D-SLP) or Emergency SLP (E-SLP) (not shown in FIG. 1), in or accessible from VPLMN 5GC 150 (e.g. connected to UPF 157), may be used to locate UE 105 using the SUPL UP solution. SLP 148 and LMF 152 in communication system 100 are both examples of an LS that may employ the LPP and/or LPP/NPP protocols for positioning of UE 105.

In a CP location solution, such as the 3GPP CP location solution defined in 3GPP TS 23.271 and TS 36.305, signaling (e.g. including LPP, LPP/NPP and other messages) to support location of UE 105 may be transferred between participating entities (e.g. VGMLC 155, gNB 110, LMF 152 and UE 105) using signaling interfaces and protocols for VPLMN 5GC 150 and HPLMN 5GC 140. In contrast, in a UP location solution such as SUPL, signaling (e.g. such as SUPL messages carrying embedded LPP and/or LPP/NPP messages) to support location of UE 105 may be transferred between participating entities (e.g. UE 105 and SLP 148) using data bearers (e.g. using the Internet Protocol (IP)).

The HGMLC 145 may be connected to UDM 142 for UE 105. HGMLC 145 may provide location access to UE 105 on behalf of external clients such as external client 130. One or more of HGMLC 145, SMSC 146, UPF 147, LRF 143 and SLP 148 may be connected to external client 130, e.g., through another network, such as the Internet. In some cases, a Requesting GMLC (RGMLC) located in another PLMN (not shown in FIG. 1) may be connected to HGMLC 145 (e.g., via the Internet) in order to provide location access to UE 105 on behalf of external clients connected to the RGMLC. The RGMLC, HGMLC 145 and VGMLC 155 may support location access to UE 105 using the 3GPP CP solution defined in 3GPP TS 23.271 and in 3GPP TS 23.501 and 3GPP TS 23.502.

It should be understood that while a VPLMN 150 and a separate HPLMN 140 are illustrated in FIG. 1, both PLMNs (networks) may be the same PLMN. In that case, (i) SLP 148, SMSC 146 and UDM 142 may be in the same 5GC as AMF 154, ULTF 158 and LMF 152, (ii) 5GC 150 and 5GC 140 may be the same 5GC, (iii) VGMLC 155 and HGMLC 145 may be the same GMLC, (iv) LRF 143 and LRF 153 may be the same LRF, and (v) UPF 157 and UPF 147 may be the same UPF.

As noted, while the communication system 100 is described in relation to 5G technology, the communication system 100 may be implemented to support other communication technologies, such as GSM, WCDMA, LTE, WiFi, etc., that are used for supporting and interacting with mobile devices such as the UE 105 (e.g., to implement voice, data, positioning, and other functionalities). In some such embodiments, the 5GC 150 may be configured to control other RANs, such as the Evolved Universal Terrestrial Radio Access Network (E-UTRAN) comprising one or more evolved Node Bs (eNBs) in place of the gNBs 110 and/or one or more WLANs comprising WiFi access points. In some embodiments, both the NG-RAN 112 and the 5GC 140, 150 may be replaced by other RANs and other core networks. For example, in an Evolved Packet System (EPS) defined by 3GPP to support LTE access: the UE 105 may access the EPS rather than the NG-RAN 112 and 5GC 150; the NG-RAN 112 may be replaced by an E-UTRAN containing eNBs in place of the gNBs 110; and the 5GC 140 may be replaced by an Evolved Packet Core (EPC) comprising a Mobility Management Entity (MME) in place of the AMF 154, an Enhanced Serving Mobile Location Center (E-SMLC) in place of the LMF 152 and a GMLC that may be similar or identical to the VGMLC 155. In such an EPS, the E-SMLC may use LPPa in place of NRPPa to send and receive location information to and from the eNBs in the E-UTRAN and may use LPP to support positioning of UE 105. In addition, in some implementations, base stations (e.g. similar to or based on a gNB 110 or eNB) may function as positioning only beacons and transmit signals (e.g. PRS) to assist positioning of a UE 105 but not receive signals.

Figure 2:
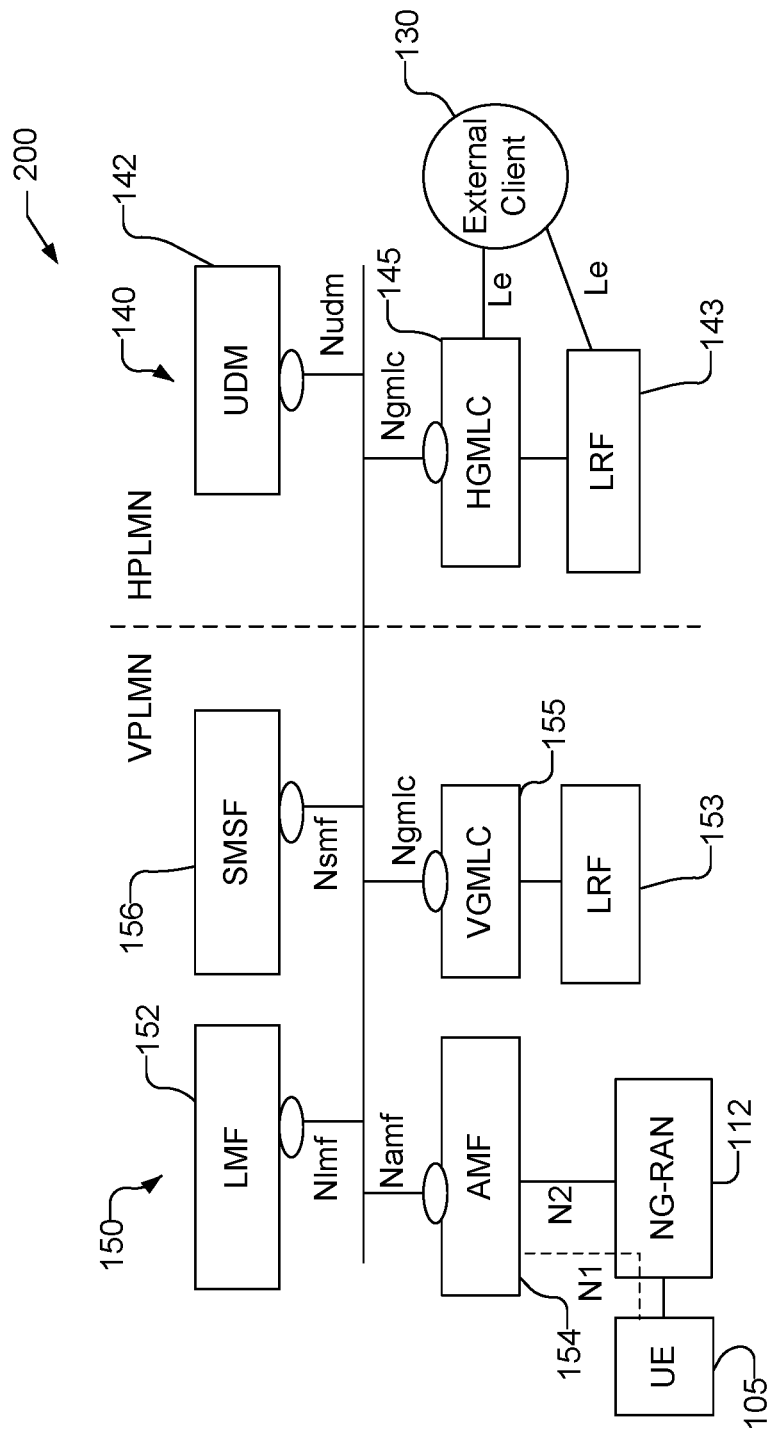
FIG. 2 shows an architecture for UL high efficiency transport of location and other information from a UE using a service based interface (SBI) representation.

FIG. 2 shows an architecture 200 for location services and UE 105 information transfer for roaming scenarios using a service based interface (SBI) representation. Here, N1 is the Reference point for transport of location related signaling (e.g. LPP messages) between UE 105 and LMF 152 via AMF 154, N2 is the Reference point to support location related signaling (e.g. transport of NRPPa messages) between AMF 154 and NG-RAN 112. Le is the reference point for Location Services (LCS) between HGMLC 145 or LRF 153 and External Client 130, as defined in 3GPP TS 23.271. The following SBIs are shown in FIG. 2. Ngmlc is the SBI exhibited by VGMLC 155 and HGMLC 145. Nlmf is the SBI exhibited by LMF 152. Namf is the SBI exhibited by AMF 154. Nudm is the SBI exhibited by the UDM 142. Nsmsf is the SBI exhibited by the SMSF 156. The SBIs shown in FIG. 2 may be as defined in 3GPP TS 23.502.

Examples of UL high efficiency transport of location information are described next with respect to FIGS. 3-9. It is noted that use of LMF 152 to support location of UE 105 is assumed in each figure. However, in an alternative embodiment, use of a different location server from LMF 152 such as an SLP (e.g. SLP 148) or an E-SMLC is possible. Further, each of FIGS. 3-9 assumes use of NR radio access by UE 105 to support UL high efficiency transport of location information. However, in other embodiments, other types of radio access may be used by UE 105 such as LTE or IEEE 802.11 WiFi. In these cases, gNB 110-1 in FIGS. 3-11 may be replaced by a different base station or access point for the radio access used by UE 105—e.g. with gNB 110-1 being replaced by an eNB or ng-eNB in the case of LTE radio access by UE 105 or by a Non-3GPP Interworking Function (N3IWF) as described in 3GPP TS 23.501 in the case of IEEE 802.11 WiFi access by UE 105.

Figure 3:
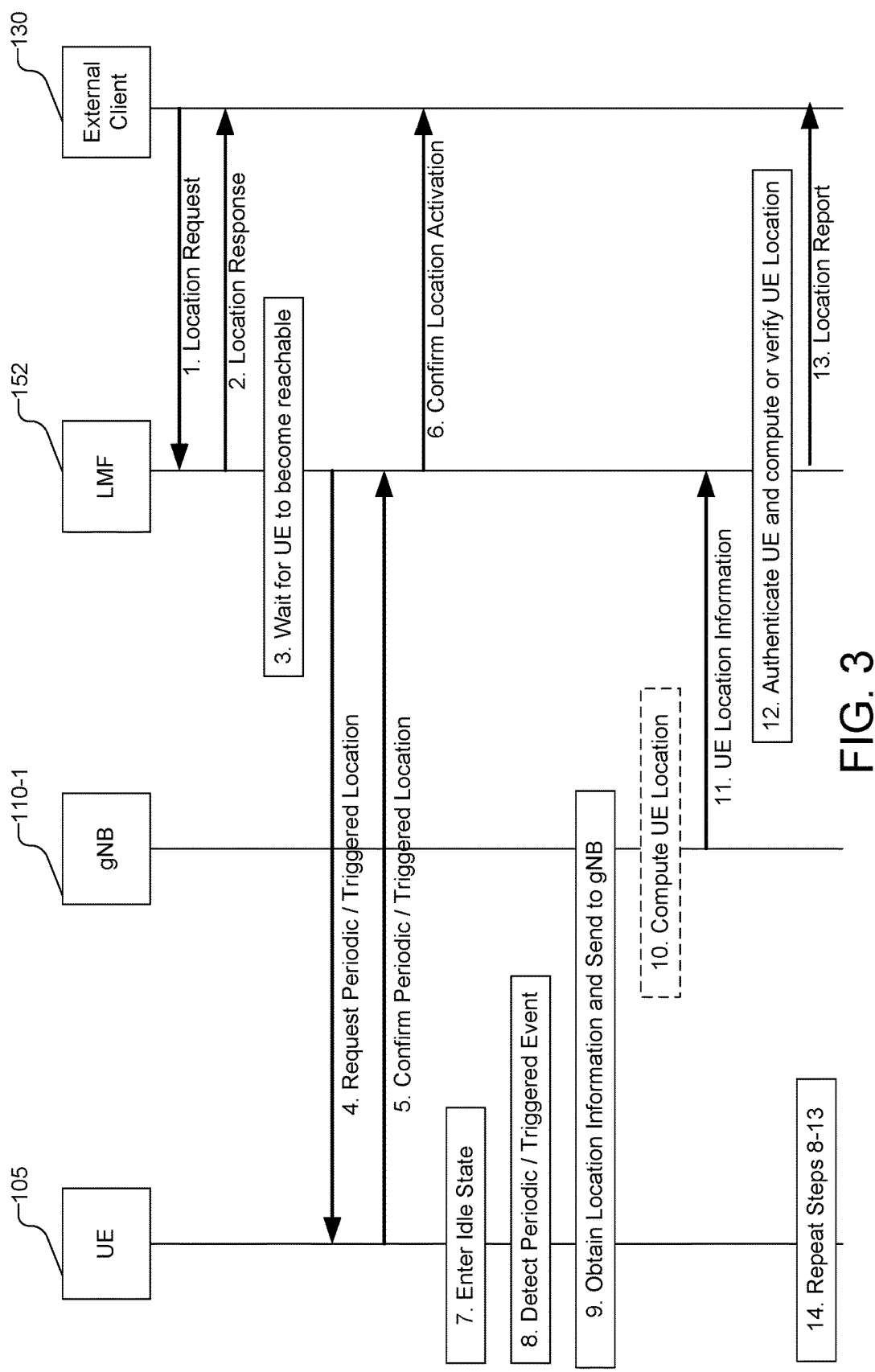
FIGS. 3 and 4 show signaling flows that illustrate UL high efficiency transport of location information from a user equipment (UE) for a 5G network.

FIG. 3 shows a signaling flow illustrating the use of UL high efficiency transport of location information from UE 105 in more detail for the 5G VPLMN of FIGS. 1 and 2 (comprising NG-RAN 112 and 5GC 150).

At stage 1 in FIG. 3, external client 130 sends a request for periodic or triggered location of UE 105 to LMF 152 (e.g. via VGMLC 155 and/or HGMLC 145). Examples of location triggering may include the UE 105 moving by more than a threshold distance; UE 105 entering a new cell or new network tracking area; UE 105 entering, leaving or remaining within a defined geographic area; or UE 105 exceeding a certain velocity. More than one type of location event trigger may also be requested. For example, external client 130 may request location event reports for UE 105 at fixed periodic intervals and when certain location trigger events occur such as UE 105 moving by more than a threshold distance from a previous location of UE 105 or UE 105 entering or leaving a defined geographic area.

At stage 2, LMF 152 confirms acceptance of the request.

At stage 3, LMF 152 waits for the target UE 105 to become reachable, e.g., no longer in an extended Discontinuous Reception (eDRX) mode or Power Saving Mode (PSM). This may involve being notified of UE 105 reachability by serving AMF 154 (e.g. using an event exposure notify service operation supported by AMF 154 as defined in 3GPP TS 23.502 to notify LMF 152 when UE 105 becomes reachable).

At stage 4, LMF 152 sends a request (e.g. an LPP request) to the (now reachable) target UE 105 (e.g. via serving AMF 154 and gNB 110-1) for periodic or triggered location of UE 105. The LMF 152 includes all information needed to enable UE 105 to perform subsequent stages 8 and 9. The request may indicate the types of location information the UE 105 needs to obtain at stage 9 (e.g. such as particular position measurements for one or more position methods or a location estimate for UE 105), an identity or identifier (ID) for the LMF 152, a set of UE identifiers (IDs) for the UE 105, a ciphering key (or other information to enable ciphering) and/or authentication related information. The request sent at stage 4 may be ciphered and not readable by unauthorized entities. In some embodiments, the ID for LMF 152 sent at stage 4 may be part of the UE ID and may not be a separate parameter.

At stage 5, UE 105 returns a response (e.g. an LPP response) to LMF 152 (e.g. via gNB 110-1 and AMF 154) confirming acceptance of the request.

At stage 6, LMF 152 confirms activation of periodic or triggered location in the target UE 105 to the external client 130.

At stage 7, UE 105 enters idle state (e.g. eDRX or PSM) in which there is no signaling connection between UE 105 and NG-RAN 112 and/or 5GC 150.

At stage 8, UE 105 periodically monitors for the requested periodic or triggered location event(s) and determines when an event has occurred. After an event is detected by UE 105 at stage 8, UE 105 proceeds to stage 9.

At stage 9, UE 105 obtains requested location information (e.g. visible cell IDs, DL location measurements and/or a location estimate for UE 105), selects a suitable serving cell and serving gNB, and sends the obtained location information to the serving gNB as described more fully below for FIG. 4. In this example, the serving gNB is assumed to be gNB 110-1 but could be another gNB 110 different from gNB 110-1. Minimally, the identities of the serving gNB and/or the serving cell selected by UE 105 at stage 9 serve as the location information and UE 105 obtains no additional location information at stage 9. UE 105 includes a UE identifier or identity (ID) and the LMF ID (e.g. if the LMF ID is separate from and not part of the UE ID), as received at stage 4, with the location information sent to the serving gNB at stage 9. UE 105 may also include authentication information for the UE 105 ID in the information sent to gNB 110-1 at stage 9.

At stage 10, gNB 110-1 may optionally compute a location estimate for UE 105 from the location information received at stage 9, and optionally from any UL location measurements obtained by gNB 110-1 for signals transmitted by UE 105, or may verify a location estimate for UE 105 received from UE 105 at stage 9.

At stage 11, gNB 110-1 sends the received location information or the location estimate for UE 105 computed or verified at stage 10, along with any other information received from UE 105 at stage 9 and/or any other information obtained by gNB 110-1 for UE 105 (e.g. such as UL location measurements obtained by gNB 110-1 of signals transmitted by UE 105), to the LMF 152 indicated by the LMF ID (or the UE ID) received at stage 9. The gNB 110-1 may send (e.g. batch) location information received from multiple UEs to LMF 152 to reduce signaling. GNB 110-1 may send the location information directly to LMF 152 if gNB 110-1 is connected to LMF 152 (e.g. via a VPLMN intranet) or may send the location information to LMF 152 via an intermediate AMF such as AMF 154. In an embodiment, the location information and other information sent by gNB 110-1 to LMF 152 at stage 11 may be sent as part of an LPPa or NRPPa message.

At stage 12, LMF 152 identifies the UE 105 using the received UE ID, authenticates the received UE ID using any received authentication information for the UE ID and computes or verifies a location estimate for UE 105 from the received location information (e.g. which may include location information sent by UE 105 at stage 4 (and stage 5) and/or UL location measurements obtained by gNB 110-1 at stage 11).

At stage 13, LMF 152 forwards the UE 105 location estimate and/or an event report to the external client 130. Optionally (not shown in FIG. 3), LMF 152 may later send updated information to UE 105 regarding the periodic or triggered location session after the UE 105 becomes reachable. For example, the updated information may change the periodic or triggered location requirements, may terminate the periodic or triggered location session or may provide additional information to the UE 105 for the periodic or triggered location session such as additional UE IDs for reporting of location events.

At stage 14. UE 105 initiates a repetition of stages 8-13 for further periodic or trigger events and may cease when a maximum duration or maximum number of event reports has been reached.

Figure 4:
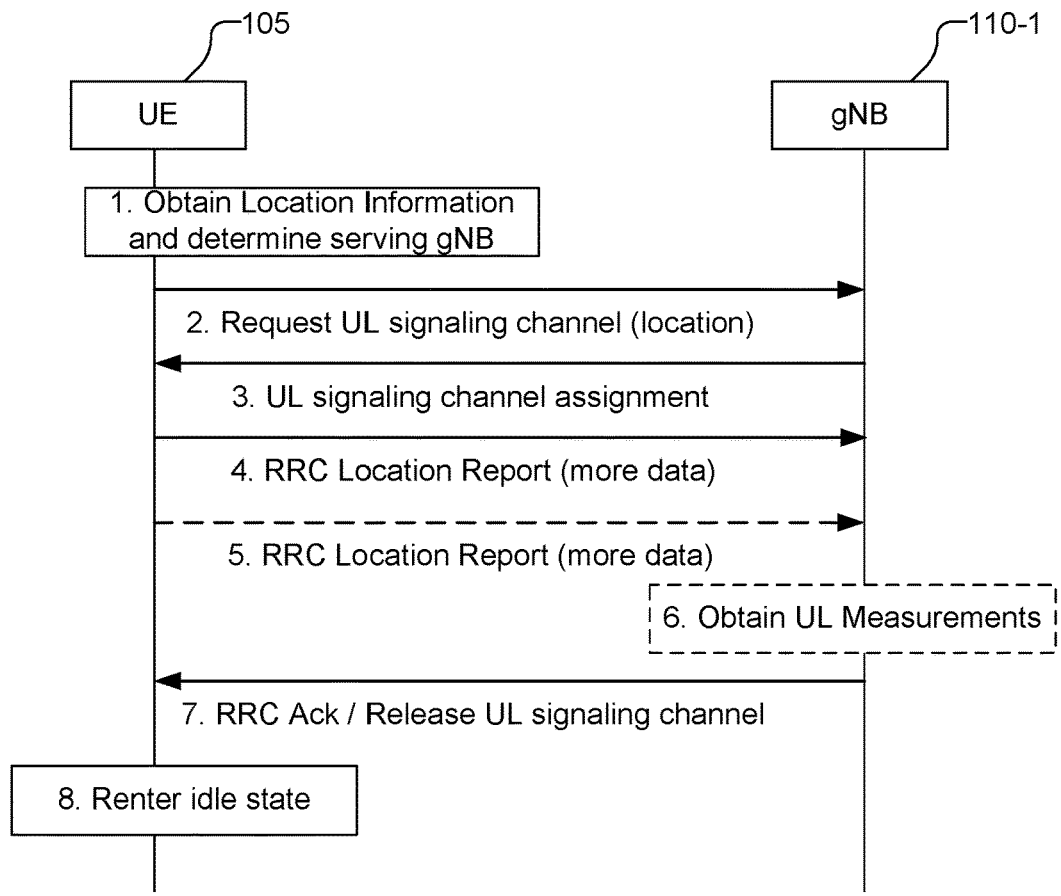

FIG. 4 shows more details of stage 9 in FIG. 3 for one example embodiment.

At stage 1 in FIG. 4, UE 105 obtains location information requested at stage 4 of FIG. 3 (e.g. visible cell IDs, DL measurements of nearby cells and possibly nearby WLAN Access Points (APs), Bluetooth (BT) APs and/or GNSS SVs, and/or a location estimate). UE 105 may obtain assistance data (AD) for such measurements (e.g. AD for OTDOA RSTD measurements or AD for GNSS pseudorange measurements) from assistance data broadcast by a nearby gNB such as gNB 110-1. UE 105 also determines a suitable serving cell and serving gNB which in this example is gNB 110-1 (though could be any other gNB 110 in NG-RAN 112). Minimally, the identity of the serving cell and/or the identity of the serving gNB selected by UE 105 serves as the location information.

At stage 2 in FIG. 4, UE 105 sends a request for an UL signaling channel (or connection) to the serving gNB 110-1, e.g. using a random-access channel (RACH) channel. The request may indicate that the channel request is for location (e.g. is for UL high efficiency transport of location information) and may include a temporary UE ID (e.g. chosen randomly by UE 105). The request may use shared (contention-based) RACH signaling for NR radio access or dedicated preassigned RACH signaling.

At stage 3, gNB 110-1 sends UL signaling channel (or connection) assignment information to UE 105 and may include any temporary UE ID included by UE 105 at stage 2 to identify UE 105. GNB 110-1 may also include information to enable reception by UE 105 of future DL signaling from gNB 110-1 to UE 105 (e.g. as at stage 7). The information sent at stage 3 may establish an UL (or an UL plus DL) signaling channel (or connection) between UE 105 and gNB 110-1, which may also be referred to as an UL signaling connection, a signaling connection or a temporary signaling connection. However, the UL signaling channel may not be visible to or usable by any other element in NG-RAN 112 or 5GC 150 such as AMF 154 and may therefore require fewer resources than a signaling connection used by UE 105 when in connected state (e.g. as at stages 4-5 in FIG. 3). Furthermore, during stages 2-7 of FIG. 4, UE 105 may not be reachable by any element in 5GC 150 such as by AMF 154 or by LMF 152.

At stage 4, UE 105 uses the UL signaling channel assignment received at stage 3 to send a positioning message to gNB 110-1 containing some or all of the location information obtained by UE 105 at stage 1 plus the UE ID for UE 105, the LMF ID for LMF 152 (if separate from the UE ID) and possibly authentication information. The positioning message is assumed to be (and referred to as) a Radio Resource Control (RRC) location report message here though could be another RRC message or a message for a different protocol. The RRC location report message is not ciphered (though the included location information may be ciphered). UE 105 may indicate that more location information needs to be sent if not all of the location information can be included in one RRC location report message. UE 105 and gNB 110-1 may use lower protocol levels to support RRC message segmentation, error detection and/or error correction in order to transport the RRC location report message from UE 105 to gNB 110-1 completely and without errors. It is noted that while an RRC location report message is described for stage 4 here, the message sent by UE 105 to gNB 110-1 at stage 4 could be some other RRC message or could be a message for a protocol different to RRC.

At stage 5, if the UE 105 indicated more location information needs to be sent at stage 4, gNB 110-1 may provide additional UL channel resources to UE 105 (not shown in FIG. 4) and UE 105 may then send one or more additional RRC location report messages to gNB 110-1 with the additional location information.

At stage 6, gNB 110-1 may make UL location measurements for the RRC location report message(s) received at stage 4 (and stage 5). For example, gNB 110-1 may measure an RSSI, RSRP, RSRQ, AOA, Rx-Tx time and/or RTT.

At stage 7, gNB 110-1 may return an RRC acknowledgment and/or termination indication for the RRC transaction at stages 2-5. Stage 7 can be optional with UE 105 assuming an acknowledgment and termination following location information transfer at stage 4 (and stage 5).

At stage 8, UE 105 reenters idle state and resumes monitoring for the next periodic or triggered location event.

In one variant of the procedure shown in FIGS. 3 and 4, referred to herein as a "codeword based reporting", external client 130 may request periodic or triggered location of UE 105 at stage 1 in FIG. 3 according to trigger criteria not visible to LMF 152 or to VGMLC 155 or HGMLC 145. For example, external client 130 may include a codeword in the location request sent at stage 1 in FIG. 3, which is subsequently sent to UE 105 by LMF 152 as part of the request for periodic or triggered location sent at stage 4 of FIG. 3. The codeword may be meaningful to UE 105 (e.g. may be configured in advance in UE 105) and may indicate a particular type of triggered and/or periodic event to be detected by UE 105 at stage 8 in FIG. 3 and reported at stage 9 in FIG. 3. The particular type of triggered and/or periodic event may not be known to LMF 152 (or to VGMLC 155 and/or HGMLC 145), although some other aspects of the periodic or triggered location may be provided by external client 130 to LMF 152 (and to VGMLC 155 and/or HGMLC 145) such as a required QoS for a location estimate for UE 105, a maximum duration of location reporting and/or a maximum number of location reports. An advantage of indicating the particular type of event to be reported only to UE 105 and not to elements in 5GC 140 and 5GC 150 is that new types of event trigger can be defined and supported that require impacts only to external client 130 and UE 105 and not to elements in 5GC 140 or 5GC 150. For example, the impacts to UE 105 may be downloaded via a data transfer to UE 105 (e.g. as part of an App) and may later be changed by another download. This may enable greater flexibility in triggered and periodic location reporting. Examples of new types of triggering events that could be supported using this variant include: (i) events based on a time of day or day of week (e.g. such a reporting a location of UE 105 at particular times of day and/or particular days in a week); (ii) events based on a current location of UE 105 such as reporting a location of UE 105 at frequent intervals (e.g. every 5 minutes) when UE 105 is in an area of interest versus reporting a location of UE 105 less frequently (e.g. every 2 hours) when UE 105 is not in an area of interest; and (iii) events based on a current movement of UE 105 such as reporting a location of UE 105 frequently (e.g. every 10 minutes) when UE 105 is moving and not reporting a location of UE 105 when UE 105 is stationary. The codeword that is provided by external client 130 at stage 1 in FIG. 3 for this variant, and that is transferred to UE 105 at stage 4 in FIG. 3, may be encoded in different ways such as using a single value, multiple values, a bit string, an octet string, a character string, an integer, a character etc. Moreover, in some embodiments, the codeword may be absent and instead the presence of a periodic or triggered location request itself may indicate a particular type of triggered or periodic location reporting (e.g. based in part on a current time of day, day of week or current location of UE 105).

Figure 5:
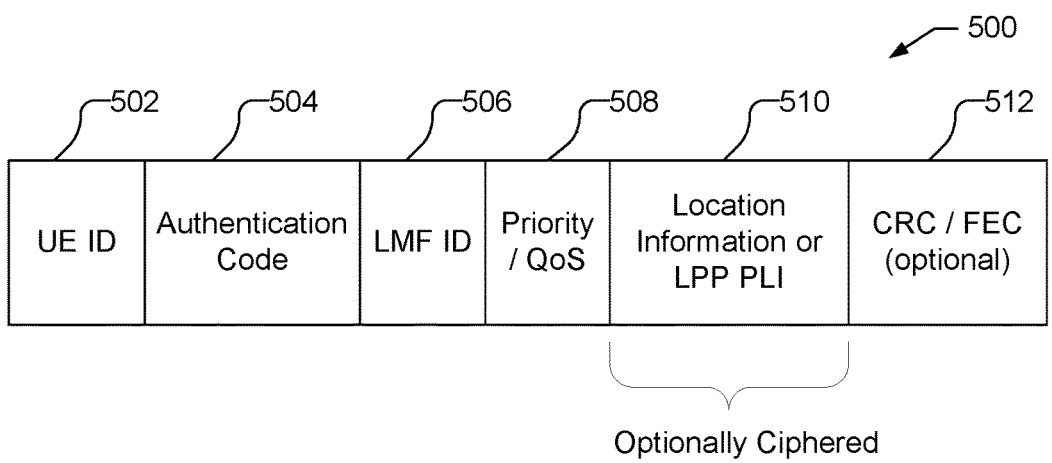
FIG. 5 shows possible content of an Radio Resource Control (RRC) Location Report of FIG. 4.

FIG. 5 shows possible content of an RRC Location Report 500 for stage 4 of FIG. 4. The location report contains a UE ID 502 to identify the target UE 105, an authentication code 504 to authenticate the UE ID 502, an LMF ID 506 to identify the LMF 152, an indication of a Priority and/or a Quality of Service (QoS) 508, the location information 510, such as DL measurements and/or a location estimate, obtained by the UE 105 at stage 1 in FIG. 4 and an optional cyclic redundancy check (CRC) or forward error correction (FEC) 512 for error detection or correction. In some embodiments, the LMF ID 506 may be part of the UE ID 502.

The UE ID 502 preferably hides the true UE 105 identity to preserve UE 105 privacy and may be a local ID assigned by LMF 152 and provided to UE 105 at stage 4 in FIG. 3. LMF 152 uses the UE ID 502 to identify UE 105 at stage 12 in FIG. 3. The UE ID 502 should be unique among all UEs being located by LMF 152 during the same time period. In order to avoid tracking of UE 105 by an unauthorized entity from one location event to another, the UE ID 502 should also change between successive location reports for UE 105 at stage 9 in FIG. 3. To enable this, LMF 152 may provide a set of randomly chosen and unique UE IDs 502 to UE 105 at stage 4 in FIG. 3. UE 105 then uses one UE ID 502 at a time from this set in each RRC Location Report sent at stage 4 in FIG. 4. The size of the UE ID 502 can be estimated from the maximum number of UEs for which location will be supported by LMF 152 during the same period. As an example, assuming LMF 152 may support location of up to 100 million UEs simultaneously and provides each UE with an average of 100 UE IDs at stage 4 in FIG. 3, the UE ID 502 size would need to allow 10 billion unique UE IDs and would therefore need to comprise at least 34 bits. If the LMF 152 ID is included as part of each UE ID (e.g. using additional bits at the beginning or end of a UE ID), the size of a UE ID would increase by the number of bits needed for the LMF 152 ID. Once a UE ID 502 has been used by a target UE 105 to send an RRC Location Report, it can be assigned by LMF 152 to another UE.

In one variant, LMF 152 might assign a single UE ID 502 to UE 105 for a first RRC Location Report and extra information to enable UE 105 to derive other UE IDs based on UE ID 502 for subsequent RRC Location Reports—e.g. similar to a frequency hopping sequence. For example, the extra information may indicate arithmetic or logical binary operations, and/or ciphering based operations, which UE 105 may perform to a previous UE ID 502 in order to derive a subsequent UE ID 502. The extra information may consume less signaling bits than sending a set of different UE IDs to UE 105 and may therefore reduce signaling to UE 105 at stage 4 in FIG. 3. However, the derived UE IDs are preferably difficult to infer from a previous UE ID by some outside entity (e.g. another UE that is able to receive the location report sent by UE 105 at stage 4 in FIG. 4) in order to protect UE 105 privacy, and preferably avoid collision with the UE IDs derived by other UEs that are also supporting UL high efficiency transport of location information.

In another variant, LMF 152 may permit UE 105 to use each UE ID 502 for more than one RRC Location Report in order to reduce the total number of UE IDs that need to be sent to UE 105 at stage 4 in FIG. 3. For example, UE 105 may be permitted to use the same UE ID 502 in all RRC Location Reports sent at stage 4 and stage 5 in FIG. 4 and possibly in some RRC Location Reports sent by UE 105 in one or more later occurrences of FIG. 4. In one example of this variant, LMF 152 sends a single UE ID 502 to UE 105 at stage 4 in FIG. 3 to be included in all location reports sent by UE 105 at stage 4 and stage 5 in FIG. 4. However, any authentication code 504 included by UE 105 for a repeated use of the same UE ID 502 may be different to an authentication code 504 included for a previous use of the same UE UD 502 in order to prevent spoofing by another entity of Location Reports for UE 105. While this variant may enable some limited tracking of UE 105, it may still preclude tracking of UE 105 by an unauthorized entity over a long duration and/or over a large geographic area.

The authentication code 504 allows LMF 152 to authenticate the UE ID 502 at stage 12 in FIG. 3. Authentication codes could be randomly assigned by LMF 152 and sent to the target UE 105 at stage 4 in FIG. 3 (with a different authentication code 504 being assigned for each different UE ID 502). Alternatively, the UE ID 502 could include the authentication code 504 by being randomly chosen from a large UE ID space (e.g. 96 bits in the case of a 34 bit UE ID). As another alternative, LMF 152 may assign and send a ciphering key (or information to enable UE 105 to determine or generate a ciphering key) to UE 105 at stage 4 in FIG. 3. UE 105 may then use the ciphering key to generate the authentication code 504 using a hashing and ciphering operation on the UE ID 502 and/or other information available to the UE 105 and LMF 152 such as the location information 510, the identity of temporary serving gNB 110-1, the identity of the temporary serving cell, and/or a time of day.

In one embodiment, a gNB 110-1 may include a random value RV in a downlink broadcast to UEs, and may periodically change the value of RV which is broadcast. The downlink broadcast may occur in a System Information Block (SIB). For example, the value of RV may include or comprise a date and time and/or may include a pseudo-random number generated by gNB 110-1. The UE 105 may then generate the authentication code 504 based on the ciphering key, the value of RV and possibly one or more of the UE ID 502, the LMF ID 506, the location information 510 and/or other information such as an identity of gNB 110-1 or of a serving cell for gNB 110-1. UE 105 may also include the value of RV that was used to generate the authentication code 504 as part of the RRC Location Report 500 (e.g. as a separate field for the authentication code 504). For example, in cases where gNB 110-1 broadcasts the RV in a SIB and where the value of RV has just changed from an old to a new value, including the value of the RV in the RRC Location Report 500 by UE 105 may enable gNB 110-1 to verify whether UE 105 used the old or the new value of RV to generate the authentication code 504, which may be needed when the authentication code 504 is verified (e.g. by LMF 152). By sending an unpredictable RV value to UE 105, a gNB 110-1 can avoid an attacker (e.g. another UE spoofing input from UE 105) from being able to determine an authentication code in advance, which may avoid or reduce an incidence of spoofing. In a variant, a gNB 110-1 may send the RV to UE 105 in a dedicated message (e.g. in the message sent at stage 3 in FIG. 4), which may reduce visibility of the RV to other UEs and/or may enable gNB 110-1 to know in advance which RV was used by UE 105 to generate the authentication code 504.

The LMF ID 506 indicates the LMF 152 to which the location information 510 and any location information obtained by gNB 110-1 needs to be sent at stage 11 in FIG. 3.

The indication of a priority and/or QoS 508 may be optional and, when included, may indicate a required priority, maximum transfer time and/or reliability of transfer to LMF 152 (and/or to external client 130). For example, if a high priority or a QoS with a low maximum transfer time is indicated (e.g. such as a few seconds), gNB 110-1 may transfer the location information at stage 11 in FIG. 3 to LMF 152 as soon as possible and may not store the location information and transfer this at a later time. Conversely, if a high priority or low maximum transfer time is not indicated (e.g. a low priority is indicated or the priority and/or QoS indication 508 is not included), gNB 110-1 may store the location information following stage 9 or stage 10 in FIG. 3 and transfer the location information at a later time to LMF 152 at stage 11 in FIG. 3 along with location information for other UEs. The transfer of location information to LMF 152 in the same message (or in the same set of messages) for a number of UEs at stage 11 in FIG. 3 may increase the efficiency of signaling (e.g. by reducing the number of separate messages sent by gNB 110-1 to LMF 152), but may increase the transfer time and the associated delay in sending the location report to external client 130 at stage 13 in FIG. 3. In addition, if the priority and/or QoS indication 508 indicates high priority (or high reliability), a gNB 110-1 that is congested may retain and transfer the location information at stage 11 in FIG. 3. However, if the indication of priority and/or QoS 508 does not indicate high priority (e.g. indicates low priority or is not included), gNB 110-1 may ignore or discard location information received from UE 105 at stage 4 (and stage 5) in FIG. 4 (e.g. if gNB 110-1 is congested) and may thereby not transfer location information to LMF 152 at stage 11 of FIG. 3, which may result in no location report being sent to external client 130 at stage 13 in FIG. 3.

The location information 510 could be included in the RRC Location Report sent at stage 4 in FIG. 4 as one or more parameters of the RRC Location Report. Alternatively, the location information could be included within an LPP message (e.g. an LPP Provide Location Information (PLI) message) which is embedded in the RRC Location Report as a single parameter. To improve UE 105 privacy, the UE 105 may cipher the location information 510 (e.g. may cipher an embedded LPP PLI) using a ciphering key provided or indicated to UE 105 by LMF 152 at stage 4 in FIG. 3.

The UE 105 location estimate may be primarily determined by LMF 152 at stage 12 in FIG. 3 or by gNB 110-1 at stage 10 in FIG. 3 from the location information obtained by UE 105 at stage 1 in FIG. 4, but uplink location measurements obtained by gNB 110-1 at stage 6 of FIG. 4 may also be used. Location methods can include GNSS, OTDOA, ECID (e.g. AOA, RTT), WLAN and BT. In the case of RTT, the UE 105 may measure a Receive-Transmit (Rx-Tx) time difference with the serving gNB 110-1 at stage 1 in FIG. 4 and gNB 110-1 may measure a similar Rx-Tx difference at stage 6 in FIG. 4 from which an RTT may be obtained (e.g. as the sum of the two Rx-Tx measurements). While gNB 110-1 could determine the UE 105 location at stage 10 in FIG. 3, LMF 152 may typically determine the UE 105 location at stage 12 in FIG. 3. LMF 152 may thus be primarily a processing engine which computes the locations of all UEs being positioned in the same timeframe and provides the locations to external clients such as external client 130.

The signaling shown in FIGS. 3 and 4 may minimize signaling overhead by only transferring location measurement information and the identities of target UE 105 and LMF 152. In a user plane location solution such as SUPL, extensive signaling can be needed for each separate UE 105 location to set up a transport connection between UE 105 and a SUPL SLP such as SLP 148, mutually authenticate the UE 105 and SLP and transfer the location measurements. This may normally occur using TCP/IP and may further require the assignment of IP signaling bearers by 5GC 150 and/or transfer of TCP/IP packets through 5GC 150 using NAS control plane transport of TCP/IP. The procedure shown in FIGS. 3 and 4 may be much more efficient in terms of VPLMN and UE 105 resources.

A similar comparison may apply to Over The Top (OTT) location of UE 105 by an OTT location server (LS) external to VPLMN 5GC 150 and HPLMN 5GC 140 where TCP/IP or other data transport could need to be established to transfer location measurements from UE 105 to the OTT LS (e.g. via the Internet). In addition, the OTT LS may not normally possess as much information as LMF 152 regarding gNBs 110 in NG-RAN 112 such as gNB 110 timing, location and other information needed for such position methods as OTDOA and ECID. Therefore, OTT LS location may be more resource intensive and less reliable and accurate than location by LMF 152 as exemplified in FIGS. 3 and 4.

A network operator could use these advantages to provide commercial location support for IoT UEs (and other UEs) that is superior in both resource use and accuracy/reliability to other solutions such as SUPL and OTT location. For example, the reduced battery consumption of the techniques described here may more than compensate for any VPLMN or HPLMN billing charges to UE subscribers to obtain location support.

Figure 6:
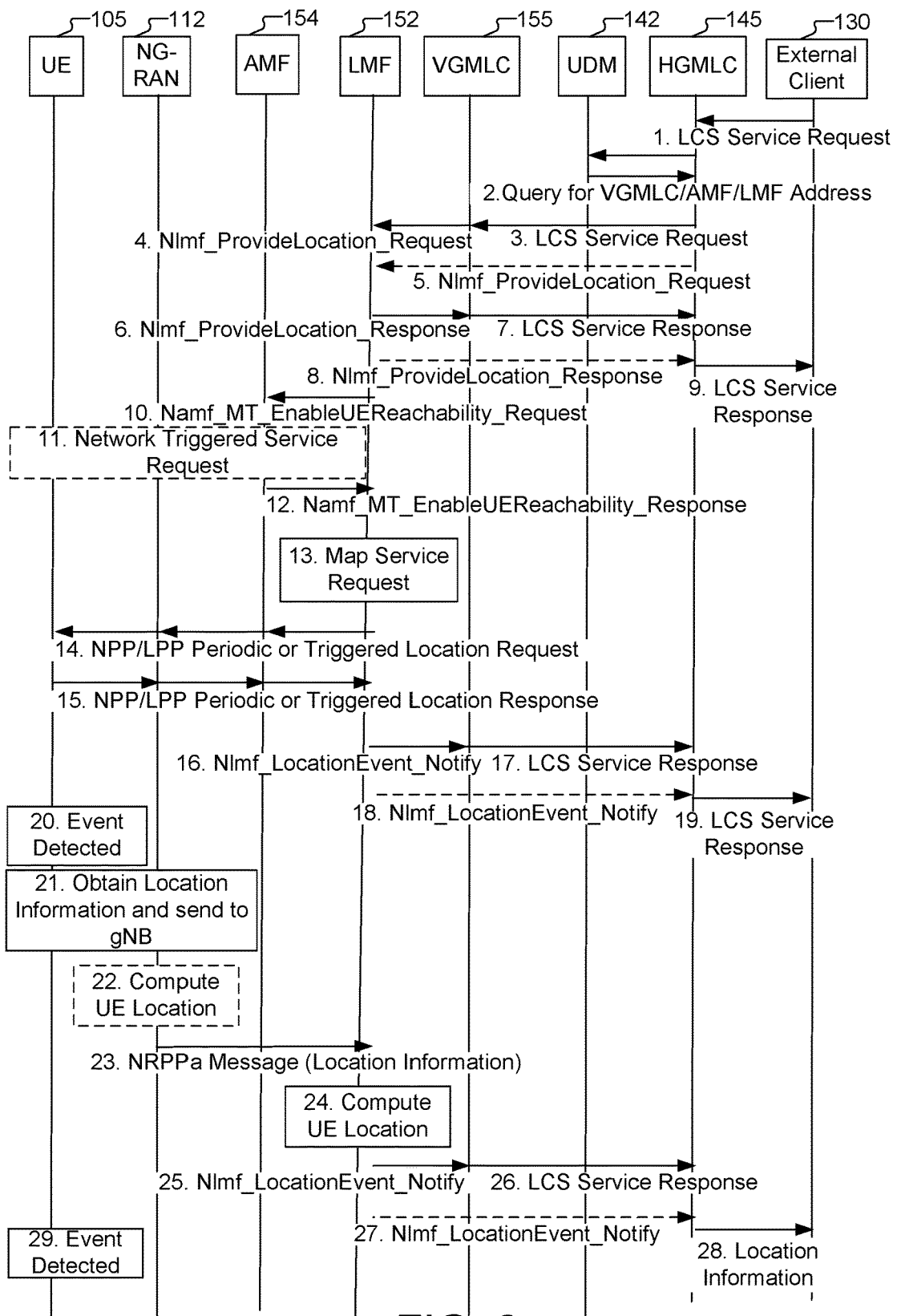
FIG. 6 summarizes a procedure to support periodic and triggered location of a UE using UL high efficiency transport of location information.

FIG. 6 show a signaling flow for a 5GC Mobile Terminated Location Request (5GC-MT-LR) procedure for a roaming UE 105 to support periodic and triggered location using UL high efficiency transport of location information. The signaling flow in FIG. 6 is similar to that shown and described previously for FIGS. 3 and 4 but provides additional details concerning LMF 152 interaction with VGMLC 155 and HGMLC 145 and concerning interaction of UE 105 with NG-RAN 112 and LMF 152. A procedure corresponding to FIG. 6 for a non-roaming UE 105 could comprise a subset of the procedure shown in FIG. 6. With the procedure shown in FIG. 6, LMF 152 and VGMLC 155 may be combined to avoid support of the Nlmf SBI shown in FIG. 2. Privacy requirements for UE 105 can be configured in HGMLC 145 or transferred from UDM 142 to HGMLC 145 and may not be needed in AMF 154. AMF 154 support may be limited to transferring positioning messages between LMF 152 and NG-RAN 112 and/or UE 105 and to providing LMF 152 with UE 105 status information and connectivity access. Selection of LMF 152 by VGMLC 155 may use (at least) four alternative methods as described later. The same LMF 152 may be used for each successive periodic or triggered location fix for UE 105 thereby avoiding overhead to assign and release LMF 152 for each separate location of UE 105 and enabling use of information obtained by LMF 152 for previous location fixes for UE 105.

At stage 1 in FIG. 6, external client 130 sends a location request for periodic and triggered location for a target UE 105 to HGMLC 145 in HPLMN 5GC 140 for UE 105. The location request provides the type of location reporting being requested and associated parameters. For periodic location, the request may include the time interval between successive location reports and the total number of reports. For area event reporting, the request may include details of the target area, whether the trigger event to be reported is the UE 105 being inside, entering into or leaving the target area, and whether event reporting shall include UE 105 location estimates. For motion event reporting, the request may include a threshold linear distance for triggering a location report and whether event reporting shall include UE 105 location estimates. For codeword based reporting, the request may include a codeword and possibly a maximum duration of reporting and/or a maximum number of location reports. HGMLC 145 may verify UE 105 privacy requirements. The request may also include an indication of priority and/or Quality of Service (QoS), such as a required location accuracy, a required maximum response time and/or a required reliability.

At stage 2, HGMLC 145 queries UDM 142 for the address of serving AMF 154, UE 105 privacy requirements and possibly a VGMLC address (e.g. for VGMLC 155) and/or an LMF address (e.g. for LMF 152) in VPLMN 5GC 150.

At stage 3, if a VGMLC address was not returned at stage 2, HGMLC 145 may use a Network Repository Function (NRF) service in HPLMN 5GC 140 to select an available VGMLC (which in this example is VGMLC 155) in VPLMN 5GC 150, based on the already known VPLMN 5GC address contained in the AMF 154 address received at stage 2. HGMLC 145 forwards the location request to VGMLC 155 (e.g. using the Roaming Location Protocol (RLP) defined by OMA) and includes the AMF 154 address, the target UE 105 identity (e.g. a Subscription Permanent Identifier (SUPI)), an identity for the external client 130, any LMF 152 address received in stage 2, any QoS and/or priority indication received at stage 1, details of the periodic or triggered location request or a codeword, any privacy requirements for the UE 105, and/or a reference number assigned by HGMLC 145 to enable HGMLC 145 to identify later responses (e.g. as at stages 17, 18, 26 and/or 27).

At stage 4, VGMLC 155 determines an LMF 152 in VPLMN 5GC 150 and may invoke an Nlmf_ProvideLocation_Request SBI service operation to forward the location request to LMF 152 including all information received at stage 3. If VGMLC 155 and LMF 152 functions are combined, stage 4 may be omitted. VGMLC 155 may determine an LMF 152 in the following alternative ways which are labelled A1 to A4 for easy reference.

With alternative A1, if VGMLCs, LMFs and AMFs are fully interconnected in VPLMN 5GC 150 (e.g. via an operator IP intranet), VGMLC 155 may determine LMF 152 based on any suitable criteria (e.g. location QoS, type of external client, VGMLC 155 ID) and independently of the AMF 154 identity. As one example, VGMLC 155 could be configured with all LMFs in VPLMN 5GC 150 and could select LMFs on a round robin basis.

With alternative A2, if AMF 154 or VGMLC 155 is allowed to use some but not all LMFs in VPLMN 5GC 150, VGMLC 155 could be configured with the allowed LMFs (e.g. for each AMF)—and could then select an LMF based on specific criteria (e.g. QoS) or randomly.

With alternative A3. VGMLC 155 may use an NRF service in VPLMN 5GC 150 to request a set of available LMFs in VPLMN 5GC 150 and may then select one LMF as in alternative A1.

With alternative A4, when UE 105 first registers or re-registers with VPLMN 5GC 150, the serving AMF (e.g. AMF 154) may select an LMF (e.g. LMF 152) and may provide the LMF address to UDM 142 along with the AMF identity. UDM 142 can then provide the LMF address at stage 3 to HGMLC 145 which would provide the LMF address to VGMLC 155 at stage 4.

At stage 5 in FIG. 6, and as an optional optimization, instead of performing stages 3 and 4, if HGMLC 145 can determine or select LMF 152 (e.g. based on the VPLMN 5GC 150 identity, AMF 154 address, using the NRF service or by receiving the LMF 152 address from UDM 142 at stage 3), HGMLC 145 may invoke a Nlmf_ProvideLocation_Request SBI service operation to forward the location request directly to LMF 152 and bypass VGMLC 155.

At stages 6-9, if LMF 152 supports periodic and triggered location, LMF 152 returns an acknowledgment to external client 130, via VGMLC 155 and/or HGMLC 145, indicating that the request for periodic or triggered location for UE 105 was accepted.

At stage 10, LMF 152 invokes a Namf_MT_EnableUE-Reachability_Request SBI service operation towards serving AMF 154 to verify UE 105 reachability. If serving AMF 154 is no longer available, LMF 152 may use the NRF service in VPLMN 5GC 150 to select another AMF from the same AMF set as the previous serving AMF 154.

At stage 11, if UE 105 is currently idle but reachable, AMF 154 performs a network triggered service request in order to place the UE 105 in a connected state (with a signaling connection through NG-RAN 112 to AMF 154).

At stage 12. AMF 154 invokes a Namf_MT_EnableUE-Reachability_Response SBI service operation towards LMF 152 to confirm whether UE 105 is reachable. LMF 152 may verify UE 105 privacy requirements, based on any privacy requirements received from HGMLC 145 at stages 4-6, via a supplementary services interaction with UE 105 (not shown in FIG. 6). The supplementary services interaction may be supported in the same manner as UE 105 positioning interaction (e.g. using NAS transport messages to transfer supplementary services messages such as a Location Notification Request (LMF 152 to UE 105) and Location Notification Response (UE 105 to LMF 152) as defined in 3GPP TS 24.080). LMF 152 may also request UE 105 status information (e.g. a serving cell ID) from serving AMF 165 using a Namf_UEStatus SBI service operation (not shown in FIG. 6).

If UE 105 is not reachable (e.g. is in eDRX or PSM), LMF 152 may invoke an Namf_EventExposure_Subscribe SBI service operation (not shown in FIG. 6) towards AMF 154 in order to be informed later by AMF 154 (e.g. using an Namf_EventExposure_Notify SBI service operation) when UE 105 again becomes reachable. At that point and if UE 105 may not yet be in a connected state, LMF 152 may again perform stages 10-12 to place UE 105 in a connected state. Once UE 105 is reachable, LMF 152 may verify UE 105 privacy requirements, based on UE 105 privacy requirements received from the HGMLC 145 at stages 3-5, via a supplementary services interaction with UE 105 conveyed via AMF 154 (not shown in FIG. 6).

At stage 13, LMF 152 maps the service request for periodic or triggered location of UE 105 that was received at stage 4 or stage 5 into a corresponding request for periodic or triggered location supported by a DL positioning protocol (e.g. LPP or NPP).

At stage 14, LMF 152 sends a DL positioning protocol message (e.g. an LPP or NPP RLI message) to UE 105 via AMF 154 and NG-RAN 112, requesting periodic or triggered location reporting by UE 105 as determined by LMF 152 at stage 13. LMF 152 indicates in the DL positioning protocol message the type of location information or location estimate to be provided by UE 105 for location reporting at stage 21. LMF 152 also includes the LMF 152 ID, a set of one or more UE IDs to be used for location reporting at stage 21 and optionally a ciphering key (or information to enable UE 105 to determine or generate a ciphering key) and authentication data. LMF 152 also includes details of the periodic or triggered location request (e.g. details of the triggering event or a codeword for codeword based reporting) and any priority and/or QoS indication (e.g. as received at stage 4 or stage 5). The DL positioning protocol message may be an LPP or NPP Request Location Information message. In an embodiment, the LMF 152 ID may be part of each UE ID in the set of UE IDs and may not be a separate parameter. The LMF 152 may also assign and include a transaction ID in the message sent at stage 14 to enable LMF 152 to recognize later responses originating from UE 105 (e.g. as at stage 15 and stage 23).

At stage 15, UE 105 returns a confirmation to LMF 152 via NG-RAN 112 and AMF 154—e.g. an LPP or NPP Provide Location Information message that includes a transaction ID received from LMF 152 at stage 14 and does not indicate the end of a transaction.

At stages 16-19, LMF 152 sends a confirmation to external client 130 via VGMLC 155 and/or HGMLC 145 that event reporting for periodic or triggered location was activated in UE 105. VGMLC 155 (if used) can then release state information for the periodic and triggered 5GC-MT-LR request. However, LMF 152 retains state information for the periodic and triggered 5GC-MT-LR request.

At stage 20, UE 105 monitors for occurrence of the trigger (or periodic) event requested at stage 14. The monitoring may occur while UE 105 is in idle state and/or while UE 105 is unreachable from the VPLMN (e.g. with eDRX or PSM). UE 105 may also (e.g. periodically) request assistance data from LMF 152 to help determine a location, if needed to detect a trigger event. When a trigger event is detected, UE 105 proceeds to stage 21.

At stage 21, UE 105 obtains any requested location information (e.g. visible cell IDs, DL location measurements and/or a location estimate) and sends these to a suitable temporary serving gNB 110 for a temporary serving cell in NG-RAN 112 as described more fully for FIG. 4. Minimally, the location information comprises the identity of the temporary serving cell and/or the identity of the serving gNB 110. UE 105 includes a UE ID and the LMF 152 ID (if not part of the UE ID) received at stage 14 with the location information and may also include authentication information (e.g. an authentication code 504) and an indication of priority and/or QoS (e.g. as received at stage 14). UE 105 may include the location information that is sent at stage 21 in an LPP or NPP Provide Location Information (PLI) message (e.g. which includes the type of event being reported and a transaction ID received at stage 14 and does not indicate an end of a transaction). The LPP or NPP PLI may also be ciphered by UE 105.

At stage 22, the temporary serving gNB 110 in NG-RAN 112 may optionally compute a location for UE 105 from the location information received at stage 21 or may verify a received location for UE 105.

At stage 23, the temporary serving gNB 110 sends the received location information (e.g. a received LPP or NPP PLI) or the computed location for UE 105 to LMF 152 as indicated by the LMF 152 ID (or UE ID) received at stage 21. The temporary serving gNB 110 may batch location information for multiple UEs to LMF 152 to reduce signaling, for example if this is not disallowed by an indication of priority and/or QoS received at stage 21. Alternatively, the temporary serving gNB 110 may send the received location information or the computed UE 105 location to LMF 152 as quickly as possible if a high priority or low QoS delay was indicated at stage 21. The temporary serving gNB 110 may send the location information for UE 105 in an NRPPa message to LMF 152.

At stage 24, LMF 152 authenticates the UE ID (e.g. using authentication information provided by UE 105 at stage 21) and computes or verifies the UE 105 location (using the location estimate or location information received at stage 23) if inclusion of a location estimate in event reports was requested at stage 4 or stage 5.

At stage 25, LMF 152 selects a VGMLC (which may be different to the VGMLC 155 for stages 3-7, although in this example is assumed to be VGMLC 155) and invokes an Nlmf_LocationEvent_Notify SBI service operation towards VGMLC 155 with an indication of the type of event being reported, the reference number received at stage 4 or stage 5, the HGMLC 145 address and a location estimate if this was requested or obtained at stage 24. Stage 25 may be omitted if LMF 152 and VGMLC 155 are combined.

At stage 26, VGMLC 155 forwards the information received in stage 25 to HGMLC 145.

At stage 27, as an optional optimization, stages 25 and 26 are omitted and LMF 152 instead sends the information obtained at stage 24 directly to HGMLC 145.

At stage 28, HGMLC 145 uses the reference number received at stage 26 or stage 27 to identify the periodic and triggered location request received in stage 1 and then sends the location estimate and/or type of event being reported to the external client 130.

At stage 29, UE 105 continues to monitor for further trigger events and instigates stages 21-28 each time a trigger event is detected.

Figure 7:
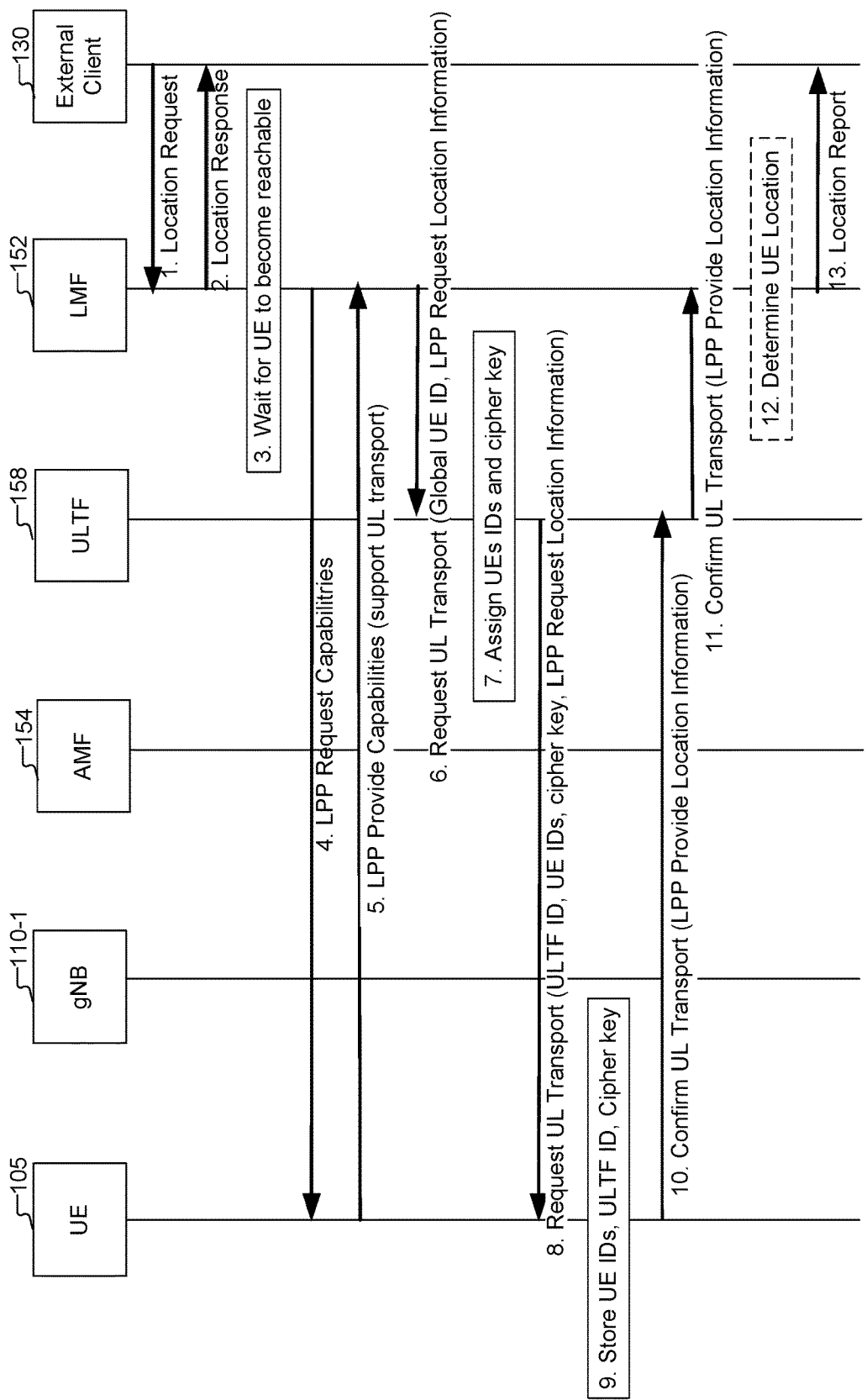
FIGS. 7-9 show signaling flows for transport of location event reports using UL high efficiency transport of location information.
Figure 8:
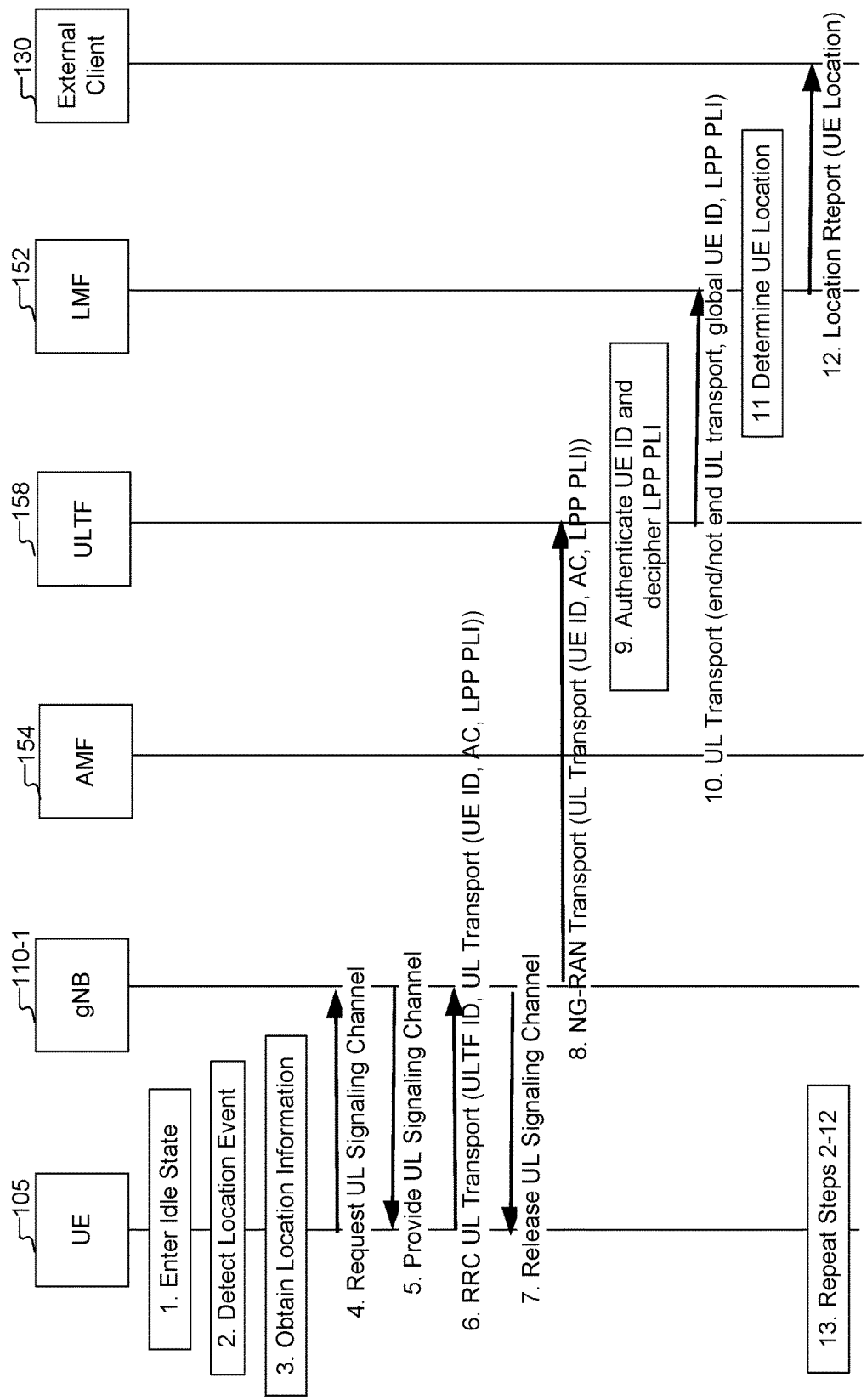
Figure 9:
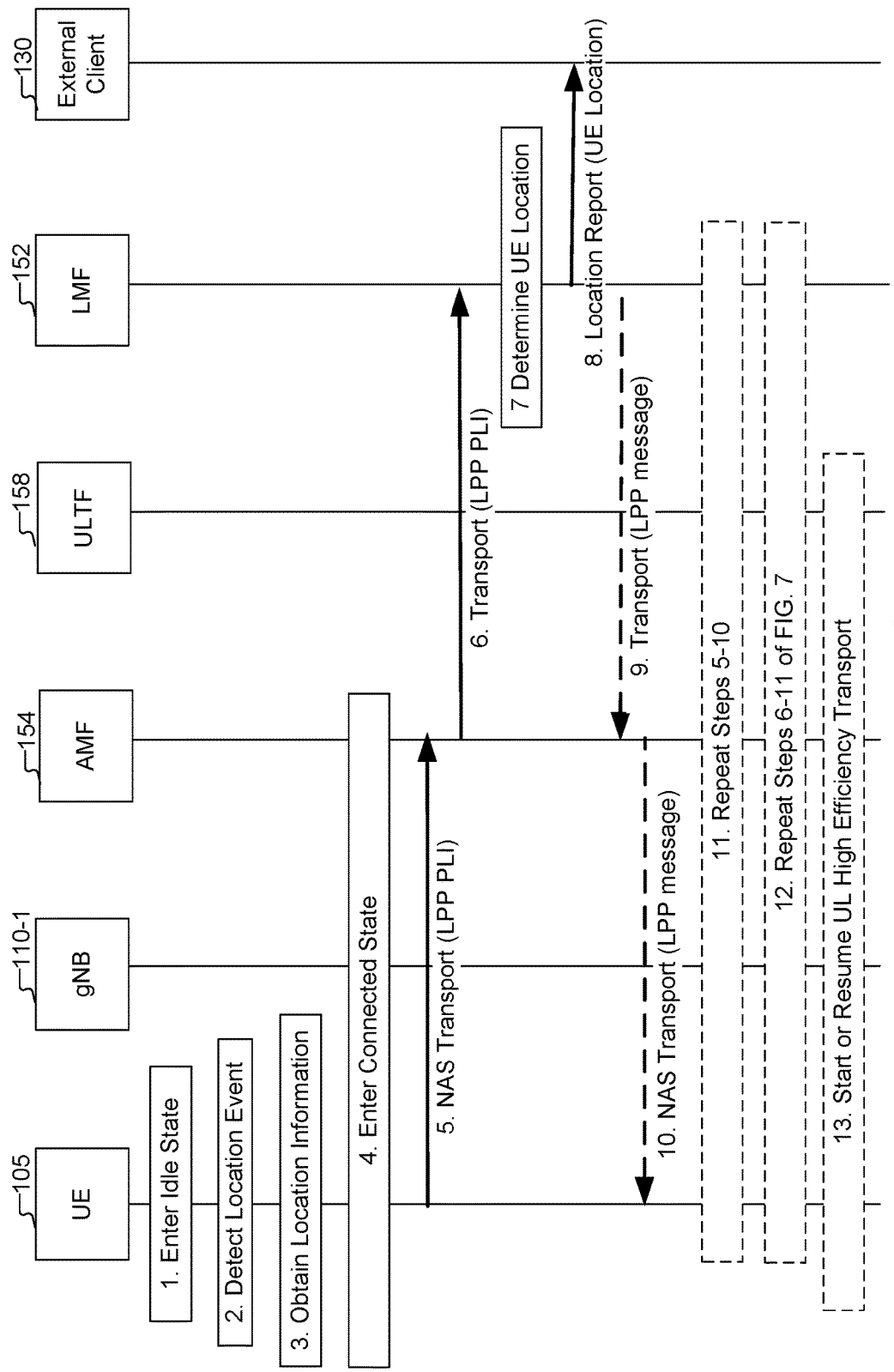

FIGS. 7-9 show signaling flows exemplifying UL high efficiency transport of location information that are similar to the signaling flows shown in FIGS. 3, 4 and 6 but in which some of the functions performed by LMF 152 are now performed by a separate UL Transport Function (ULTF) 158. Separation of some functions performed by LMF 152 to ULTF 158 may enable support of UL high efficiency transport of information for other applications such as Short Message Service (SMS) transfer as shown later in FIG. 10. It is noted that while LPP messages are shown as being transferred between UE 105 and LMF 152 in FIGS. 7-9, messages for another DL positioning protocol could be transferred instead or in addition such as an NPP protocol.

FIG. 7 shows a signaling flow for initiation of UL high efficiency transport of location information in UE 105 by LMF 152 that is similar to stages 1-6 of FIG. 3 but makes use of ULTF 158 to support some functions.

At stage 1 in FIG. 7, external client 130 sends a request for periodic or triggered location of target UE 105 to LMF 152 (e.g. via VGMLC 155 and/or HGMLC 145) and may include an indication of a priority and/or a QoS. Stage 1 may correspond to stage 1 in FIG. 3. Routing of the request for periodic or triggered location from external client 130 to LMF 152 may be as described for stages 1-5 of FIG. 6 (e.g. may include a query of UDM 142 by HGMLC 145 for the address of AMF 154 and/or the address of LMF 152).

At stage 2, LMF 152 confirms acceptance of the request.

At stage 3, LMF 152 waits for target UE 105 to become reachable, e.g., no longer in extended Discontinuous Reception (eDRX) or Power Saving Mode (PSM). This may involve being notified of UE 105 reachability by serving AMF 154 (e.g. as described for stages 10-12 of FIG. 6).

At stage 4, LMF 152 sends an LPP Request Capabilities message to UE 105 via the serving AMF 154 and serving gNB 110-1 to request the positioning capabilities of UE 105.

At stage 5, UE 105 returns an LPP Provide Capabilities message to LMT 152 comprising the positioning capabilities of UE 105. UE 105 may include its capability to support UL high efficiency transport of location information (e.g. for sending of LPP messages to LMF 152 while UE 105 is in idle state).

At stage 6, based on the indication of UL high efficiency transport of location information received from UE 105 at stage 5 or based on other knowledge or expectation of support of UL high efficiency transport of location information by UE 105, LMF 152 sends a Request UL Transport message to ULTF 158. It is noted that the Request UL Transport message and other messages referred to later for FIGS. 7-10 may be referred to by other names, although the functions ascribed to these messages as described herein may remain the same.

The Request UL Transport message sent at stage 6 may include a global identity of UE 105 (e.g. a SUPI), the identity or address of serving AMF 154, an indication of how many location event reports (or LPP messages) are needed from UE 105 using UL high efficiency transport, an indication of a priority and/or QoS, and an LPP Request Location Information (RLI) message. The LPP RLI message may include a request for periodic or triggered location from UE 105, may indicate the type(s) of periodic or triggered event reporting needed (or may include a codeword for codeword based reporting), and/or may include criteria (referred to herein as "UL high efficiency transport criteria") for sending a location event report using UL high efficiency transport (e.g. as described later for FIG. 8) versus using NAS transport with a signaling connection (e.g. as described later for FIG. 9). As an example, the UL high efficiency transport criteria may indicate that UE 105 shall send all location event reports using UL high efficiency transport until the supply of UE IDs provided at stage 8 (as described later) is exhausted (or almost exhausted), whereupon UE 105 shall send the next location event report(s) using a signaling connection and NAS transport as described later for FIG. 9. As another example, the UL high efficiency transport criteria may indicate that UE 105 shall send certain location event reports (e.g. periodic location event reports or event reports triggered according to codeword based reporting) using UL high efficiency transport and shall send certain other location event reports (e.g. triggered location event reports for an area event or UE motion event) using a signaling connection and NAS transport as in FIG. 9. As another example, the UL high efficiency transport criteria could indicate a maximum period of time or a maximum number of location event reports for which UE 105 is allowed to send location event reports using UL high efficiency transport and after which UE 105 shall send a location event report to LMF 152 using a signaling connection and NAS transport. The UL high efficiency transport criteria could indicate, either explicitly or implicitly and even if not explicitly sent to UE 105, sending of a location event report using a signaling connection and NAS transport whenever the UE 105 already has a NAS signaling connection for some other reason or when UE 105 can only access a base station in NG-RAN 112 (e.g. an ng-eNB) that does not support uplink high efficiency transport of location information (e.g. according to FIG. 8).

At stage 7, ULTF 158 assigns a set of one or more UE IDs to UE 105 that are unique among all UE IDs currently in use by ULTF 158. The number of UE IDs in the set of one or more UE IDs may be based on (e.g. may be equal to or less than) the number of location event reports (or number of LPP messages) needed from UE 105 using UL high efficiency transport that was indicated by LMF 152 at stage 6. ULTF 158 may also determine or assign a ciphering key. ULTF 158 also stores the assigned UE IDs, the ciphering key, the global UE ID and an ID for LMF 152. In an embodiment, each UE ID in the set of one or more UE IDs assigned to UE 105 at stage 7 includes an ID for ULTF 158 (e.g. using additional bits at the beginning or end of each UE ID).

At stage 8, ULTF 158 sends a Request UL Transport message to UE 105 (e.g. via the serving AMF 154 and serving gNB 110-1) to request use of UL high efficiency transport by UE 105 for sending of reports or messages by UE 105 to ULTF 158 later (as described later for FIG. 8).

The Request UL Transport message may include the ULTF 158 ID (e.g. if not part of each UE ID), the set of one or more UE IDs and the ciphering key assigned or determined at stage 7 (or information to enable UE 105 to determine or generate the ciphering key), an indication of a priority and/or QoS (e.g. if received at stage 6), an indication or identity of LMF 152 (e.g. which may be needed by UE 105 to perform the procedure in FIG. 9), and the LPP RLI received at stage 6.

At stage 9, UE 105 verifies that UE 105 can support the request for periodic or triggered location contained in the LPP RLI received at stage 8 using UL high efficiency transport. If so, UE 105 stores the ULTF ID, the set of UE IDs and the ciphering key received at (or determined according to) stage 8.

At stage 10, and in response to the Request UL Transport message received at stage 8, UE 105 returns a Confirm UL Transport message to ULTF 158 (e.g. via the serving gNB 110-1 and serving AMF 154) to confirm that UE 105 can support the request for UL high efficiency transport received at stage 8. The message may include an LPP Provide Location Information (PLI) message which may include a confirmation that UE 105 can support the triggered or periodic location requested in the LPP RLI message received at stage 8. The LPP PLI may include location information obtained by UE 105 at the current time (e.g. measurements of RSTD, Rx-Tx, GNSS pseudoranges, WLAN APs or a location estimate).

At stage 11, ULTF 158 sends a Confirm UL Transport message to LMF 152 to confirm that the request for UL high efficiency transport received from LMF 152 at stage 6 can be supported. The message includes the LPP PLI message received at stage 10.

At stage 12, LMF 152 may determine a location estimate for UE 105 if the LPP PLI received at stage 11 includes location information.

At stage 13, LMF 152 sends a location report to external client 130 (e.g. via VGMLC 155 and/or HGMLC 145) to confirm that triggered or periodic location is now activated in UE 105.

FIG. 8 shows a signaling flow exemplifying how UE 105 may return periodic or triggered location event reports using UL high efficiency transport of location information after this has been requested from and confirmed by UE 105 as described previously for stages 1-13 of FIG. 7.

Stage 1 of FIG. 8 may occur sometime after stage 10 of FIG. 7 (e.g. a few seconds or a few minutes afterwards). At stage 1, UE 105 enters an idle state in which there is no signaling connection from UE 105 to either NG-RAN 112 or VPLMN 5GC 150.

At stage 2, and while in idle state, UE 105 monitors for the occurrence of a periodic or triggered event associated with location reporting as requested in the LPP RLI received at stage 8 in FIG. 7. When UE 105 detects a periodic or triggered location event at stage 2, UE 105 proceeds to stage 3.

At stage 3, UE 105 obtains location information—e.g. as described for stage 9 of FIG. 3 and stage 1 of FIG. 4.

At stage 4, UE 105 determines to send the location information obtained at stage 3 using UL high efficiency transport as opposed to using a signaling connection and NAS transport. For example, the determination to use UL high efficiency transport may be based on the UL high efficiency transport criteria received at stage 8 in FIG. 7. UE 105 then determines a suitable serving cell and associated serving gNB which in this example is gNB 110-1 (though could be any other gNB 110) and sends a request to gNB 110-1 for an UL signaling channel or UL signaling connection (e.g. using an UL RACH channel) as at stage 2 of FIG. 4 but possibly without an indication of usage for location. The UL signaling channel may also be referred to as an UL signaling connection, a signaling connection or a temporary signaling connection.

At stage 5, gNB 110-1 returns an UL signaling channel assignment to UE 105 as at stage 3 of FIG. 4. The UL signaling channel (or UL signaling connection, signaling connection or temporary signaling connection) assigned at stage 5 may be between UE 105 and gNB 110-1 and may not be visible to or usable by any other entity in NG-RAN 112 or 5GC 150.

At stage 6, UE 105 uses the UL signaling channel assignment received at stage 5 to send an RRC UL Transport message to gNB 110-1. The message includes the ULTF ID if received at stage 8 in FIG. 7 (e.g. if not part of a UE ID), an indication of a priority and/or QoS, if received at stage 8 of FIG. 7, and an UL Transport message some or all of whose contents may be transparent to (e.g. not requiring decoding or interpretation by) gNB 110-1. The UL Transport message may include one of the UE IDs received by UE 105 at stage 8 in FIG. 7, authentication information which may comprise an authentication code (AC) which may be an octet string or bit string and an LPP (or NPP) PLI message. The LPP PLI message may include the location information obtained at stage 3 and an indication of the location event detected by UE 105 at stage 2. UE 105 may cipher the LPP PLI message using the ciphering key received at (or determined according to) stage 8 in FIG. 7 and may include an indication of ciphering in the UL Transport message. However, other content of the UL Transport message may not be ciphered. Optionally, UE 105 may send more than one RRC UL Transport message to gNB 110-1 at stage 6 (each containing the same type of information described above for the first RRC UL Transport message) in order to send additional LPP PLI messages—e.g. if the size of a preferred LPP PLI message is too large to fit into one RRC UL Transport message. Each RRC UL Transport message and/or each UL Transport message may include a sequence number to enable upstream entities (e.g. gNB 110-1, ULTF 158, LMF 152) to determine the order of transmission by UE 105. However, sequence numbers may not be needed when UE 105 includes each UE ID once only in any UL Transport message since the UE IDs sent at stage 8 in FIG. 7 may have an implicit sequence order and may thereby also act as sequence numbers.

In one embodiment, UE 105 may segment an UL Transport message sent at stage 6 into two or more segments if the UL Transport message is too large to fit into a single RRC UL Transport message. UE 105 may then send each UL Transport message segment to gNB 110-1 in a separate RRC UL Transport message at stage 6, and gNB 110-1 may reassemble the complete UL Transport message from the separately received UL Transport message segments. In this embodiment, each RRC UL Transport message may indicate whether it carries or does not carry the last UL Transport message segment to allow gNB 110-1 to determine when to reassemble the complete UL Transport message.

At stage 7, gNB 110-1 may send an indication to UE 105 that the UL signaling channel is released and may send or include an indication (e.g. in an RRC message) that the one or more UL Transport messages sent by UE 105 at stage 6 were correctly received by gNB 110-1 and will be forwarded to ULTF 158 as described next for stage 8. UE 105 may then re-enter an idle state.

At stage 8, gNB 110-1 sends an NG-RAN Transport message to ULTF 158 containing the UL Transport message (e.g. including an LPP or NPP PLI message) received at stage 6 and possibly an indication of a priority and/or QoS if received at stage 6. GNB 110-1 may identify ULTF 158 from the ULTF ID or UE ID (e.g. if the UE ID includes the ULTF ID) received at stage 6. GNB 110-1 may send the NG-RAN Transport message to ULTF 158 either directly if gNB 110-1 can access ULTF 158 directly (e.g. via an operator IP intranet) or via an AMF such as AMF 154. If more than one UL Transport message was received from UE 105 at stage 6 (e.g. via more than one RRC UL Transport message sent by UE 105 at stage 6), gNB 110-1 may send each UL Transport message separately and in order to ULTF 158 at stage 8 in a separate NG-RAN Transport message or may include all of the UL Transport messages received from UE 105 at stage 6 in a single NG-RAN Transport message. GNB 110-1 may send the NG-RAN Transport message to ULTF 158 containing the UL Transport message received at stage 6 as quickly as possible at stage 8 if a high priority or QoS with low maximum delay was indicated at stage 6. Alternatively, in order to reduce the number of separate signaling messages, gNB 110-1 may send UL Transport messages received from two or more UEs to ULTF 158 using the same NG-RAN Transport message, e.g. if not disallowed by any priority and/or QoS indication received at stage 6.

At stage 9, ULTF 158 may process each UL Transport message contained in an NG-RAN Transport message received at stage 8 as follows. First, ULTF 158 may process each UL Transport message based on an included indication of priority and/or QoS. For example, a first UL Transport message with a higher priority or lower QoS maximum delay may be processed by ULTF 158 before a second UL Transport message with a lower priority or higher QoS maximum delay even when the second UL Transport message was received before the first UL Transport message by ULTF 158. As one example, ULTF 158 could maintain a prioritized queuing system in which an UL Transport message received at stage 8 enters a particular queue associated with a priority and/or QoS value for the UL Transport message and with ULTF 158 processing all messages in higher priority queues before processing messages in lower priority queues. When performing processing, ULTF 158 may identify the UE which originally sent the UL Transport message using the included UE ID. In this example, the UL Transport message would have been sent by UE 105 at stage 6 and ULTF 158 may identify UE 105 (e.g. may obtain the global ID for UE 105) by verifying that the received UE ID was previously assigned to UE 105 at stage 7 in FIG. 7. ULTF 158 may next use the ciphering key assigned to (or determined for) UE 105 at stage 7 in FIG. 7 to verify the included AC which may authenticate the received UE ID. At the same time (e.g. if part of authentication) or subsequently, ULTF 158 may decipher the LPP PLI included in the UL Transport message if this is ciphered (e.g. if the UL Transport message includes an indication of ciphering). ULTF 158 may also verify at stage 9 that an indication of priority and/or QoS included in the UL Transport message received at stage 8 matches an indication of priority and/or QoS received from LMF 152 at stage 6 in FIG. 7—e.g. in order to verify that UE 105 is using the correct priority and/or QoS. ULTF 158 may also determine LMF 152 (e.g. from information stored by ULTF 158 at stage 7 in FIG. 7).

At stage 10, ULTF 158 sends an UL Transport message to LMF 152 containing the (e.g. deciphered) LPP PLI, the global ID for UE 105 determined at stage 9, an indication of priority and/or QoS (e.g. if received at stage 8), and an indication of whether UL high efficiency transport has now ended due to use by UE 105 of all the UE IDs originally assigned to UE 105 at stage 7 in FIG. 7. When ULTF 158 receives multiple UL Transport messages for UE 105 at stage 8, ULTF 158 may send the multiple UL Transport messages to LMF 152 at stage 10 in the order received (e.g. as long as each UL Transport message indicates the same priority or QoS) and/or with a sequence number in each UL Transport message to indicate its sequential order to LMF 152.

At stage 11, LMF 152 determines or verifies a location estimate for UE 105 based on the location information contained in the LPP PLI received in the UL Transport message at stage 10. When UE 105 has sent multiple LPP PLI messages at stage 6, LMF 152 may wait to receive all the LPP PLI messages from ULTF 158 before determining a location estimate for UE 105. LMF 152 may also determine the location event (e.g. a periodic or triggered event or a codeword based reporting event) being reported by UE 105 based on the received LPP PLI message(s). For example, in the case of codeword based reporting, UE 105 may include another codeword in the LPP PLI indicating the event being reported, which may be passed on by LMF 152 without interpretation to external client 130 at stage 12. LMF 152 may also prioritize location determination for different UEs based on an indication of priority and/or QoS, e.g. if received at stage 10. For example, and as described for ULTF 158 at stage 9 (e.g. using a prioritized queuing system), LMF 152 may perform stage 11 for a first UL Transport message with a higher priority or a QoS with lower maximum delay before performing stage 11 for a second UL Transport message with a lower priority or a QoS with higher maximum delay even when the second UL Transport message was received before the first UL Transport message by LMF 152.

At stage 12, LMF 152 sends a location report to external client 130 (e.g. via VGMLC 155 and/or GMLC 145) containing the location estimate and an indication of the location event being reported for UE 105, as determined or obtained by LMF 152 at stage 11.

At stage 13, UE 105 may continue to monitor for and to detect and report events as at stages 2-12 in FIG. 8 until: (i) all the UE IDs received at stage 8 on FIG. 7 are exhausted; (ii) the UL high efficiency transport criteria received at stage 8 in FIG. 7 indicate use of signaling as in FIG. 9 and not as in FIG. 8; or (iii) UE 105 receives further instructions from LMF 152 (e.g. as described later for FIG. 9) or from ULTF 158 to cease or modify the location reporting.

FIG. 9 shows a signaling flow exemplifying how UE 105 may return a periodic or triggered location event report after periodic or triggered location has been instigated in UE 105 according to the signaling flow described previously for FIG. 7. The stages shown in FIG. 9 may occur after all of the UE IDs assigned by ULTF 158 for UL high efficiency transport at stage 7 in FIG. 7 have been exhausted by UE 105 in sending location events reports using UL high efficiency transport as described previously for FIG. 8. The stages shown in FIG. 9 may also occur when any UL high efficiency transport criteria included by LMF 152 in the LPP PLI sent at stage 6 in FIG. 7 indicate that a particular type of location event detected by UE 105 shall be reported using a signaling connection and NAS transport. The stages shown in FIG. 9 may also occur when UE 105 needs to send a location event report and is already in a connected state for other reasons. The significance of sending a location event report using a signaling connection and NAS transport, as in FIG. 9, may be that it can enable LMF 152 to send a response to UE 105—e.g. to modify or cancel the triggered or periodic location request sent earlier at stage 8 of FIG. 7 or to provide assistance data to UE 105 to enable continued location event reporting. In addition or instead, LMF 152 may use the reachability of UE 105 enabled by the signaling in FIG. 9 to restart UL high efficiency transport from UE 105 for future location event reports (e.g. if UL high efficiency transport from UE 105 has ended due to exhaustion of all UE IDs assigned by ULTF 158 to UE 105 at stage 7 in FIG. 7). LMF 152 signaling access to UE 105 to support these functions may not be possible when UE 105 uses UL high efficiency transport as in FIG. 8 to send a location event report because UE 105 may not be reachable from LMF 152 during and after this transfer.

Stage 1 of FIG. 9 may occur sometime after stage 10 of FIG. 7 (e.g. a few seconds or few minutes afterwards). At stage 1, UE 105 enters an idle state in which there is no signaling connection to NG-RAN 112 or VPLMN 5GC 150. Stage 1 may also occur as stage 1 of FIG. 8 and may not occur as part of the signaling flow for FIG. 9.

At stage 2, while in idle state, UE 105 monitors for the occurrence of a periodic or triggered event associated with location reporting as requested in the LPP RLI received at stage 8 in FIG. 7. When UE 105 detects a periodic or triggered location event at stage 2, UE 105 proceeds to stage 3.

At stage 3, UE 105 obtains location information—e.g. as described for stage 9 of FIG. 3 and stage 1 of FIG. 4.

At stage 4, UE 105 determines to send the location information obtained at stage 3 using a signaling connection and NAS transport as opposed to UL high efficiency transport. For example, the determination to use a signaling connection and NAS transport may be based on the UL high efficiency transport criteria received at stage 8 in FIG. 7. Alternatively, the determination to use a signaling connection and NAS transport may be based on exhaustion by UE 105 of all the UE IDs assigned by ULTF 158 for UL high efficiency transport at stage 7 in FIG. 7 due to sending location events reports using UL high efficiency transport as shown in FIG. 8. In some embodiments, the determination to use a signaling connection and NAS transport may be based at least in part on the location information obtained at stage 3. For example, the UL high efficiency transport criteria received at stage 8 in FIG. 7 may indicate certain locations (e.g. a certain geographic area) within which or outside of which UE 105 is required to send a location event report using a signaling connection and NAS transport. In addition, the determination to use a signaling connection and NAS transport may be based on UE 105 already being in a connected state for other reasons, in which case UE 105 may skip the rest of stage 4.

Based on the determination to use a signaling connection and NAS transport at stage 4 and assuming that UE 105 is not already in a connected state, UE 105 determines a suitable serving cell and associated serving gNB which in this example is gNB 110-1 (though could be any other gNB 110) and requests and obtains a signaling connection to gNB 110-1 and an AMF (which in this example is AMF 154 though could be any other AMF in VPLMN 5GC 150). The procedure to request and obtain the signaling connection may be a procedure defined in 3GPP TS 23.502. As a result of obtaining the signaling connection at stage 4, UE 105 enters a connected state.

At stage 5, UE 105 uses the signaling connection obtained at stage 4 (or obtained prior to stage 4) to send a NAS transport message containing an LPP PLI message to serving AMF 154 via the serving gNB 110-1. The NAS transport message may include the identity of LMF 152 (e.g. as part of a routing ID parameter) and as obtained at stage 8 in FIG. 7. The LPP PLI message may include the location information obtained at stage 3 and an indication of the location event detected by UE 105 at stage 2.

At stage 6, AMF 154 forwards the LPP PLI message received at stage 5 to LMF 152 due to an indication of LMF 152 in the NAS transport message received at stage 5. The LPP PLI may be transported to LMF 152 using some lower layer transport protocol.

At stage 7, LMF 152 determines or verifies a location estimate for UE 105 based on the location information contained in the LPP PLI received at stage 6. LMF 152 may also determine or obtain the location event (e.g. a periodic or triggered event or a codeword based reporting event) being reported by UE 105 based on the received LPP PLI message.

At stage 8, LMF 152 sends a location report to external client 130 (e.g. via VGMLC 155 and/or GMLC 145) containing the location estimate and an indication of the location event for UE 105 determined or obtained by LMF 152 at stage 7.

At stage 9, if LMF 152 has location related information to send to UE 105, LMF 152 may send an LPP message to AMF 154 for forwarding to UE 105. For example, the location related information may include or comprise a request to modify or abort the periodic or triggered location session instigated at stages 6 and 8 in FIG. 7. Alternatively, the location related information may comprise assistance data to assist UE 105 to continue location event reporting. The LPP message sent at stage 9 may be an LPP RLI message to modify the periodic or triggered location session or may be an LPP Abort message to abort the periodic or triggered location session.

At stage 10, AMF 154 forwards the LPP message received at stage 9 to UE 105 via serving gNB 110-1 in a NAS transport message.

At stage 11, stages 5 and 6 and possibly stages 7 and 8 may be repeated by UE 105 to send additional LPP messages to LMF 152 (e.g. additional LPP PLI messages) and/or stages 9 and 10 may be repeated by LMF 152 to send additional LPP messages to UE 105.

At stage 12, if LMF 152 is aware that UL high efficiency transport will no longer be used by UE 105 (e.g. due to receiving an indication from ULTF 158 at stage 10 of FIG. 8 that UL high efficiency transport for UE 105 has ended), LMF 152 may request additional UL high efficiency transport for location event reports from UE 105 by repeating stages 6-11 of FIG. 7. In this repetition, LMF 152 may include an LPP RLI message in the repetition of stages 6 and 8 of FIG. 7 or may include another LPP message (e.g. an LPP Provide Assistance Data) or may not include any LPP message. The repetition of stages 6-11 in FIG. 7 may provide a new set of UE IDs to UE 105 from ULTF 158 which may enable UE 105 to resume sending location event reports using UL high efficiency transport as described for FIG. 8.

At stage 13, if stage 12 has occurred or if UE 105 performed the procedure in FIG. 9 due to the UL high efficiency transport criteria received at stage 8 in FIG. 7, UE 105 may start or resume sending future location events reports using UL high efficiency transport as described for FIG. 8.

Figure 10:
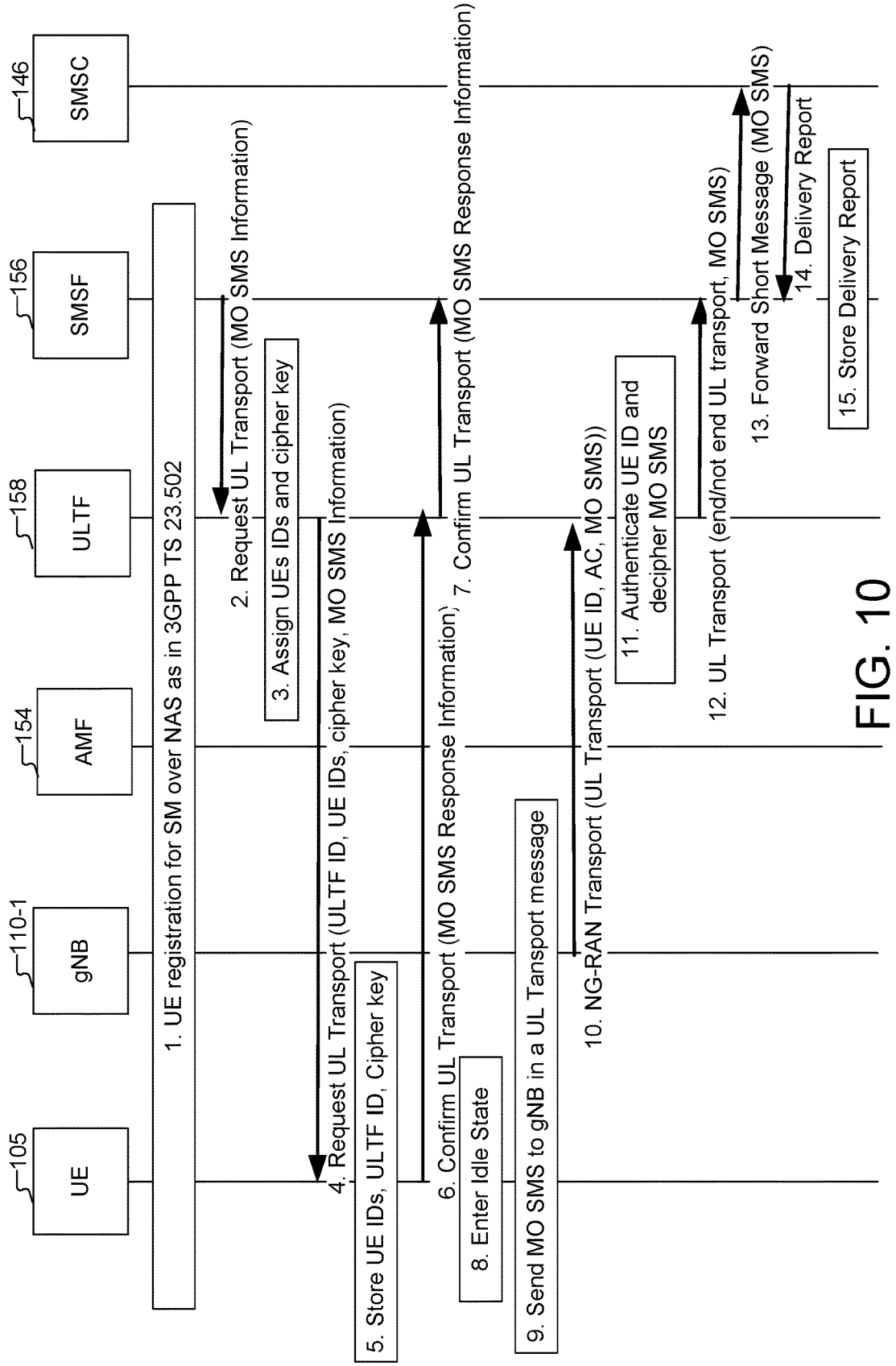
FIG. 10 shows a signaling flow for transport of mobile originated (MO) Short Message Service (SMS) messages using UL high efficiency transport.

FIG. 10 provides one example showing how UL high efficiency transport may be used to efficiently transport mobile originated (MO) SMS messages from UE 105 to another entity such as external client 130. In the example in FIG. 10, ULTF 158 is used to support UL high efficiency transport, which may reduce implementation when ULTF 158 also supports UL high efficiency transport of location information as described previously for FIGS. 7-9.

At stage 1 in FIG. 10, UE 105 registers with AMF 154 and SMSF 156 for Short Message (SM) transfer over Non-Access Stratum (NAS)—e.g. using a procedure defined in 3GPP TS 23.502. As part of the registration, UE 105 may provide an indication to SMSF 156 of support of MO SMS transfer using UL high efficiency transport or AMF 154 may provide such an indication to SMSF 156 based on subscription information for UE 105 received by AMF 154 from UDM 142 (not shown in FIG. 10). UE 105 or AMF 154 (e.g. using UE 105 subscription information) may also provide a priority and/or QoS indication to SMSF 156 at stage 1.

At stage 2, based on the indication of support for UL high efficiency transport for MO SMS received from UE 105 or from AMF 154 at stage 1 or based on other knowledge or expectation of support of UL high efficiency transport by UE 105, SMSF 156 sends a Request UL Transport message to ULTF 158. The Request UL Transport message may include a global identity of UE 105 (e.g. a SUPI), the identity or address of serving AMF 154, an indication of how many MO SMS messages are to be sent from UE 105 using UL high efficiency transport, an optional indication of a priority and/or a QoS (e.g. if received at stage 1), and optionally MO SMS information. The MO SMS information, if included, may include UL high efficiency transport criteria which indicate to UE 105 the conditions for sending an MO SMS message to SMSF 156 using UL high efficiency transport instead of using a signaling connection and NAS transport. For example, the UL high efficiency transport criteria could indicate a maximum period of time during which UE 105 is allowed to send MO SMS messages using UL high efficiency transport and after which UE 105 shall send an MO SMS message using a signaling connection and NAS transport. Alternatively or in addition, the UL high efficiency transport criteria could indicate a maximum number of consecutive MO SMS messages for which UE 105 is allowed to use UL high efficiency transport and after which UE 105 shall send an MO SMS message using a signaling connection and NAS transport. The ability of the UL high efficiency transport criteria to instruct UE 105 when to use a signaling connection and NAS transport may provide a means for SMSF 156 to send or to enable provision of information to UE 105 after UE 105 sends an MO SMS message to SMSF 156. Such information may include for example delivery reports for previous MO SMS messages sent by UE 105 using UL high efficiency transport, a new set of UE IDs (from ULTF 158) to further continue UL high efficiency transport of MO SMS messages from UE 105, and/or mobile terminated (MT) SMS messages sent by an external entity such as external client 130 to UE 105 and stored temporarily at SMSF 156 or SMSC 146.

At stage 3, ULTF 158 assigns a set of one or more UE IDs to UE 105 that are unique among all UE IDs currently in use by ULTF 158. The number of UE IDs in the set of one or more UE IDs may be based on (e.g. may be less than or equal to) the number of MO SMS messages to be sent from UE 105 using UL high efficiency transport that was indicated by SMSF 156 at stage 2. ULTF 158 may also assign or determine a ciphering key. ULTF 158 also stores the assigned UE IDs, the ciphering key, the global UE ID and an ID for SMSF 156. In an embodiment, each of the UE IDs assigned to UE 105 at stage 3 includes an ID for the ULTF 158 (e.g. using extra bits at the beginning or end of each UE ID).

At stage 4, ULTF 158 sends a Request UL Transport message to UE 105 (e.g. via the serving AMF 154 and serving gNB 110-1) to request use of UL high efficiency transport by UE 105 for sending of MO SMS messages by UE 105 to ULTF 158 at a later time. The Request UL Transport message may include the ULTF 158 ID (e.g. if not part of each UE ID), the set of one or more UE IDs and the ciphering key assigned or determined at stage 3 (or information to enable UE 105 to determine or generate the ciphering key), a priority and/or QoS indication (e.g. if received at stage 2), and any SMS MO information received at stage 2.

At stage 5, UE 105 verifies that UE 105 can support the sending of MO SMS messages using UL high efficiency transport. If so, UE 105 stores the ULTF ID (if received), the set of UE IDs and the ciphering key received at (or determined according to) stage 4.

At stage 6, UE 105 returns a Confirm UL Transport message to ULTF 158 (e.g. via the serving gNB 110-1 and serving AMF 154) to confirm that UE 105 can support the request for UL high efficiency transport received at stage 4. The message may include MO SMS Response Information which may be a response or a confirmation to the MO SMS Information sent by SMSF 156 at stage 2. For example, UE 105 may confirm which UL high efficiency transport criteria sent by SMSF 156 at stage 2 can be supported by UE 105.

At stage 7, ULTF 158 sends a Confirm UL Transport message to SMSF 156 to confirm that the request for UL high efficiency transport received from SMSF 156 at stage 2 can be supported. The message includes any MO SMS Response Information received at stage 6.

At stage 8, at some later time (e.g. after a few seconds or minutes following stage 6), UE 105 enters an idle state in which there is no signaling connection to NG-RAN 112 or VPLMN 5GC 150.

At stage 9, while in idle state, UE 105 determines that an MO SMS message needs to be sent to external client 130. For example, the MO SMS message may include telemetry data in the case of an IoT UE, information on the current status of UE 105, location information for UE 105, information input by a user of UE 105 or other information. UE 105 then determines to send the MO SMS message using UL high efficiency transport as opposed to using a signaling connection and NAS transport. For example, the determination to use UL high efficiency transport may be based on the UL high efficiency transport criteria received at stage 4. UE 105 then determines a suitable serving cell and associated serving gNB which in this example is gNB 110-1 (though could be any other gNB 110) and sends an UL Transport message to gNB 110-1 as described for stages 4-7 of FIG. 8 with the difference that instead of including an LPP PLI message in the UL Transport message as for stages 4-7 of FIG. 8, UE 105 includes the MO SMS message in the UL Transport message sent to gNB 110-1. Except for the difference of including the MO SMS message in the UL Transport message sent to gNB 110-1, UE 105 and gNB 110-1 may perform stage 9 of FIG. 10 exactly or almost exactly as described previously for stages 4-7 of FIG. 8. Thus, for example, the UL Transport message sent by UE 105 at stage 9 may include a priority and/or QoS indication (e.g. if received at stage 4). In addition, UE 105 may cipher the MO SMS message using the ciphering key received or determined at stage 4 before including the ciphered MO SMS message in the UL Transport message sent at stage 9 and may include an indication in the UL Transport message that the contained MO SMS message is ciphered.

At stage 10, gNB 110-1 sends an NG-RAN Transport message to ULTF 158 containing the UL Transport message received at stage 9. GNB 110-1 may identify ULTF 158 from the ULTF ID or UE ID (e.g. if the UE ID includes the ULTF ID) received at stage 9. GNB 110-1 may send the NG-RAN Transport message to ULTF 158 either directly if gNB 110-1 can access ULTF 158 directly (e.g. via an operator IP intranet) or via an AMF such as AMF 154. In order to reduce the number of separate signaling messages, gNB 110-1 may send two or more UL Transport messages received from two or more UEs to ULTF 158 using the same NG-RAN Transport message, e.g. if not disallowed by any priority and/or QoS indication sent by UE 105 at stage 9. Furthermore, the two or more UL Transport messages need not be for the same application (e.g. some UL Transport messages may support location reporting events as described for FIG. 8 whereas others may support MO SMS message transport).

At stage 11, ULTF 158 may process the UL Transport message received at stage 10 (or each UL Transport message received at stage 10 if there are more than one) as follows. First, ULTF 158 may process each UL Transport message based on any included indication of priority and/or QoS as described for stage 9 of FIG. 8. When processing an UL Transport message, ULTF 158 may identify the UE which originally sent the UL Transport message using the included UE ID. In this example, the UL Transport message would have been sent by UE 105 at stage 9 and ULTF 158 may identify UE 105 (e.g. may obtain the global ID for UE 105) by verifying that the received UE ID was previously assigned to UE 105 at stage 3. ULTF 158 may next use the ciphering key assigned to or determined for UE 105 at stage 3 to verify the included AC which may authenticate the received UE ID. At the same time (e.g. if part of authentication) or subsequently, ULTF 158 may decipher the MO SMS message included in the UL Transport message if this is ciphered (e.g. if the UL Transport message includes an indication of ciphering).

At stage 12, ULTF 158 sends an UL Transport message to SMSF 156 containing the (e.g. deciphered) MO SMS message, the global UE ID determined at stage 11, an optional indication of priority and/or QoS (e.g. if received at stage 10), and an indication of whether UL high efficiency transport has now ended (e.g. due to use by UE 105 of all the UE IDs originally assigned to UE 105 at stage 3).

At stage 13, SMSF 156 may forward the MO SMS message received at stage 12 to SMSC 146 in the HPLMN 140 for UE 105 (e.g. via a gateway SMS entity in HPLMN 140) for onward transfer by SMSC 146 to external client 130 (or to some other UE). SMSF 156 may also use any priority and/or QoS indication received at stage 12 to determine whether to expedite or not expedite forwarding of the MO SMS message at stage 13.

At stage 14, SMSC 146 may forward the MO SMS message to or towards the final destination (e.g. external client 130 or another UE) (not shown in FIG. 10) and may return a delivery report to SMSF 156.

At stage 15, SMSF 156 may store the delivery report received at stage 14 in order to return the delivery report to UE 105 at a later time—e.g. next time that UE 105 sends an MO SMS message to SMSF 156 using a signaling connection and NAS transport instead of using UL high efficiency transport. UE 105 may instigate a repetition of stages 6-15 at one or more later times to send additional MO SMS messages to an external client using UL high efficiency transport.

Figure 11:
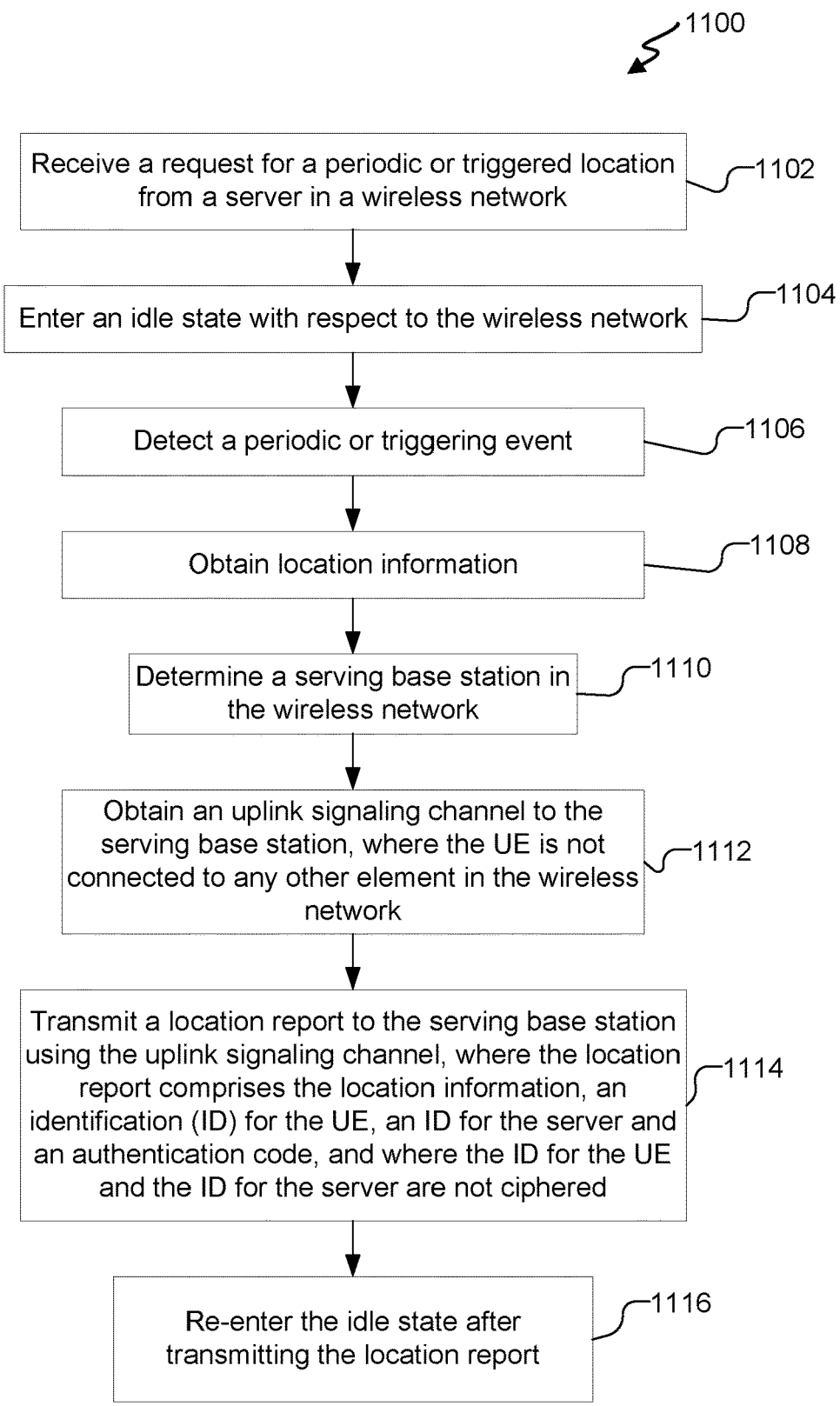
FIG. 11 is a process flow illustrating a method performed by a UE for UL high efficiency transport of location information.

FIG. 11 is a process flow 1100 illustrating a method performed by a UE (e.g. UE 105) for supporting UL high efficiency transport of location information. The UE may start process flow 1100 by receiving a request for a periodic or triggered location from a server in a wireless network at block 1102. The request for the periodic or triggered location may be ciphered. The server may be an LMF (e.g. LMF 152), an AMF (e.g. AMF 154) or a ULTF (e.g. ULTF 158). The wireless network may be a Fifth Generation (5G) wireless network (e.g. may correspond to NG-RAN 112 and VPLMN 5GC 150 in FIG. 1). The UE may also receive at block 1102, along with the request for a periodic or triggered location, at least one of an ID for the server, a first plurality of one or more IDs for the UE, a ciphering key (or information to enable the UE to determine or generate the ciphering key), authentication related information, an indication of a priority and/or a QoS, or a combination thereof. In some embodiments, the ID for the server may be part of each UE ID in the first plurality of UE IDs. Block 1102 may correspond to stage 4 in FIG. 3, stage 14 in FIG. 6 and/or stage 8 in FIG. 7.

At block 1104, the UE enters an idle state with respect to the wireless network. Block 1104 may correspond to stage 7 in FIG. 3 and/or stage 1 in FIG. 8.

At block 1106, the UE detects a periodic or triggering event. The periodic or triggering event may, for example, correspond to a fixed periodic timer expiration, to the UE entering, leaving or remaining within a defined geographic area or to the UE moving by more than some threshold distance from a previous location for the UE. In some embodiments. the periodic or triggering event may be identified by a codeword—e.g. when codeword based reporting is used as described in association with FIG. 3. For example, in these embodiments, the request for the periodic or triggered location may include the codeword, where the codeword is assigned by an external client (e.g. external client 130) and is not interpreted by the wireless network. Block 1106 may correspond to stage 8 in FIG. 3, stage 20 in FIG. 6 and/or stage 2 in FIG. 8.

At block 1108, the UE obtains location information. The location information may comprise at least one of a serving cell ID, IDs for visible cells, downlink measurements, a location estimate for the UE, or a combination thereof. Here, the downlink measurements may comprise downlink measurements for cells in the wireless network (e.g. measurements of RSTD, RSRP, RSRQ, RTT and/or AOA), downlink measurements (e.g. measurements of RTT, RSSI and/or AOA) for wireless local area network (WLAN) access points (e.g. IEEE 802.11 WiFi APs), downlink measurements for a Global Navigation Satellite System (GNSS) (e.g. measurements of a pseudorange, code phase and/or carrier phase), or some combination of these. Block 1108 may correspond to part of stage 1 in FIG. 4, part of stage 21 in FIG. 6 and/or stage 3 in FIG. 8.

At block 1110, the UE determines a serving base station in the wireless network. The serving base station may be a gNB (e.g. a gNB 110 such as gNB 110-1) or an ng-eNB (e.g. an ng-eNB in NG-RAN 112). Block 1110 may correspond to part of stage 1 in FIG. 4, part of stage 21 in FIG. 6 and/or part of stage 4 in FIG. 8.

At block 1112, the UE obtains an uplink signaling channel to the serving base station, where the UE is not connected to any other element (e.g. such as an AMF or LMF) in the wireless network. The uplink signaling channel may correspond to a two-way (e.g. duplex) signaling channel, an uplink signaling connection or a temporary signaling connection in some embodiments. Block 1112 may correspond to stages 2 and 3 in FIG. 4 and/or to stages 4 and 5 in FIG. 8. In an embodiment, the UE may perform block 1112 by sending a request to the serving base station for the uplink signaling channel (e.g. as at stage 2 in FIG. 4 or stage 4 in FIG. 8), and receiving an assignment for the uplink signaling channel from the serving base station (e.g. as at stage 3 in FIG. 4 or stage 5 in FIG. 8).

At block 1114, the UE transmits a location report to the serving base station using the uplink signaling channel obtained at block 1112. The location report may be transmitted to the serving base station using a Radio Resource Control (RRC) protocol (e.g. as defined by 3GPP for NR radio access or LTE radio access). The location report may comprise the location information obtained at block 1108, an identification (ID) for the UE, an ID for the server and an authentication code. The ID for the UE and the ID for the server may not be ciphered. However, the UE may cipher the location information using the ciphering key received at (or determined according to) block 1102 (e.g. if the ciphering key is received or indicated at block 1102). The ID for the server may in some embodiments be part of the ID for the UE and may not be a separate parameter. The ID for the server (e.g. if included as a separate parameter in the location report) may have been received by the UE at block 1102. The ID for the UE may be one of the first plurality of one or more IDs for the UE received by the UE at block 1102. The authentication code may authenticate the ID for the UE and may be determined by the UE using the authentication related information or the ciphering key received or determined by the UE at block 1102. Block 1114 may correspond to stage 4 in FIG. 4, part of stage 21 in FIG. 6 and/or stage 6 in FIG. 8.

At block 1116, the UE re-enters the idle state after transmitting the location report at block 1114. Block 1116 may correspond to stage 8 in FIG. 4 and/or part of stage 7 in FIG. 8.

In some embodiments, the process flow 1100 may comprise additional actions. For example, in one embodiment, the UE may receive a second plurality of one or more IDs for the UE from the server after all IDs in the first plurality of one or more ID for the UE have been included in location reports sent according to block 1114. This embodiment may correspond to stage 12 in FIG. 9 from the perspective of the UE.

In another embodiment of the process flow 1100, the UE may include the indication of the priority and/or the QoS in the location report transmitted to the serving base station at block 1114. For example, the base station may use the indication of the priority and/or the QoS to determine how quickly and/or how reliably to transfer the location information to the server as described for stage 8 of FIG. 8.

In another embodiment of the process flow 1100, the UE may receive assistance data to help obtain the location estimate and/or some or all of the downlink measurements obtained at block 1108. The assistance data may be obtained by the UE from information that is broadcast from base stations in the wireless network (e.g. broadcast in system information blocks for NR or LTE radio access by a gNB 110 or an ng-eNB).

In a further embodiment of the process flow 1100, the UE may indicate to the serving base station that additional location reports are to be transmitted. For example, the indication may be included in the location report transmitted at block 1114 (e.g. as at stage 4 in FIG. 4). The UE may then receive an additional uplink channel assignment information from the serving base station (e.g. following block 1114), and may transmit the additional location reports to the serving base station using the additional uplink channel assignment information (e.g. as at stage 5 in FIG. 4).

In another embodiment of process flow 1100, the location report transmitted at block 1114 is segmented with the location information provided in multiple location report messages.

In another embodiment of process flow 1100, the UE receives an acknowledgment from the serving base station (e.g. as at stage 7 in FIG. 4 or stage 7 of FIG. 8) that the location report transmitted at block 1114 was received by the serving base station prior to the UE re-entering the idle state.

In another embodiment of the process flow 1100, the request for the periodic or triggered location received at block 1102 comprises a first positioning protocol message. In this embodiment, the UE may include a second positioning protocol message in the location report transmitted at block 1114, where the second positioning protocol message comprises the location information. For example, the first positioning protocol message may be an LPP (or NPP) Request Location Information message as at stage 14 in FIG. 6 or stage 8 in FIG. 7, and the second positioning protocol message may be an LPP Provide Location Information message, as at stage 21 in FIG. 6 or stage 6 in FIG. 8.

Figure 12:
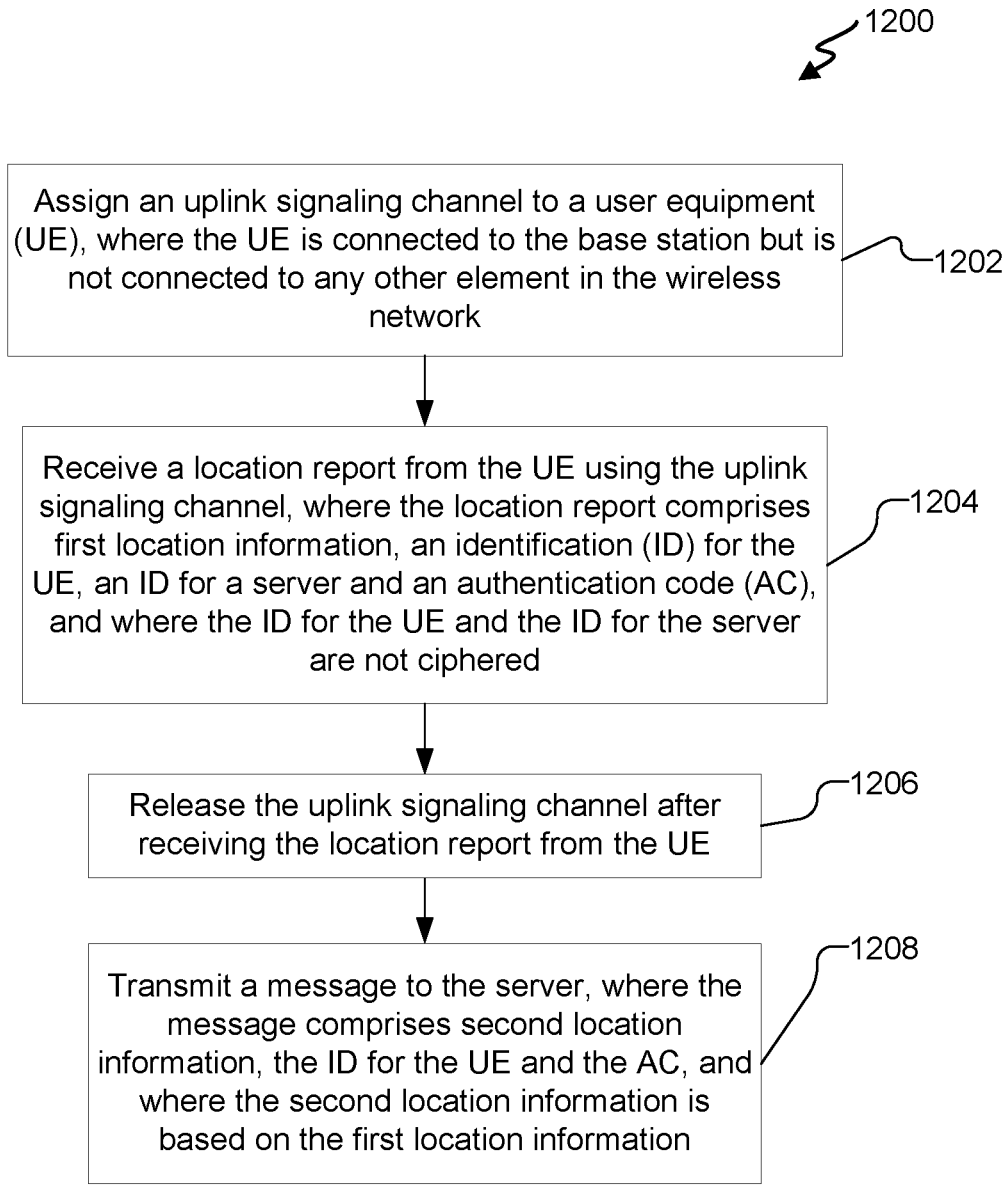
FIG. 12 is a process flow illustrating a method performed by a base station for UL high efficiency transport of location information.

FIG. 12 is a process flow 1200 illustrating a method performed by a base station in a wireless network for support of UL high efficiency transport of location information. The wireless network may be a Fifth Generation (5G) or New Radio (NR) wireless network such as NG-RAN 112 and VPLMN 5GC 150 in FIG. 1. The base station may be a New Radio (NR) NodeB (gNB) such as gNB 110-1 in FIG. 1 or a Next Generation evolved NodeB (ng-eNB) such as an ng-eNB in NG-RAN 112 in FIG. 1.

The base station may start process flow 1200 at block 1202 by assigning an uplink signaling channel to a user equipment (UE), where the UE is connected to the base station but is not connected to any other element in the wireless network. The UE may correspond to UE 105 in FIGS. 1-4 and 6-10. The uplink signaling channel may correspond to a two-way (e.g. duplex) signaling channel, an uplink signaling connection or a temporary signaling connection in some embodiments. As an example of block 1202, the base station may receive a request from the UE for the uplink signaling channel; and may then transmit an assignment for the uplink signaling channel to the UE. Block 1202 may correspond to stages 2 and 3 in FIG. 4 and/or stages 4 and 5 in FIG. 8.

At block 1204, the base station receives a location report from the UE using the uplink signaling channel, where the location report comprises first location information, an identification (ID) for the UE, an ID for a server and an authentication code (AC), where the ID for the UE and the ID for the server are not ciphered. In some embodiments, the ID for the server may be part of the ID for the UE. The server may be an LMF (e.g. LMF 152), an AMF (e.g. AMF 154) or a ULTF (e.g. ULTF 158). The first location information may comprise at least one of a serving cell ID, IDs for visible cells, downlink measurements for cells in the wireless network, downlink measurements for wireless local area network (WLAN) access points (e.g. IEEE 802.11 WiFi APs), downlink measurements for a Global Navigation Satellite System (GNSS), a location estimate for the UE, or a combination thereof. In an aspect, the location report received at block 1204 is segmented with the first location information received by the base station from the UE in multiple messages. In an aspect, the location report is received from the UE at block 1204 using a Radio Resource Control (RRC) protocol. Block 1204 may correspond to stage 4 in FIG. 4, part of stage 21 in FIG. 6 or stage 6 in FIG. 8.

At block 1206, the base station releases the uplink signaling channel after receiving the location report from the UE. Block 1206 may correspond to stage 7 in FIG. 4 or stage 7 in FIG. 8.

At block 1208, the base station transmits a message to the server, where the message comprises second location information, the ID for the UE and the AC, and where the second location information is based on the first location information. In one aspect, the second location information comprises the first location information. The server may be identified by the base station from the ID for the server received at block 1204. In an aspect, the base station includes location information for at least one other UE in the message transmitted at block 1208. In an aspect, the message is a message for a New Radio Positioning Protocol A (NRPPa). Block 1208 may correspond to stage 11 in FIG. 3, stage 23 in FIG. 6, or stage 8 in FIG. 8.

In an aspect, the location report received at block 1204 further comprises an indication of a priority and/or an indication of a QoS. In this aspect, process flow 1200 may further comprise transmitting the message to the server at block 1208 with low delay when the indication of the priority indicates high priority or the indication of the QoS indicates low delay. In this aspect, process flow 1200 may further comprise including the indication of the priority and/or the indication of the QoS in the message transmitted to the server at block 1208.

In an aspect, the process flow 1200 may include additional actions. For example, the base station may receive an indication from the UE that additional location reports are to be transmitted; For example, the indication may be included as part of the location report received at block 1204, e.g. as at stage 4 for FIG. 4. The base station may then transmit additional uplink channel assignment information to the UE. The base station may also receive the additional location reports from the UE using the additional uplink channel assignment information, e.g. as at stage 5 in FIG. 4.

As another aspect of the process flow 1200, the base station may compute a location for the UE based on the first location information received at block 1204, e.g. as at stage 10 in FIG. 3 or stage 22 in FIG. 6. In this aspect, the base station may include the location for the UE in the second location information transmitted to the server as part of block 1208.

In another aspect of the process flow 1200, the base station may obtain at least one uplink measurement of signals transmitted by the UE, e.g. as at stage 10 in FIG. 3 or stage 6 in FIG. 4. The at least one uplink measurement may be a measurement of an RSSI, RSRP, RSRQ, AOA, Rx-Tx time and/or RTT. In this aspect, the base station may include the at least one uplink measurement in the second location information transmitted to the server at block 1208, e.g. as at stage 11 in FIG. 3.

In another aspect of the process flow 1200, the first location information, the ID for the UE, and the AC received at block 1204 are transparent to the base station. For example, the base station may not decode, interpret or modify any of the first location information, the ID for the UE, and the AC, e.g. as described for stage 6 of FIG. 8.

Figure 13:
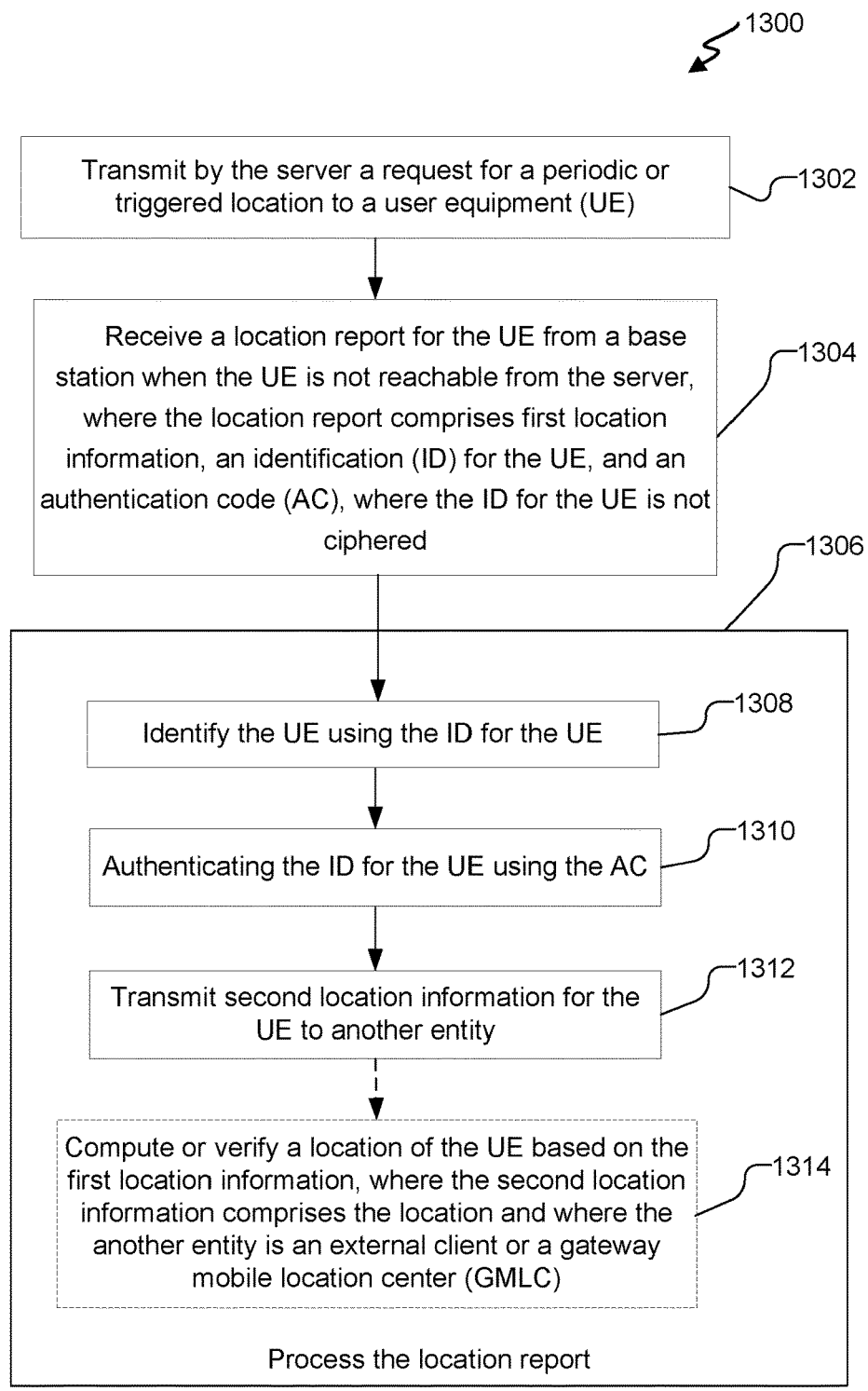
FIG. 13 is a process flow illustrating a method performed by a server for UL high efficiency transport of location information.

FIG. 13 is a process flow 1300 illustrating a method performed by a server in a wireless network for support of UL high efficiency transport of location information. The wireless network may be a Fifth Generation (5G) or New Radio (NR) wireless network such as NG-RAN 112 and VPLMN 5GC 150 in FIG. 1. The server may be an LMF (e.g. LMF 152), an AMF (e.g. AMF 154) or a ULTF (e.g. ULTF 158).

The server may start process flow 1300 at block 1302 by transmitting a request for a periodic or triggered location to a user equipment (UE) such as UE 105 in FIG. 1. In an aspect, the request for the periodic or triggered location is ciphered either by the server or by an intermediate downstream network element such as a serving AMF for the UE (e.g. a AMF 154 in FIG. 1) or a serving ng-eNB or serving gNB for the UE (e.g. gNB 110-1 in FIG. 1). Block 1302 may correspond to stage 4 in FIG. 3, stage 14 in FIG. 6 or stage 8 in FIG. 7.

At block 1304, the server receives a location report for the UE from a base station when the UE is not reachable from the server, where the location report comprises first location information, an identification (ID) for the UE, and an authentication code (AC), and where the ID for the UE is not ciphered. The base station may be a gNB such as a gNB 110 in FIG. 1 or an ng-eNB (e.g. an ng-eNB in NG-RAN 112). The first location information may comprise at least one of a serving cell ID, IDs for visible cells, downlink measurements for cells in the wireless network, downlink measurements for wireless local area network (WLAN) access points (e.g. IEEE 802.11 WiFi APs), downlink measurements for a Global Navigation Satellite System (GNSS), uplink measurements of the UE obtained by the base station, a location estimate for the UE, or a combination thereof. The location report may be received at block 1304 in a message for the NRPPa protocol. Block 1304 may correspond to stage 11 in FIG. 3, stage 23 in FIG. 6 or stage 8 in FIG. 8.

At block 1306, the server processes the location report received at block 1304. The processing at block 1306 may comprise the actions shown in FIG. 13 and described below for blocks 1308, 1310, 1312 and, optionally, 1314.

At block 1308, the server identifies the UE using the ID for the UE received at block 1304, e.g. as at stage 12 in FIG. 3 or stage 9 in FIG. 8.

At block 1310, the server authenticates the ID for the UE using the authentication code received at stage 1304, e.g. as at stage 12 in FIG. 3 or stage 9 in FIG. 8.

At block 1312, the server transmits second location information for the UE to another entity. The other entity may be an external client (e.g. external client 130 in FIG. 1), a location server such as an LMF (e.g. LMF 152 in FIG. 1) or a GMLC (e.g. VGMLC 155 in FIG. 1). The second location information may be the same as or may be based on the first location information. Block 1312 may correspond to stage 13 in FIG. 3, stage 25 or stage 27 in FIG. 6, or stage 10 in FIG. 8.

At block 1314 which may be optional and not performed in all aspects of process flow 1300, the server computes or verifies a location of the UE based on the first location information, where the second location information comprises the location and where the other entity is an external client (e.g. external client 130) or a GMLC (e.g. VGMLC 155). Block 1314 may correspond to part of stage 12 in FIG. 3 or stage 24 in FIG. 6. When block 1314 is performed, the server may comprise an LMF (e.g. LMF 152 in FIG. 1).

In an aspect (e.g. when block 1314 is not performed by the server), the second location information may comprise the first location information and the other entity may be a location server such as an LMF (e.g. LMF 152 in FIG. 1). In this aspect, the server may be an AMF (e.g. AMF 154 in FIG. 1) or a ULTF (e.g. ULTF 158 in FIG. 1). This aspect may be as exemplified by the ULTF 158 actions in FIGS. 7-9.

Process flow 1300 may include additional actions in some further aspects. In one further aspect, the server transmits to the UE at block 1302 along with the request for a periodic or triggered location, at least one of an ID for the server, a first plurality of one or more IDs for the UE, a ciphering key (or information to enable the UE to determine or generate the ciphering key), authentication related information, an indication of a priority, an indication of a QoS, or a combination thereof. This aspect may occur as described for stage 4 for FIG. 3, stage 14 of FIG. 6 or stage 8 of FIG. 7. In this aspect, the first location information received at block 1304 may be ciphered using the ciphering key. Also or instead in this aspect, the ID for the UE received at block 1304 may be an ID from the first plurality of one or more IDs for the UE. Further in this aspect, the server may transmit a second plurality of one or more IDs for the UE to the UE after all IDs (or nearly all IDs) in the first plurality of one or more IDs for the UE have been included by the UE in location reports, e.g. as described for stage 12 of FIG. 9. In addition in this aspect, the ID for the server may be part of each ID in the first plurality of one or more IDs for the UE. Further in this aspect, the location report received at block 1304 may comprise at least one of the indication of the priority or the indication of the QoS. In this aspect, the server may process the location report at block 1306 with low delay when the indication of the priority indicates high priority or the indication of the QoS indicates low delay.

In another aspect of the process flow 1300, the location report for the UE is received by the server from the base station in a message at block 1304, where the message contains a location report for at least one other UE. The message may be an NRPPa message.

In a further aspect of the process flow 1300, the request for the periodic or triggered location transmitted at block 1302 comprises a first positioning protocol message, and the location report received at block 1304 comprises a second positioning protocol message, where the second positioning protocol message comprises the first location information. In this aspect, the first positioning protocol message may comprise an LPP (or an NPP) Request Location Information message (e.g. as at stage 14 in FIG. 6 or stage 8 in FIG. 7), and the second positioning protocol message may comprise an LPP (or NPP) Provide Location Information message (e.g. as at stage 23 in FIG. 6 or stage 8 in FIG. 8).

Figure 14:
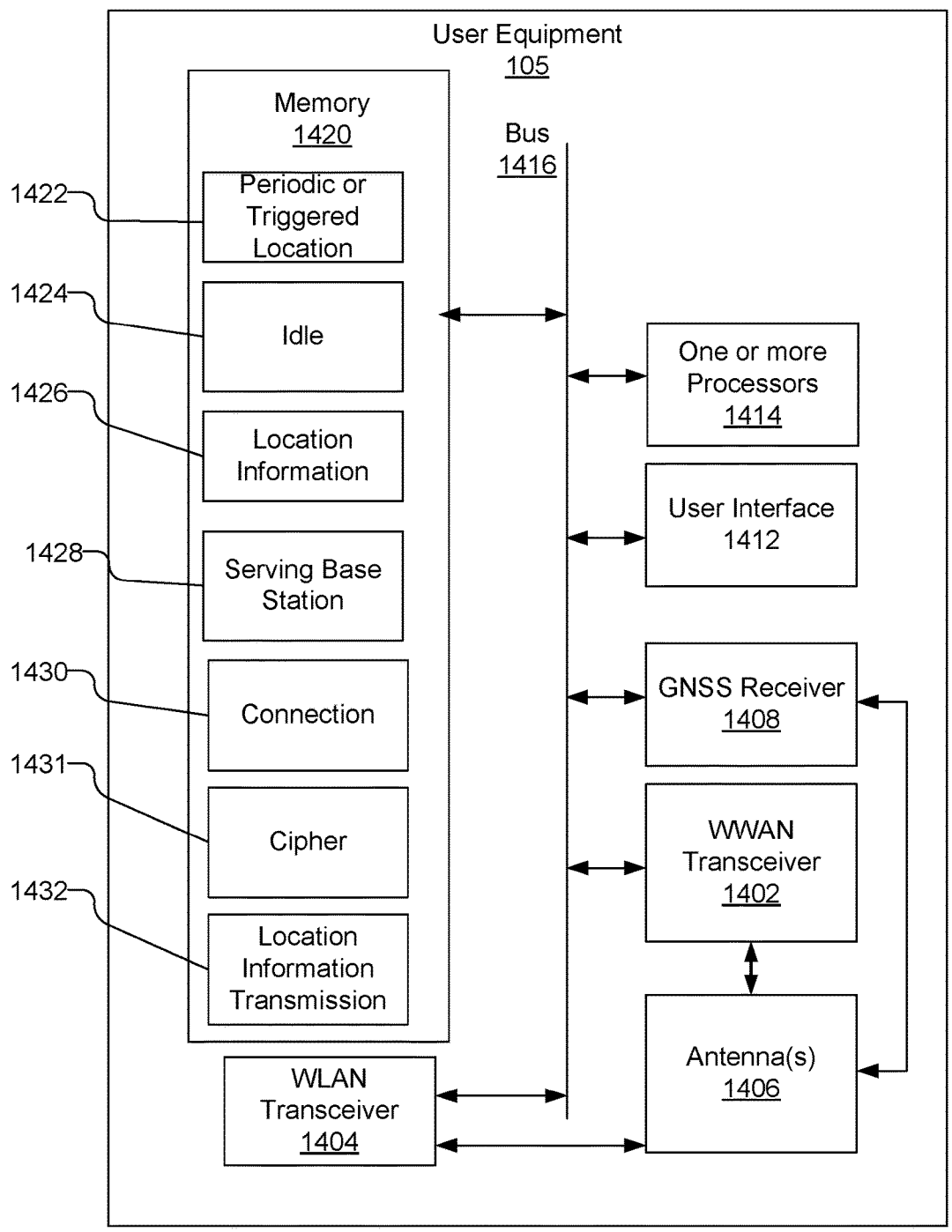
FIG. 14 is a diagram illustrating an example of a hardware implementation of a UE.

FIG. 14 is a diagram illustrating an example of a hardware implementation of UE 105. The UE 105 may include a Wireless Wide Area Network (WWAN) transceiver 1402 to wirelessly communicate with, e.g., cellular transceivers such as gNB 110-1. The UE 105 may also include a WLAN transceiver 1404 to wirelessly communicate with local transceivers (e.g. WiFi APs or BT APs). The UE 105 may include one or more antennas 1406 that may be used with the WWAN transceiver 1402 and WLAN transceiver 1404. The UE 105 may further include a GNSS receiver 1408 for receiving and measuring signals from GNSS SVs 190 (as shown in FIG. 1). The UE 105 may further include a user interface 1412 that may include e.g., a display, a keypad, a microphone, a speaker, or other input device, such as virtual keypad on the display, through which a user may interface with the UE 105.

The UE 105 further includes one or more processors 1414 and memory 1420, which may be coupled together with a bus 1416. The one or more processors 1414 and other components of the UE 105 may similarly be coupled together with bus 1416, a separate bus, or may be directly connected together or coupled using a combination of the foregoing. The memory 1420 may contain executable code or software instructions that when executed by the one or more processors 1414 cause the one or more processors 1414 to operate as a special purpose computer programmed to perform the techniques disclosed herein. As illustrated in FIG. 14, the memory 1420 may include one or more components or modules that may be implemented by the one or more processors 1414 to perform the methodologies described herein. While the components or modules are illustrated as software in memory 1420 that is executable by the one or more processors 1414, it should be understood that the components or modules may be firmware or dedicated hardware either in the one or more processors 1414 or off the processors.

The memory 1420 may include a periodic or triggered location unit 1422 that when implemented by the one or more processors 1414 configures the one or more processors 1414 to receive periodic or triggered location requests and monitor for periodic or triggering events. The request for a periodic or triggered location may include a codeword that is assigned by an external client and not interpreted by the wireless network, where the codeword may identify the periodic or triggering event(s). The one or more processors 1414 may be further configured to receive along with the request for the periodic or triggered location at least one of an ID for a server, a first plurality of one or more IDs for the UE, a ciphering key (or information to enable the UE 105 to determine or generate a ciphering key), authentication related information, an indication of a priority, an indication of a Quality of Service (QoS), or a combination thereof. The request for the periodic or triggered location may be ciphered. The memory 1420 further includes an idle unit 1424 that when implemented by the one or more processors 1414 configures the one or more processors 1414 to cause the UE 105 to enter an idle state. The one or more processors 1414 may be configured to cause the UE 105 re-enter an idle state after receiving an acknowledgment from a serving base station that a location report was received by the serving base station. A location information unit 1426 when implemented by the one or more processors 1414 configures the one or more processors 1414 to obtain location information, such as a serving cell ID, IDs for visible cells, downlink measurements for cells in a wireless network, downlink measurements for WLAN APs, downlink measurements for a GNSS, a location estimate for the UE 105, or a combination thereof. The one or more processors 1414 may be further configured to receive assistance data for the downlink measurements and/or the location estimate, where the assistance data is broadcast from base stations in the wireless network. A serving base station unit 1428 and a connection unit 1430 when implemented by the one or more processors 1414 configures the one or more processors 1414 to determine a serving base station and obtain an uplink signaling channel to the serving base station, but not connect to any other element in the wireless network. The one or more processors 1414 may be configured to send a request to the serving base station for the uplink signaling channel, and receive an assignment for the uplink signaling channel from the serving base station. A location information transmission unit 1432 when implemented by the one or more processors 1414 configures the one or more processors 1414 to cause the WWAN transceiver 1402 to transmit a location report to the serving base station using the uplink signaling channel, where the location report may include the location information, an identification (ID) for the UE, an ID for the server and an authentication code, where the ID for the UE and the ID for the server are not ciphered. The location report may be segmented with the location information provided in multiple messages. The ID for the UE 105 may be an ID from the first plurality of one or more IDs for the UE 105 received with the periodic or triggered location request. The request for the periodic or triggered location may include a first positioning protocol message, and the location report may include a second positioning protocol message that includes the location information. For example, the first positioning protocol message may be a Long Term Evolution Positioning Protocol (LPP) Request Location Information message, and the second positioning protocol message may be an LPP Provide Location Information message. The one or more processors 1414 may be further configured to receive a second plurality of one or more IDs for the UE 105 from the server after all IDs in the first plurality of one or more IDs for the UE 105 have been included in location reports. A cipher unit 1431 when implemented by the one or more processors 1414 configures the one or more processors 1414 to cipher the location information using a ciphering key received with (or determined according to) the periodic or triggered location request. The one or more processors 1414 may be further configured to include the indication of the priority or the indication of the QoS in the location report transmitted to the serving base station. The one or more processors 1414 may be further configured to indicate to the serving base station that additional location reports are to be transmitted, receive additional uplink channel assignment information from the serving base station, and transmit the additional location reports to the serving base station using the additional uplink channel assignment information.

The methodologies described herein may be implemented by various means depending upon the application. For example, these methodologies may be implemented in hardware, firmware, software, or any combination thereof. For a hardware implementation, the one or more processors 1414 may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For an implementation of UE 105 involving firmware and/or software, the methodologies may be implemented with modules (e.g., procedures, functions, and so on) that perform the separate functions described herein. Any machine-readable medium tangibly embodying instructions may be used in implementing the methodologies described herein. For example, software codes may be stored in a memory (e.g. memory 1420) and executed by one or more processors 1414, causing the one or more processors 1414 to operate as a special purpose computer programmed to perform the techniques disclosed herein. Memory may be implemented within the one or processors 1414 or external to the one or more processors 1414. As used herein the term "memory" refers to any type of long term, short term, volatile, nonvolatile, or other memory and is not to be limited to any particular type of memory or number of memories, or type of media upon which memory is stored.

If implemented in firmware and/or software, the functions performed by UE 105 may be stored as one or more instructions or code on a non-transitory computer-readable storage medium such as memory 1420. Examples of storage media include computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage, semiconductor storage, or other storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

In addition to storage on computer-readable storage medium, instructions and/or data for UE 105 may be provided as signals on transmission media included in a communication apparatus. For example, a communication apparatus comprising part or all of UE 105 may include a transceiver having signals indicative of instructions and data. The instructions and data are stored on non-transitory computer readable media, e.g., memory 1420, and are configured to cause the one or more processors 1414 to operate as a special purpose computer programmed to perform the techniques disclosed herein. That is, the communication apparatus includes transmission media with signals indicative of information to perform disclosed functions. At a first time, the transmission media included in the communication apparatus may include a first portion of the information to perform the disclosed functions, while at a second time the transmission media included in the communication apparatus may include a second portion of the information to perform the disclosed functions.

Thus, a user equipment, such as UE 105, may include a means for receiving a request for a periodic or triggered location from a server in a wireless network, which may be, e.g., the WWAN transceiver 1402 and one or more processors 1414 with dedicated hardware or implementing executable code or software instructions in memory 1420 such as the periodic or triggered location unit 1422. A means for entering an idle state with respect to the wireless network may be, e.g., one or more processors 1414 with dedicated hardware or implementing executable code or software instructions in memory 1420 such as the idle unit 1424. A means for detecting a periodic or triggering event may be, e.g., one or more processors 1414 with dedicated hardware or implementing executable code or software instructions in memory 1420 such as the periodic or triggered location unit 1422. A means for obtaining location information may be, e.g., the WWAN transceiver 1402, the WLAN transceiver 1404, the GNSS Receiver 1408, and one or more processors 1414 with dedicated hardware or implementing executable code or software instructions in memory 1420 such as the location information unit 1426. A means for determining a serving base station in the wireless network may be, e.g., one or more processors 1414 with dedicated hardware or implementing executable code or software instructions in memory 1420 such as the serving base station unit 1428. A means for obtaining an uplink signaling channel to the serving base station, wherein the UE 105 is not connected to any other element in the wireless network, may be, e.g., the WWAN transceiver 1402 and one or more processors 1414 with dedicated hardware or implementing executable code or software instructions in memory 1420 such as the connection unit 1430. A means for transmitting a location report to the serving base station using the uplink signaling channel, where the location report comprises the location information, an identification (ID) for the UE 105, an ID for the server and an authentication code, where the ID for the UE 106 and the ID for the server are not ciphered, may be, e.g., the WWAN transceiver 1402 and one or more processors 1414 with dedicated hardware or implementing executable code or software instructions in memory 1420 such as the location information transmission unit 1432. A means for re-entering the idle state after transmitting the location report may be, e.g., one or more processors 1414 with dedicated hardware or implementing executable code or software instructions in memory 1420 such as the idle unit 1424.

The UE 105 may further include a means for receiving along with the request for a periodic or triggered location at least one of the ID for the server, a first plurality of one or more IDs for the UE 105, a ciphering key (or information to enable UE 105 to determine or generate a ciphering key), authentication related information an indication of a priority, an indication of a Quality of Service (QoS), or a combination thereof, which may be, e.g., the WWAN transceiver 1402 and one or more processors 1414 with dedicated hardware or implementing executable code or software instructions in memory 1420 such as the periodic or triggered location unit 1422. The UE 105 may further include a means for ciphering the location information using the ciphering key, which may be, e.g., the cipher unit 1431 and one or more processors 1414 with dedicated hardware or implementing executable code or software instructions in memory 1420. The UE 105 may further include a means for receiving a second plurality of one or more IDs for the UE 105 from the server after all IDs in the first plurality of one or more IDs for the UE 105 have been included in location reports, which may be, e.g., the WWAN transceiver 1402 and one or more processors 1414 with dedicated hardware or implementing executable code or software instructions in memory 1420 such as the periodic or triggered location unit 1422. The UE 105 may further include a means for including the indication of the priority or the indication of the QoS in the location report transmitted to the serving base station, which may be, e.g., the WWAN transceiver 1402 and one or more processors 1414 with dedicated hardware or implementing executable code or software instructions in memory 1420 such as the location information transmission unit 1432. The UE 105 may further include a means for receiving assistance data for the downlink measurements and/or the location estimate, where the assistance data is broadcast from base stations in the wireless network, which may be, e.g., the WWAN transceiver 1402 and one or more processors 1414 with dedicated hardware or implementing executable code or software instructions in memory 1420 such as the location information unit 1426. The UE 105 may further include a means for receiving an acknowledgment from the serving base station that the location report was received by the serving base station prior to re-entering the idle state, which may include, e.g., the WWAN transceiver 1402 and the one or more processors 1414 with dedicated hardware or implementing executable code or software instructions in memory 1420 such as the idle unit 1424.

The UE 105 may further include means for indicating to the serving base station that additional location reports are to be transmitted, which may include, e.g., the WWAN transceiver 1402 and one or more processors 1414 with dedicated hardware or implementing executable code or software instructions in memory 1420 such as the location information transmission unit 1432. A means for receiving additional uplink channel assignment information from the serving base station may be, e.g., the WWAN transceiver 1402 and one or more processors 1414 with dedicated hardware or implementing executable code or software instructions in memory 1420 such as the connection unit 1430. A means for transmitting the additional location reports to the serving base station using the additional uplink channel assignment information may be, e.g., the WWAN transceiver 1402 and one or more processors 1414 with dedicated hardware or implementing executable code or software instructions in memory 1420 such as the location information transmission unit 1432. The request for the periodic or triggered location may include a first positioning protocol message, and the UE 105 may further include means for including a second positioning protocol message in the location report, where the second positioning protocol message comprises the location information, which may be, e.g., the WWAN transceiver 1402 and one or more processors 1414 with dedicated hardware or implementing executable code or software instructions in memory 1420 such as the location information transmission unit 1432.

Figure 15:
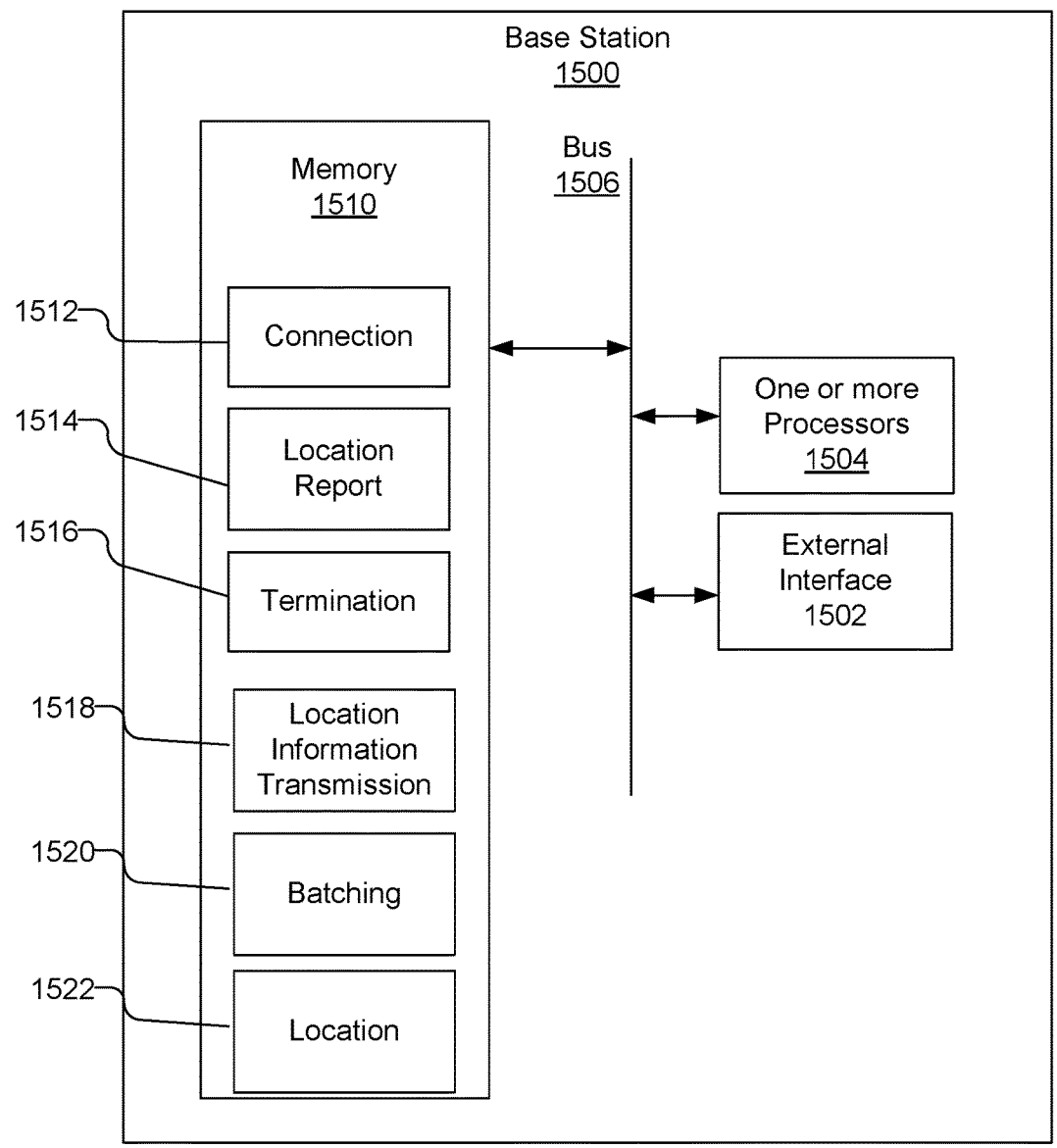
FIG. 15 is a diagram illustrating an example of a hardware implementation of a base station.

FIG. 15 is a diagram illustrating an example of a hardware implementation of a base station 1500. The base station 1500 may be, e.g., a New Radio (NR) NodeB (gNB) such as a gNB 110 or a Next Generation evolved NodeB (ng-eNB). The base station 1500 may perform the process flow 1200 of FIG. 12. The base station 1500 includes, e.g., hardware components such as an external interface 1502, which may comprise one or more wired and/or wireless interfaces capable of connecting to UE 105 and to elements in a wireless network (e.g. VPLMN 5GC 150) directly or through one or more intermediary networks and/or one or more network entities. The external interface 1502 may include one or more antennas (not shown in FIG. 15) to support a wireless interface to UE 105 and/or a wireless backhaul to elements in VPLMN 5GC 150. The base station 1500 includes one or more processors 1504 and memory 1510, which may be coupled together with a bus 1506. The memory 1510 may contain executable code or software instructions that when executed by the one or more processors 1504 cause the one or more processors 1504 to operate as a special purpose computer programmed to perform the techniques disclosed herein. As illustrated in FIG. 15, the memory 1510 may include one or more components or modules that may be implemented by the one or more processors 1504 to perform the methodologies as described herein. While the components or modules are illustrated as software in memory 1510 that is executable by the one or more processors 1504, it should be understood that the components or modules may be firmware or dedicated hardware either in the one or more processors 1504 or off the processors.

For example, the memory 1510 may include a connection unit 1512 that when implemented by the one or more processors 1504 configures the one or more processors 1504 to assign an uplink signaling channel to a user equipment (UE), wherein the UE is connected to the base station but is not connected to any other element in a wireless network. The one or more processors 1504 may be configured to receive a request from the UE for the uplink signaling channel, and transmit an assignment for the uplink signaling channel to the UE. A location report unit 1514 when implemented by the one or more processors 1504 enables the one or more processors 1504 to receive a location report from the UE using the uplink signaling channel, where the location report comprises first location information, an identification (ID) for the UE, an ID for a server and an authentication code (AC), where the ID for the UE and the ID for the server are not ciphered. The location report may be segmented with the location information provided in multiple messages. The location information may include at least one of a serving cell ID, IDs for visible cells, downlink measurements for cells in the wireless network, downlink measurements for wireless local area network (WLAN) access points, downlink measurements for a Global Navigation Satellite System (GNSS), a location estimate for the UE, or a combination thereof. The one or more processors 1504 may be configured to receive an indication from the UE that additional location reports are to be transmitted, transmit additional uplink channel assignment information to the UE, and receive the additional location reports from the UE using the additional uplink channel assignment information. A termination unit 1516 when implemented by the one or more processors 1504 configures the one or more processors 1504 to release the uplink signaling channel after the location report is received from the UE. A batching unit 1520 when implemented by the one or more processors 1504 may configure the one or more processors 1504 to include second location information, the ID for the UE, and the AC in a message, where the second location information is based on (e.g. is the same as) the first location information. A location information transmission unit 1518 when implemented by the one or more processors 1504 configures the one or more processors 1504 to cause the external interface 1502 to transmit the message to the server, where the message may include the second location information, the ID for the UE, and the AC. The one or more processors 1504 may be configured to include location information for at least one other UE in the message. The location report may further comprise an indication of a priority or an indication of a Quality of Service (QoS), and the one or more processors 1504 may be configured to transmit the message with low delay when the indication of the priority indicates high priority or the indication of the QoS indicates low delay. The one or more processors 1504 may be further configured to include the indication of the priority or the indication of the QoS in the message. A location unit 1522 when implemented by the one or more processors 1504 configures the one or more processors 1504 to obtain at least one uplink location measurement for the UE and/or to compute a location for the UE using the first location information and/or the at least one uplink location measurement, and the one or more processors 1504 may be configured by the location information transmission unit 1518 to include the at least one uplink location measurement and/or the location for the UE in the second location information transmitted to the server.

The methodologies described herein may be implemented by various means depending upon the application. For example, these methodologies may be implemented in hardware, firmware, software, or any combination thereof. For a hardware implementation, the one or more processors 1504 may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For an implementation of base station 1500 involving firmware and/or software, the methodologies may be implemented with modules (e.g., procedures, functions, and so on) that perform the separate functions described herein. Any machine-readable medium tangibly embodying instructions may be used in implementing the methodologies described herein. For example, software codes may be stored in a memory (e.g. memory 1510) and executed by one or more processors 1504, causing the one or more processors 1504 to operate as a special purpose computer programmed to perform the techniques disclosed herein. Memory may be implemented within the one or processors 1504 or external to the one or more processors 1504. As used herein the term "memory" refers to any type of long term, short term, volatile, nonvolatile, or other memory and is not to be limited to any particular type of memory or number of memories, or type of media upon which memory is stored.

If implemented in firmware and/or software, the functions performed by base station 1500 may be stored as one or more instructions or code on a non-transitory computer-readable storage medium such as memory 1510. Examples of storage media include computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage, semiconductor storage, or other storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

In addition to storage on computer-readable storage medium, instructions and/or data for base station 1500 may be provided as signals on transmission media included in a communication apparatus. For example, a communication apparatus comprising part or all of base station 1500 may include a transceiver having signals indicative of instructions and data. The instructions and data are stored on non-transitory computer readable media, e.g., memory 1510, and are configured to cause the one or more processors 1504 to operate as a special purpose computer programmed to perform the techniques disclosed herein. That is, the communication apparatus includes transmission media with signals indicative of information to perform disclosed functions. At a first time, the transmission media included in the communication apparatus may include a first portion of the information to perform the disclosed functions, while at a second time the transmission media included in the communication apparatus may include a second portion of the information to perform the disclosed functions.

Thus, a base station, such as base station 1500, may include a means for assigning an uplink signaling channel to a user equipment (UE), wherein the UE is connected to the base station but is not connected to any other element in a wireless network, which may be, e.g., the external interface 1502 and one or more processors 1504 with dedicated hardware or implementing executable code or software instructions in memory 1510 such as the connection unit 1512. A means for receiving a location report from the UE using the uplink signaling channel, wherein the location report comprises first location information, an identification (ID) for the UE, an ID for the server and an authentication code (AC), wherein the ID for the UE and the ID for the server are not ciphered may include, e.g., the external interface 1502 and one or more processors 1504 with dedicated hardware or implementing executable code or software instructions in memory 1510 such as location report unit 1514. A means for releasing the uplink signaling channel after receiving the location report from the UE may be, e.g., one or more processors 1504 with dedicated hardware or implementing executable code or software instructions in memory 1510 such as termination unit 1516. A means for transmitting a message to the server, the message comprising second location information based on the first location information, the ID for the UE, and the AC may be, e.g., the external interface 1502 and one or more processors 1504 with dedicated hardware or implementing executable code or software instructions in memory 1510 such as the location information transmission unit 1518 and batching unit 1520.

The base station may further include a means for receiving a request from the UE for the uplink signaling channel and transmitting an assignment for the uplink signaling channel to the UE, which may be, e.g., the external interface 1502 and one or more processors 1504 with dedicated hardware or implementing executable code or software instructions in memory 1510 such as the connection unit 1512. A means for receiving an indication from the UE that additional location reports are to be transmitted, which may be, e.g., the external interface 1502 and one or more processors 1504 with dedicated hardware or implementing executable code or software instructions in memory 1510 such as the location report unit 1514. A means for transmitting additional uplink channel assignment information to the UE may be, e.g., the external interface 1502 and one or more processors 1504 with dedicated hardware or implementing executable code or software instructions in memory 1510 such as the connection unit 1512. A means for receiving the additional location reports from the UE using the additional uplink channel assignment information may be, e.g., the external interface 1502 and one or more processors 1504 with dedicated hardware or implementing executable code or software instructions in memory 1510 such as the location report unit 1514.

The base station may further include a means for including location information for at least one other UE in the message, which may be one or more processors 1504 with dedicated hardware or implementing executable code or software instructions in memory 1510 such as the batching unit 1520.

The base station may further include means for obtaining at least one uplink location measurement for the UE and/or computing a location for the UE using the first location information and/or the at least one uplink location measurement, and including the at least one uplink location measurement for the UE and/or the location for the UE in the second location information, which may be e.g., one or more processors 1504 with dedicated hardware or implementing executable code or software instructions in memory 1510 such as the location unit 1522.

The location report may further comprise an indication of a priority or an indication of a QoS and the base station may further include a means for transmitting the message with low delay when the indication of the priority indicates high priority or the indication of the QoS indicates low delay, which may be, e.g., the external interface 1502 and one or more processors 1504 with dedicated hardware or implementing executable code or software instructions in memory 1510 such as the location information transmission unit 1518. A means for including the indication of the priority or the indication of the QoS in the message may be, e.g., the external interface 1502 and one or more processors 1504 with dedicated hardware or implementing executable code or software instructions in memory 1510 such as the location information transmission unit 1518 and batching unit 1520.

Figure 16:
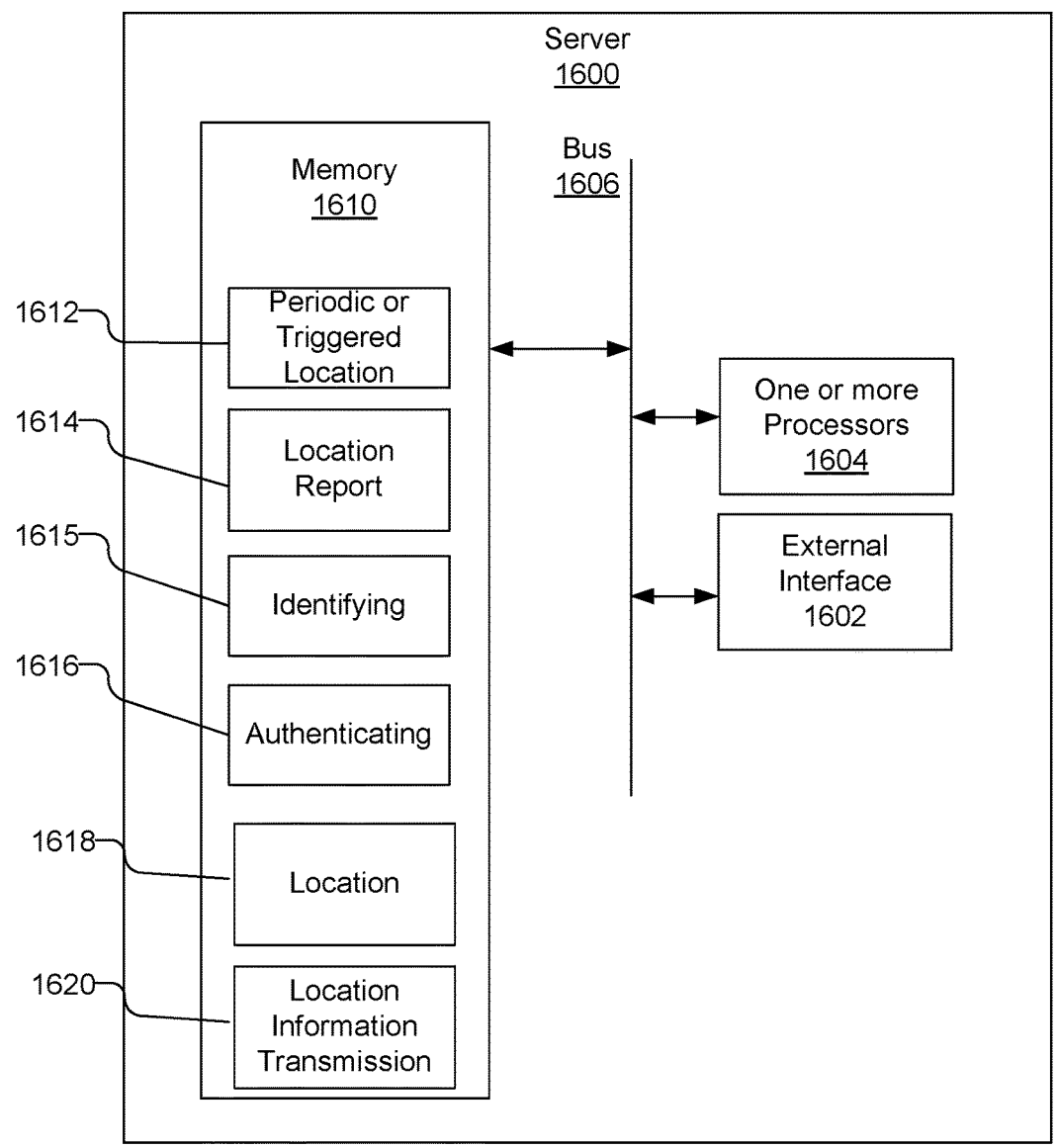
FIG. 16 is a diagram illustrating an example of a hardware implementation of a server.

FIG. 16 is a diagram illustrating an example of a hardware implementation of a server 1600. The server 1600 may be, e.g., a Location Management Function (LMF) such as LMF 152, an Access and Mobility Management Function (AMF), such as AMF 154 illustration in FIG. 1, or an Uplink Transport Function (ULTF) such as ULTF 158 in FIG. 1. The server 1600 includes, e.g., hardware components such as an external interface 1602, which may be a wired or wireless interface capable of connecting to UE 105, an external client 130 and/or other elements (e.g. elements in NG-RAN 112 and/or VPLMN 5GC 150) directly or through one or more intermediary networks and/or one or more network entities. The server 1600 includes one or more processors 1604 and memory 1610, which may be coupled together with a bus 1606. The memory 1610 may contain executable code or software instructions that when executed by the one or more processors 1604 cause the one or more processors to operate as a special purpose computer programmed to perform the techniques disclosed herein. As illustrated in FIG. 16, the memory 1610 may include one or more components or modules that may be implanted by the one or more processors 1604 to perform the methodologies as described herein. While the components or modules are illustrated as software in memory 1610 that is executable by the one or more processors 1604, it should be understood that the components or modules may be firmware or dedicated hardware either in the one or more processors 1604 or off the processors.

For example, the memory 1610 may include a periodic or triggered location unit 1612 that when implemented by the one or more processors 1604 configures the one or more processors 1604 to cause the external interface 1602 to transmit a request for a periodic or triggered location to a user equipment (UE). The request for the periodic or triggered location may be ciphered. The one or more processors 1604 may be configured to further transmit to the UE along with the request for a periodic or triggered location at least one of an ID for the server, a first plurality of one or more IDs for the UE, a ciphering key (or information to enable the UE to determine or generate a ciphering key), authentication related information, an indication of a priority, an indication of a Quality of Service (QoS), or a combination thereof. A location report unit 1614 when implemented by the one or more processors 1604 configures the one or more processors 1604 to receive a location report from a base station when the UE is not reachable from the server, where the location report comprises first location information, an identification (ID) for the UE, and an authentication code (AC), where the ID for the UE is not ciphered. The first location information may be ciphered using the ciphering key. The location report for the UE may be received from the base station in a message, where the message contains a location report for at least one other UE. The first location information may comprise at least one of a serving cell ID, IDs for visible cells, downlink measurements for cells in the wireless network, downlink measurements for wireless local area network (WLAN) access points, downlink measurements for a Global Navigation Satellite System (GNSS), uplink measurements of the UE obtained by the base station, a location estimate for the UE, or a combination thereof. The ID for the UE may be an ID from the first plurality of one or more IDs for the UE. The one or more processors 1604 may be further configured by the periodic or triggered location unit 1612 to transmit a second plurality of one or more IDs for the UE to the UE after all IDs in the first plurality of one or more IDs for the UE have been included by the UE in location reports. The location report may comprise at least one of the indication of the priority or the indication of the QoS, where the one or more processors 1604 may be further configured by the location report unit 1614 to process the location report with low delay when the indication of the priority indicates high priority or the indication of the QoS indicates low delay. The one or more processors 1604 may be configured to process the location report by the identifying unit 1615, authentication unit 1616, and location information transmission unit 1620. The identifying unit 1615 when implemented by the one or more processors 1604 configures the one or more processors 1604 to identify the UE using the ID for the UE. The authenticating unit 1616 when implemented by the one or more processors 1604 configures the one or more processors 1604 to authenticate the ID for the UE using the authentication code. The location unit 1618 when implemented by the one or more processors 1604 configures the one or more processors 1604 to compute or verify a location of the UE using the first location information. A location information transmission unit 1620 when implemented by the one or more processors 1604 configures the one or more processors 1604 to cause the external interface 1602 to transmit second location information for the UE to another entity, where the second location information is based on the first location information (e.g. is the same as the first location information or includes the location of the UE).

The methodologies described herein may be implemented by various means depending upon the application. For example, these methodologies may be implemented in hardware, firmware, software, or any combination thereof. For a hardware implementation, the one or more processors 1604 may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For an implementation of server 1600 involving firmware and/or software, the methodologies may be implemented with modules (e.g., procedures, functions, and so on) that perform the separate functions described herein. Any machine-readable medium tangibly embodying instructions may be used in implementing the methodologies described herein. For example, software codes may be stored in a memory (e.g. memory 1610) and executed by one or more processors 1604, causing the one or more processors 1604 to operate as a special purpose computer programmed to perform the techniques disclosed herein. Memory may be implemented within the one or processors 1604 or external to the one or more processors 1604. As used herein the term "memory" refers to any type of long term, short term, volatile, nonvolatile, or other memory and is not to be limited to any particular type of memory or number of memories, or type of media upon which memory is stored.

If implemented in firmware and/or software, the functions performed by server 1600 may be stored as one or more instructions or code on a non-transitory computer-readable storage medium such as memory 1610. Examples of storage media include computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage, semiconductor storage, or other storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

In addition to storage on computer-readable storage medium, instructions and/or data for server 1600 may be provided as signals on transmission media included in a communication apparatus. For example, a communication apparatus comprising part or all of server 1600 may include a transceiver having signals indicative of instructions and data. The instructions and data are stored on non-transitory computer readable media, e.g., memory 1610, and are configured to cause the one or more processors 1604 to operate as a special purpose computer programmed to perform the techniques disclosed herein. That is, the communication apparatus includes transmission media with signals indicative of information to perform disclosed functions. At a first time, the transmission media included in the communication apparatus may include a first portion of the information to perform the disclosed functions, while at a second time the transmission media included in the communication apparatus may include a second portion of the information to perform the disclosed functions.

Thus, a server 1600, such as LMF 152, AMF 154 or ULTF 158 shown in FIG. 1, may include a means for transmitting a request for a periodic or triggered location to a user equipment (UE), which may be, e.g., the external interface 1602 and one or more processors 1604 with dedicated hardware or implementing executable code or software instructions in memory 1610 such as the periodic or triggered location unit 1612. A means for receiving a location report for the UE from a base station when the UE is not reachable from the server, where the location report comprises first location information, an identification (ID) for the UE, and an authentication code (AC), where the ID for the UE is not ciphered may be, e.g., the external interface 1602 and one or more processors 1604 with dedicated hardware or implementing executable code or software instructions in memory 1610 such as the location report unit 1614. A means for processing the location report includes a means for identifying the UE using the ID for the UE may be, e.g., one or more processors 1604 with dedicated hardware or implementing executable code or software instructions in memory 1610 such as the identifying unit 1615. The means for processing the location report also includes a means for authenticating the ID for the UE using the authentication code may be, e.g., the one or more processors 1604 with dedicated hardware or implementing executable code or software instructions in memory 1610 such as the authenticating unit 1616. The means for processing the location report also includes a means for transmitting the second location information for the UE to another entity may be, e.g., the external interface 1602 and one or more processors 1604 with dedicated hardware or implementing executable code or software instructions in memory 1610 such as the location information transmission unit 1620.

The means for processing the location report may further include a means for computing or verifying a location of the UE based on the first location information, where the second location information comprises the location and where the other entity is an external client or a gateway mobile location center (GMLC) may be, e.g., one or more processors 1604 with dedicated hardware or implementing executable code or software instructions in memory 1610 such as the location unit 1618 The server 1600 may further include a means for transmitting along with the request for a periodic or triggered location at least one of the ID for the server, a first plurality of one or more IDs for the UE, a ciphering key (or information to enable the UE to determine or generate a ciphering key), authentication related information, an indication of a priority, an indication of a Quality of Service (QoS), or a combination thereof, which may be, e.g., the external interface 1602 and one or more processors 1604 with dedicated hardware or implementing executable code or software instructions in memory 1610 such as the periodic or triggered location unit 1612. A means for transmitting a second plurality of one or more IDs for the UE to the UE after all IDs in the first plurality of one or more IDs for the UE have been included by the UE in location reports may be, e.g., the external interface 1602 and one or more processors 1604 with dedicated hardware or implementing executable code or software instructions in memory 1610 such as the periodic or triggered location unit 1612. The location report may comprise at least one of the indication of the priority or the indication of the QoS, and the server may further include means for processing the location report with low delay when the indication of the priority indicates high priority or the indication of the QoS indicates low delay, which may be, e.g., one or more processors 1604 with dedicated hardware or implementing executable code or software instructions in memory 1610 such as the identifying unit 1615, authenticating unit 1616 and location information transmission unit 1620.

Reference throughout this specification to "one example", "an example", "certain examples", or "exemplary implementation" means that a particular feature, structure, or characteristic described in connection with the feature and/or example may be included in at least one feature and/or example of claimed subject matter. Thus, the appearances of the phrase "in one example", "an example", "in certain examples" or "in certain implementations" or other like phrases in various places throughout this specification are not necessarily all referring to the same feature, example, and/or limitation. Furthermore, the particular features, structures, or characteristics may be combined in one or more examples and/or features.

Some portions of the detailed description included herein are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular operations pursuant to instructions from program software. Algorithmic descriptions or symbolic representations are examples of techniques used by those of ordinary skill in the signal processing or related arts to convey the substance of their work to others skilled in the art. An algorithm is here, and generally, is considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals, or the like. It should be understood, however, that all of these or similar terms are to be associated with appropriate physical quantities and are merely convenient labels. Unless specifically stated otherwise, as apparent from the discussion herein, it is appreciated that throughout this specification discussions utilizing terms such as "processing," "computing," "calculating," "determining" or the like refer to actions or processes of a specific apparatus, such as a special purpose computer, special purpose computing apparatus or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

In the preceding detailed description, numerous specific details have been set forth to provide a thorough understanding of claimed subject matter. However, it will be understood by those skilled in the art that claimed subject matter may be practiced without these specific details. In other instances, methods and apparatuses that would be known by one of ordinary skill have not been described in detail so as not to obscure claimed subject matter.

The terms, "and", "or", and "and/or" as used herein may include a variety of meanings that also are expected to depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein may be used to describe any feature, structure, or characteristic in the singular or may be used to describe a plurality or some other combination of features, structures or characteristics. Though, it should be noted that this is merely an illustrative example and claimed subject matter is not limited to this example.

While there has been illustrated and described what are presently considered to be example features, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein.

In one implementation, a method performed by a base station in a wireless network comprises: assigning an uplink signaling channel to a user equipment (UE), wherein the UE is connected to the base station but is not connected to any other element in the wireless network; receiving a location report from the UE using the uplink signaling channel, wherein the location report comprises first location information, an identification (ID) for the UE, an ID for a server and an authentication code (AC), wherein the ID for the UE and the ID for the server are not ciphered; releasing the uplink signaling channel after receiving the location report from the UE; and transmitting a message to the server, the message comprising second location information, the ID for the UE and the AC, wherein the second location information is based on the first location information.

In some implementations of the above method, the second location information comprises the first location information.

In some implementations of the above method, the first location information comprises at least one of a serving cell ID, IDs for visible cells, downlink measurements for cells in the wireless network, downlink measurements for wireless local area network (WLAN) access points, downlink measurements for a Global Navigation Satellite System (GNSS), a location estimate for the UE, or a combination thereof.

In some implementations of the above method, the method further comprises: receiving a request from the UE for the uplink signaling channel; and transmitting an assignment for the uplink signaling channel to the UE. The method may further comprise receiving an indication from the UE that additional location reports are to be transmitted; transmitting additional uplink channel assignment information to the UE; and receiving the additional location reports from the UE using the additional uplink channel assignment information.

In some implementations of the above method, the location report is segmented with the location information received in multiple messages.

In some implementations of the above method, the wireless network is a Fifth Generation (5G) wireless network. The server is a Location Management Function (LMF). an Access and Mobility Management Function (AMF) or an Uplink Transport Function (ULTF). The base station is a New Radio (NR) NodeB (gNB) or a Next Generation evolved NodeB (ng-eNB).

In some implementations of the above method, the location report is received from the UE using a Radio Resource Control (RRC) protocol.

In some implementations of the above method, the method further comprises: including location information for at least one other UE in the message.

In some implementations of the above method, the message is a message for a New Radio Positioning Protocol A (NRPPa).

In some implementations of the above method, the location report further comprises an indication of a priority or an indication of a Quality of Service (QoS) and the method further comprises transmitting the message with low delay when the indication of the priority indicates high priority or the indication of the QoS indicates low delay. Additionally, the method may further comprise including the indication of the priority or the indication of the QoS in the message.

In some implementations of the above method, the method may further comprise computing a location for the UE based on the first location information, the method further comprising including the location in the second location information.

In some implementations of the above method, the method may further comprise: obtaining at least one uplink measurement of signals transmitted by the UE; and including the at least one uplink measurement in the second location information.

In some implementations of the above method, the first location information, the ID for the UE, and the authentication code are transparent to the base station.

In one implementation, a base station in a wireless network comprises: an external interface configured to communicate with a wireless network; and at least one processor coupled to the external interface and configured to assign an uplink signaling channel to a user equipment (UE), wherein the UE is connected to the base station but is not connected to any other element in the wireless network, receive a location report from the UE using the uplink signaling channel, wherein the location report comprises first location information, an identification (ID) for the UE, an ID for a server and an authentication code (AC), wherein the ID for the UE and the ID for the server are not ciphered, release the uplink signaling channel UE after receiving the location report from the UE, and transmit a message to the server, the message comprising second location information, the ID for the UE and the AC, wherein the second location information is based on the first location information.

In some implementations of the above base station, the second location information comprises the first location information.

In some implementations of the above base station, the first location information comprises at least one of a serving cell ID, IDs for visible cells, downlink measurements for cells in the wireless network, downlink measurements for wireless local area network (WLAN) access points, downlink measurements for a Global Navigation Satellite System (GNSS), a location estimate for the UE, or a combination thereof.

In some implementations of the above base station, the at least one processor is further configured to receive a request from the UE for the uplink signaling channel, and transmit an assignment for the uplink signaling channel to the UE. Moreover, the at least one processor is further configured to receive an indication from the UE that additional location reports are to be transmitted, transmit additional uplink channel assignment information to the UE, and receive the additional location reports from the UE using the additional uplink channel assignment information.

In some implementations of the above base station, the location report is segmented with the location information received in multiple messages.

In some implementations of the above base station, the wireless network is a Fifth Generation (5G) wireless network. Moreover, the server is a Location Management Function (LMF), an Access Mobility Management Function (AMF), or an Uplink Transport Function (ULTF). Moreover, the base station is a New Radio (NR) NodeB (gNB) or a Next Generation evolved NodeB (ng-eNB).

In some implementations of the above base station, the location report is received from the UE using a Radio Resource Control (RRC) protocol.

In some implementations of the above base station, the at least one processor is further configured to include location information for at least one other UE in the message.

In some implementations of the above base station, the message is a message for a New Radio Positioning Protocol A (NRPPa).

In some implementations of the above base station, the location report further comprises an indication of a priority or an indication of a Quality of Service (QoS) and wherein the at least one processor is further configured to transmit the message with low delay when the indication of the priority indicates high priority or the indication of the QoS indicates low delay. Moreover, the at least one processor is further configured to include the indication of the priority or the indication of the QoS in the message.

In some implementations of the above base station, the at least one processor is further configured to compute a location for the UE based on the first location information and to include the location in the second location information.

In some implementations of the above base station, the at least one processor is further configured to: obtain at least one uplink measurement of signals transmitted by the UE; and include the at least one uplink measurement in the second location information.

In some implementations of the above base station, the first location information, the ID for the UE, and the authentication code are transparent to the base station.

In one implementation, a method performed by a server in a wireless network comprises: transmitting by the server a request for a periodic or triggered location to a user equipment (UE); receiving a location report for the UE from a base station when the UE is not reachable from the server, wherein the location report comprises first location information, an identification (ID) for the UE, and an authentication code (AC), wherein the ID for the UE is not ciphered; and processing the location report, wherein the processing comprises: identifying the UE using the ID for the UE; authenticating the ID for the UE using the AC; and transmitting second location information for the UE to another entity.

In some implementations of the above method, the processing further comprises: computing or verifying a location of the UE based on the first location information, wherein the second location information comprises the location and wherein the another entity is an external client or a gateway mobile location center (GMLC). Moreover, the server may be a Location Management Function (LMF).

In some implementations of the above method, the second location information comprises the first location information and wherein the another entity is a location server. Moreover, the server may be an Access and Mobility Management Function (AMF) or an Uplink Transport Function (ULTF).

In some implementations of the above method, the method further comprises transmitting to the UE along with the request for the periodic or triggered location at least one of an ID for the server, a first plurality of one or more IDs for the UE, a ciphering key (or information to enable the UE to determine or generate a ciphering key), authentication related information, an indication of a priority, an indication of a Quality of Service (QoS), or a combination thereof. Moreover, the first location information may be ciphered using the ciphering key. Moreover, the ID for the UE may be an ID from the first plurality of one or more IDs for the UE. Moreover, the method may further comprise transmitting a second plurality of one or more IDs for the UE to the UE after all IDs in the first plurality of one or more IDs for the UE have been included by the UE in location reports. Moreover, the location report may comprise at least one of the indication of the priority or the indication of the QoS, and the method may further comprise processing the location report with low delay when the indication of the priority indicates high priority or the indication of the QoS indicates low delay.

In some implementations of the above method, the request for the periodic or triggered location is ciphered.

In some implementations of the above method, the first location information comprises at least one of a serving cell ID, IDs for visible cells, downlink measurements for cells in the wireless network, downlink measurements for wireless local area network (WLAN) access points, downlink measurements for a Global Navigation Satellite System (GNSS), uplink measurements of the UE obtained by the base station, a location estimate for the UE, or a combination thereof.

In some implementations of the above method, the wireless network is a Fifth Generation (5G) wireless network. Moreover, the base station may be a New Radio (NR) NodeB (gNB) or a Next Generation evolved NodeB (ng-eNB).

In some implementations of the above method, the location report for the UE is received from the base station in a message, wherein the message contains a location report for at least one other UE. Moreover, the message may be a message for a New Radio Positioning Protocol A (NRPPa).

In some implementations of the above method, the request for the periodic or triggered location comprises a first positioning protocol message, wherein the location report comprises a second positioning protocol message, the second positioning protocol message comprising the first location information. Moreover the first positioning protocol message may comprise a Long Term Evolution Positioning Protocol (LPP) Request Location Information message, wherein the second positioning protocol message comprises an LPP Provide Location Information message.

In one implementation, a server in a wireless network comprises: an external interface configured to communicate with a wireless network; and at least one processor coupled to the external interface and configured to transmit a request for a periodic or triggered location to a user equipment (UE), receive a location report for the UE from a base station when the UE is not reachable from the server, wherein the location report comprises first location information, an identification (ID) for the UE, and an authentication code (AC), wherein the ID for the UE is not ciphered, and process the location report by being configured to identify the UE using the ID for the UE, authenticate the ID for the UE using the authentication code, and transmit second location information for the UE to another entity.

In some implementations of the above server, the at least one processor is further configured to process the location report by being configured to compute or verify a location of the UE based on the first location information, wherein the second location information comprises the location and wherein the another entity is an external client or a gateway mobile location center (GMLC). Moreover, the server may be a Location Management Function (LMF).

In some implementations of the above server, the second location information comprises the first location information and wherein the another entity is a location server. Moreover, the server may be an Access and Mobility Management Function (AMF) or an Uplink Transport Function.

In some implementations of the above server, the at least one processor is further configured to transmit to the UE along with the request for the periodic or triggered location at least one of an ID for the server, a first plurality of one or more IDs for the UE, a ciphering key (or information to enable the UE to determine or generate a ciphering key), authentication related information, an indication of a priority, an indication of a Quality of Service (QoS), or a combination thereof. Moreover, the ID for the UE may be an ID from the first plurality of one or more IDs for the UE. Moreover, the at least one processor may be further configured to transmit a second plurality of one or more IDs for the UE to the UE after all IDs in the first plurality of one or more IDs for the UE have been included by the UE in location reports. Moreover, the location report may comprise at least one of the indication of the priority or the indication of the QoS, and wherein the at least one processor is further configured to process the location report with low delay when the indication of the priority indicates high priority or the indication of the QoS indicates low delay.

In some implementations of the above server, the first location information is ciphered using the ciphering key.

In some implementations of the above server, the request for the periodic or triggered location is ciphered.

In some implementations of the above server, the first location information comprises at least one of a serving cell ID, IDs for visible cells, downlink measurements for cells in the wireless network, downlink measurements for wireless local area network (WLAN) access points, downlink measurements for a Global Navigation Satellite System (GNSS), uplink measurements of the UE obtained by the base station, a location estimate for the UE, or a combination thereof.

In some implementations of the above server, the wireless network is a Fifth Generation (5G) wireless network. Moreover, the base station may be a New Radio (NR) NodeB (gNB) or a Next Generation evolved NodeB (ng-eNB).

In some implementations of the above server, the location report for the UE is received from the base station in a message, wherein the message contains a location report for at least one other UE. Moreover, the message may be a message for a New Radio Positioning Protocol A (NRPPa).

In some implementations of the above server, the request for the periodic or triggered location comprises a first positioning protocol message, wherein the location report comprises a second positioning protocol message, the second positioning protocol message comprising the first location information. Moreover, the first positioning protocol message may comprise a Long Term Evolution Positioning Protocol (LPP) Request Location Information message, wherein the second positioning protocol message comprises an LPP Provide Location Information message.

Therefore, it is intended that claimed subject matter not be limited to the particular examples disclosed, but that such claimed subject matter may also include all aspects falling within the scope of appended claims, and equivalents thereof.

What is claimed is:

1. A method performed by a user equipment (UE) comprising:
   receiving a request for a periodic or triggered location from a server in a wireless network;
   entering an idle state with respect to the wireless network;
   detecting a periodic or triggering event;
   obtaining location information;
   determining a serving base station in the wireless network;
   obtaining an uplink signaling channel to the serving base station, wherein the UE is not connected to any other element in the wireless network;
   transmitting a location report to the serving base station using the uplink signaling channel, wherein the location report comprises the location information, an identification (ID) for the UE, an ID for the server and an authentication code, wherein the ID for the UE and the ID for the server are not ciphered; and
   re-entering the idle state after transmitting the location report.

2. The method of claim 1, further comprising receiving along with the request for the periodic or triggered location at least one of the ID for the server, a first plurality of one or more IDs for the UE, a ciphering key, authentication related information, an indication of a priority, an indication of a Quality of Service (QoS), or a combination thereof.

3. The method of claim 2, further comprising ciphering the location information using the ciphering key.

4. The method of claim 2, wherein the ID for the UE is an ID from the first plurality of one or more IDs for the UE.

5. The method of claim 4, further comprising receiving a second plurality of one or more IDs for the UE from the server after all IDs in the first plurality of one or more IDs for the UE have been included in location reports.

6. The method of claim 2, further comprising including the indication of the priority or the indication of the QoS in the location report transmitted to the serving base station.

7. The method of claim 1, wherein the request for the periodic or triggered location is ciphered.

8. The method of claim 1, wherein the location information comprises at least one of a serving cell ID, IDs for visible cells, downlink measurements, a location estimate for the UE, or a combination thereof, wherein the downlink measurements comprise downlink measurements for cells in the wireless network, downlink measurements for wireless local area network (WLAN) access points, downlink measurements for a Global Navigation Satellite System (GNSS), or a combination thereof.

9. The method of claim 8, further comprising receiving assistance data for at least one of the location estimate and the downlink measurements, wherein the assistance data is broadcast from base stations in the wireless network.

10. The method of claim 1, further comprising:
    sending a request to the serving base station for the uplink signaling channel; and
    receiving an assignment for the uplink signaling channel from the serving base station.

11. The method of claim 10, further comprising:
    indicating to the serving base station that additional location reports are to be transmitted;
    receiving additional uplink channel assignment information from the serving base station; and
    transmitting the additional location reports to the serving base station using the additional uplink channel assignment information.

12. The method of claim 1, wherein the location report is segmented with the location information provided in multiple messages.

13. The method of claim 1, wherein the wireless network is a Fifth Generation (5G) wireless network.

14. The method of claim 13, wherein the server is a Location Management Function (LMF), an Access and Mobility Management Function (AMF) or an Uplink Transport Function (ULTF).

15. The method of claim 13, wherein the serving base station is a New Radio (NR) NodeB (gNB) or a Next Generation evolved NodeB (ng-eNB).

16. The method of claim 1 further comprising receiving an acknowledgment from the serving base station that the location report was received by the serving base station prior to re-entering the idle state.

17. The method of claim 1, wherein the location report is transmitted to the serving base station using a Radio Resource Control (RRC) protocol.

18. The method of claim 1, wherein the request for a periodic or triggered location comprises a codeword, the codeword assigned by an external client, the codeword not interpreted by the wireless network, the codeword identifying the periodic or triggering event.

19. The method of claim 1, wherein the request for the periodic or triggered location comprises a first positioning protocol message, and further comprising:
    including a second positioning protocol message in the location report, wherein the second positioning protocol message comprises the location information.

20. The method of claim 19, wherein the first positioning protocol message comprises a Long Term Evolution Positioning Protocol (LPP) Request Location Information message, wherein the second positioning protocol message comprises an LPP Provide Location Information message.

21. A user equipment (UE) comprising:
  a wireless transceiver configured to wirelessly communicate with a wireless network; and
  at least one processor coupled to the wireless transceiver and configured to receive a request for a periodic or triggered location from a server in the wireless network, enter an idle state with respect to the wireless network, detect a periodic or triggering event, obtain location information, determine a serving base station in the wireless network, obtain an uplink signaling channel to the serving base station, wherein the UE is not connected to any other element in the wireless network, transmit a location report to the serving base station using the uplink signaling channel, wherein the location report comprises the location information, an identification (ID) for the UE, an ID for the server and an authentication code, wherein the ID for the UE and the ID for the server are not ciphered, and re-enter the idle state after transmitting the location report.

22. The UE of claim 21, wherein the at least one processor is further configured to receive along with the request for the periodic or triggered location at least one of the ID for the server, a first plurality of one or more IDs for the UE, a ciphering key, authentication related information, an indication of a priority, an indication of a Quality of Service (QoS), or a combination thereof.

23. The UE of claim 22, wherein the at least one processor is further configured to cipher the location information using the ciphering key.

24. The UE of claim 22, wherein the ID for the UE is an ID from the first plurality of one or more IDs for the UE.

25. The UE of claim 24, wherein the at least one processor is further configured to receive a second plurality of one or more IDs for the UE from the server after all IDs in the first plurality of one or more IDs for the UE have been included in location reports.

26. The UE of claim 22, wherein the at least one processor is further configured to include the indication of the priority or the indication of the QoS in the location report transmitted to the serving base station.

27. The UE of claim 21, wherein the request for the periodic or triggered location is ciphered.

28. The UE of claim 21, wherein the location information comprises at least one of a serving cell ID, IDs for visible cells, downlink measurements, a location estimate for the UE, or a combination thereof, wherein the downlink measurements comprise downlink measurements for cells in the wireless network, downlink measurements for wireless local area network (WLAN) access points, downlink measurements for a Global Navigation Satellite System (GNSS), or a combination thereof.

29. The UE of claim 28, wherein the at least one processor is further configured to receive assistance data for at least one of the location estimate and the downlink measurements, wherein the assistance data is broadcast from base stations in the wireless network.

30. The UE of claim 21, wherein the at least one processor is further configured to send a request to the serving base station for the uplink signaling channel, and receive an assignment for the uplink signaling channel from the serving base station.

31. The UE of claim 30, wherein the at least one processor is further configured to indicate to the serving base station that additional location reports are to be transmitted, receive additional uplink channel assignment information from the serving base station, and transmit the additional location reports to the serving base station using the additional uplink channel assignment information.

32. The UE of claim 21, wherein the location report is segmented with the location information provided in multiple messages.

33. The UE of claim 21, wherein the wireless network is a Fifth Generation (5G) wireless network.

34. The UE of claim 33, wherein the server is a Location Management Function (LMF), an Access and Mobility Management Function (AMF), or an Uplink Transport Function (ULTF).

35. The UE of claim 33, wherein the serving base station is a New Radio (NR) NodeB (gNB) or a Next Generation evolved NodeB (ng-eNB).

36. The UE of claim 21, wherein the at least one processor is further configured to receive an acknowledgment from the serving base station that the location report was received by the serving base station prior to re-entering the idle state.

37. The UE of claim 21, wherein the location report is transmitted to the serving base station using a Radio Resource Control (RRC) protocol.

38. The UE of claim 21, wherein the request for a periodic or triggered location comprises a codeword, the codeword assigned by an external client, the codeword not interpreted by the wireless network, the codeword identifying the periodic or triggering event.

39. The UE of claim 21, wherein the request for the periodic or triggered location comprises a first positioning protocol message, wherein the at least one processor is further configured to:
  include a second positioning protocol message in the location report, wherein the second positioning protocol message comprises the location information.

40. The UE of claim 39, wherein the first positioning protocol message comprises a Long Term Evolution Positioning Protocol (LPP) Request Location Information message, wherein the second positioning protocol message comprises an LPP Provide Location Information message.

* * * * *